United States Patent
Shimo

(10) Patent No.: US 7,791,822 B2
(45) Date of Patent: Sep. 7, 2010

(54) FOCUSING METHOD AND IMAGE-TAKING APPARATUS

(75) Inventor: Mitsuaki Shimo, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 169 days.

(21) Appl. No.: 11/894,349

(22) Filed: Aug. 21, 2007

(65) Prior Publication Data
US 2008/0043347 A1 Feb. 21, 2008

(30) Foreign Application Priority Data

Aug. 21, 2006 (JP) ............................. 2006-224612
Aug. 21, 2006 (JP) ............................. 2006-224624

(51) Int. Cl.
*G02B 17/00* (2006.01)
*G02B 3/02* (2006.01)

(52) U.S. Cl. ...................................... 359/726; 359/720
(58) Field of Classification Search ................. 359/720, 359/726–731
See application file for complete search history.

(56) References Cited

U.S. PATENT DOCUMENTS 6,760,164 B2 * 7/2004 Togino ....................... 359/720

FOREIGN PATENT DOCUMENTS

| JP | 5-80418 A | 4/1993 |
| JP | 5-113600 A | 5/1993 |
| JP | 6-148566 A | 5/1994 |
| JP | 8-292368 A | 11/1996 |
| JP | 8-292372 A | 11/1996 |
| JP | 9-258105 A | 10/1997 |
| JP | 10-68886 A | 3/1998 |
| JP | 11-337825 A | 12/1999 |
| JP | 11-337827 A | 12/1999 |
| JP | 2001-296497 A | 10/2001 |
| JP | 2005-134832 A | 5/2005 |
| JP | 2005-134833 A | 5/2005 |
| JP | 2005-134834 A | 5/2005 |

\* cited by examiner

*Primary Examiner*—Alicia M Harrington
(74) *Attorney, Agent, or Firm*—Sidley Austin LLP

(57) ABSTRACT

An optical system has a plurality of optical surfaces and an aperture stop, and has an eccentric reflective surface as at least one of the plurality of optical surfaces. For different conjugate distances, focusing for keeping a position of an entire image surface substantially constant while keeping substantially constant an axial imaging position and an angle of incidence of an axial principal ray on an image surface is performed by parallel and rotational movement of a group provided as a focusing group having at least one surface as the eccentric reflective surface.

42 Claims, 33 Drawing Sheets

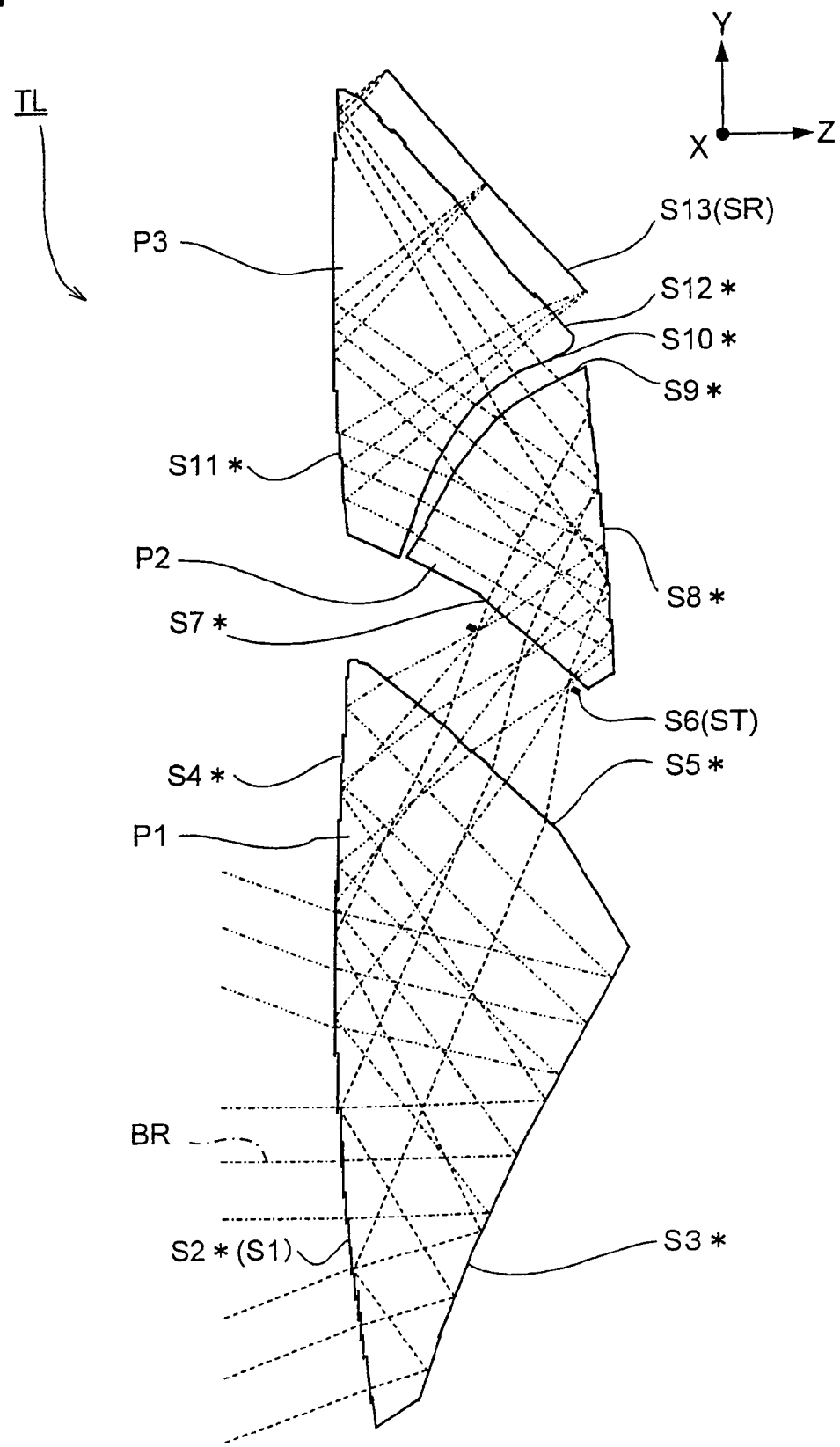

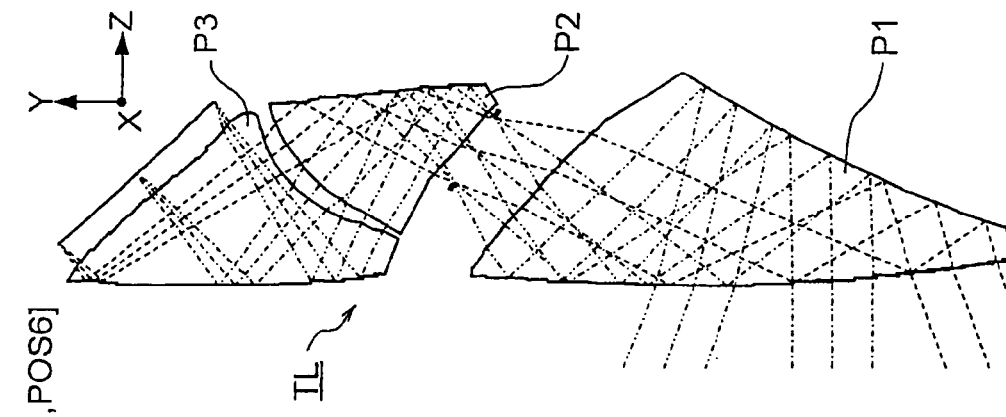
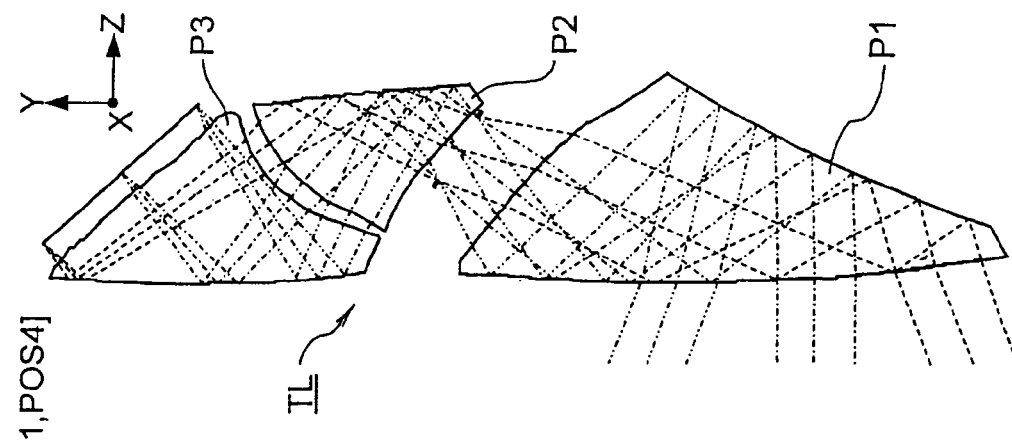
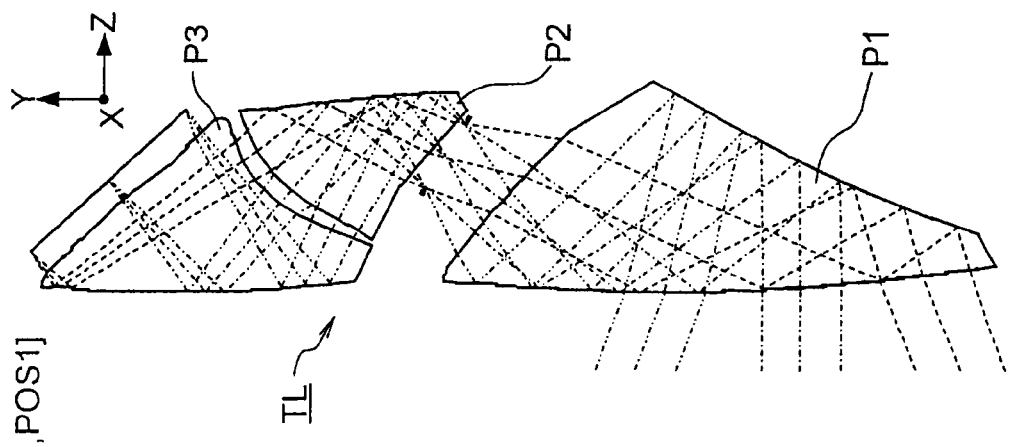

(x,y)=(0.00,2.70)
[EX1,POS1,X-dir., Δx]

(x,y)=(3.60,2.70)
[EX1,POS1,X-dir., Δx]

(x,y)=(0.00,0.00)
[EX1,POS1,X-dir., Δx]

(x,y)=(3.60,0.00)
[EX1,POS1,X-dir., Δx]

(x,y)=(0.00,-2.70)
[EX1,POS1,X-dir., Δx]

(x,y)=(3.60,-2.70)
[EX1,POS1,X-dir., Δx]

(x,y)=(0.00,2.70)
[EX1,POS4,X-dir., Δx]

(x,y)=(3.60,2.70)
[EX1,POS4,X-dir., Δx]

(x,y)=(0.00,0.00)
[EX1,POS4,X-dir., Δx]

(x,y)=(3.60,0.00)
[EX1,POS4,X-dir., Δx]

(x,y)=(0.00,-2.70)
[EX1,POS4,X-dir., Δx]

(x,y)=(3.60,-2.70)
[EX1,POS4,X-dir., Δx]

(x,y)=(0.00,2.70)
[EX1,POS6,X-dir., Δx]

(x,y)=(3.60,2.70)
[EX1,POS6,X-dir., Δx]

(x,y)=(0.00,0.00)
[EX1,POS6,X-dir., Δx]

(x,y)=(3.60,0.00)
[EX1,POS6,X-dir., Δx]

(x,y)=(0.00,-2.70)
[EX1,POS6,X-dir., Δx]

(x,y)=(3.60,-2.70)
[EX1,POS6,X-dir., Δx]

(x,y)=(0.00,2.70)
[EX1,POS1,X-dir., $\Delta$y]

(x,y)=(3.60,2.70)
[EX1,POS1,X-dir., $\Delta$y]

(x,y)=(0.00,0.00)
[EX1,POS1,X-dir., $\Delta$y]

(x,y)=(3.60,0.00)
[EX1,POS1,X-dir., $\Delta$y]

(x,y)=(0.00,-2.70)
[EX1,POS1,X-dir., $\Delta$y]

(x,y)=(3.60,-2.70)
[EX1,POS1,X-dir., $\Delta$y]

(x,y)=(0.00,2.70)
[EX1,POS4,X-dir., Δy]

(x,y)=(3.60,2.70)
[EX1,POS4,X-dir., Δy]

(x,y)=(0.00,0.00)
[EX1,POS4,X-dir., Δy]

(x,y)=(3.60,0.00)
[EX1,POS4,X-dir., Δy]

(x,y)=(0.00,-2.70)
[EX1,POS4,X-dir., Δy]

(x,y)=(3.60,-2.70)
[EX1,POS4,X-dir., Δy]

(x,y)=(0.00,2.70)
[EX1,POS6,X -dir., Δy]

(x,y)=(3.60,2.70)
[EX1,POS6,X -dir., Δy]

(x,y)=(0.00,0.00)
[EX1,POS6,X -dir., Δy]

(x,y)=(3.60,0.00)
[EX1,POS6,X -dir., Δy]

(x,y)=(0.00,-2.70)
[EX1,POS6,X -dir., Δy]

(x,y)=(3.60,-2.70)
[EX1,POS6,X -dir., Δy]

(x,y)=(0.00,2.70)
[EX1,POS1,Y-dir.,Δx]

(x,y)=(3.60,2.70)
[EX1,POS1,Y-dir.,Δx]

(x,y)=(0.00,0.00)
[EX1,POS1,Y-dir.,Δx]

(x,y)=(3.60,0.00)
[EX1,POS1,Y-dir.,Δx]

(x,y)=(0.00,-2.70)
[EX1,POS1,Y-dir.,Δx]

(x,y)=(3.60,-2.70)
[EX1,POS1,Y-dir.,Δx]

(x,y)=(0.00,2.70)
[EX1,POS4,Y-dir., Δx]

(x,y)=(3.60,2.70)
[EX1,POS4,Y-dir., Δx]

(x,y)=(0.00,0.00)
[EX1,POS4,Y-dir., Δx]

(x,y)=(3.60,0.00)
[EX1,POS4,Y-dir., Δx]

(x,y)=(0.00,-2.70)
[EX1,POS4,Y-dir., Δx]

(x,y)=(3.60,-2.70)
[EX1,POS4,Y-dir., Δx]

(x,y)=(0.00,2.70)
[EX1,POS6,Y-dir.,Δx]

(x,y)=(3.60,2.70)
[EX1,POS6,Y-dir.,Δx]

(x,y)=(0.00,0.00)
[EX1,POS6,Y-dir.,Δx]

(x,y)=(3.60,0.00)
[EX1,POS6,Y-dir.,Δx]

(x,y)=(0.00,-2.70)
[EX1,POS6,Y-dir.,Δx]

(x,y)=(3.60,-2.70)
[EX1,POS6,Y-dir.,Δx]

(x,y)=(0.00,2.70)
[EX1,POS1,Y-dir.,Δy]

(x,y)=(3.60,2.70)
[EX1,POS1,Y-dir.,Δy]

(x,y)=(0.00,0.00)
[EX1,POS1,Y-dir.,Δy]

(x,y)=(3.60,0.00)
[EX1,POS1,Y-dir.,Δy]

(x,y)=(0.00,-2.70)
[EX1,POS1,Y-dir.,Δy]

(x,y)=(3.60,-2.70)
[EX1,POS1,Y-dir.,Δy]

(x,y)=(0.00,2.70)
[EX1,POS4,Y-dir., Δy]

(x,y)=(3.60,2.70)
[EX1,POS4,Y-dir., Δy]

(x,y)=(0.00,0.00)
[EX1,POS4,Y-dir., Δy]

(x,y)=(3.60,0.00)
[EX1,POS4,Y-dir., Δy]

(x,y)=(0.00,-2.70)
[EX1,POS4,Y-dir., Δy]

(x,y)=(3.60,-2.70)
[EX1,POS4,Y-dir., Δy]

(x,y)=(0.00,2.70)
[EX1,POS6,Y-dir., Δy]

(x,y)=(3.60,2.70)
[EX1,POS6,Y-dir., Δy]

(x,y)=(0.00,0.00)
[EX1,POS6,Y-dir., Δy]

(x,y)=(3.60,0.00)
[EX1,POS6,Y-dir., Δy]

(x,y)=(0.00,-2.70)
[EX1,POS6,Y-dir., Δy]

(x,y)=(3.60,-2.70)
[EX1,POS6,Y-dir., Δy]

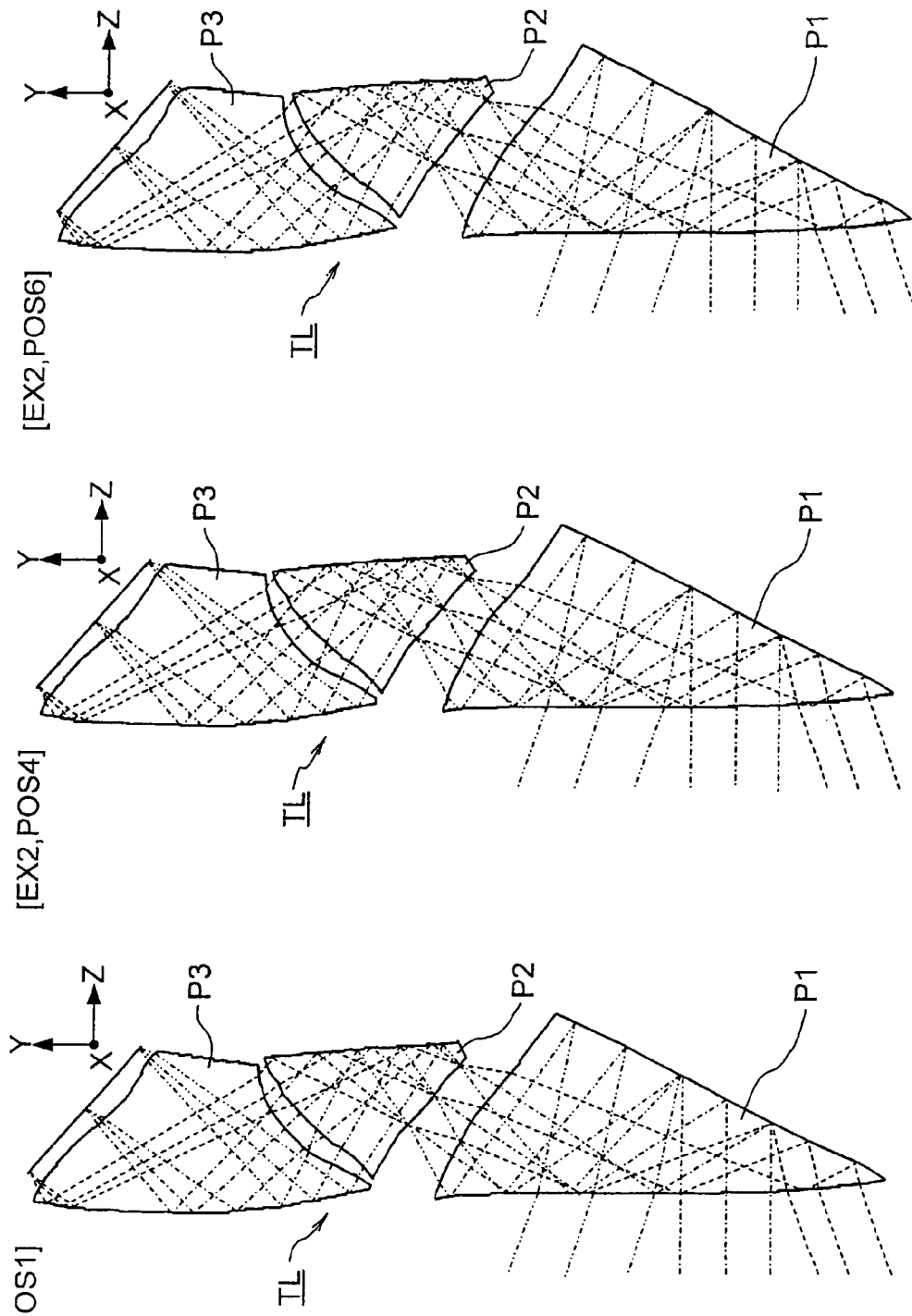

(x,y)=(0.00,2.16)
[EX2,POS1,X -dir., $\Delta$x]

(x,y)=(2.98,2.16)
[EX2,POS1,X -dir., $\Delta$x]

(x,y)=(0.00,0.00)
[EX2,POS1,X -dir., $\Delta$x]

(x,y)=(2.98,0.00)
[EX2,POS1,X -dir., $\Delta$x]

(x,y)=(0.00,-2.16)
[EX2,POS1,X -dir., $\Delta$x]

(x,y)=(2.98,-2.16)
[EX2,POS1,X -dir., $\Delta$x]

(x,y)=(0.00,2.16)
[EX2,POS4,X-dir., $\Delta$x]

(x,y)=(2.98,2.16)
[EX2,POS4,X-dir., $\Delta$x]

(x,y)=(0.00,0.00)
[EX2,POS4,X-dir., $\Delta$x]

(x,y)=(2.98,0.00)
[EX2,POS4,X-dir., $\Delta$x]

(x,y)=(0.00,-2.16)
[EX2,POS4,X-dir., $\Delta$x]

(x,y)=(2.98,-2.16)
[EX2,POS4,X-dir., $\Delta$x]

(x,y)=(0.00,2.16)
[EX2,POS6,X -dir., Δx]

(x,y)=(2.98,2.16)
[EX2,POS6,X -dir., Δx]

(x,y)=(0.00,0.00)
[EX2,POS6,X -dir., Δx]

(x,y)=(2.98,0.00)
[EX2,POS6,X -dir., Δx]

(x,y)=(0.00,-2.16)
[EX2,POS6,X -dir., Δx]

(x,y)=(2.98,-2.16)
[EX2,POS6,X-dir., Δx]

(x,y)=(0.00,2.16)
[EX2,POS1,X-dir., Δy]

(x,y)=(2.98,2.16)
[EX2,POS1,X-dir., Δy]

(x,y)=(0.00,0.00)
[EX2,POS1,X-dir., Δy]

(x,y)=(2.98,0.00)
[EX2,POS1,X-dir., Δy]

(x,y)=(0.00,-2.16)
[EX2,POS1,X-dir., Δy]

(x,y)=(2.98,-2.16)
[EX2,POS1,X-dir., Δy]

(x,y)=(0.00,2.16)
[EX2,POS4,X-dir., Δy]

(x,y)=(2.98,2.16)
[EX2,POS4,X-dir., Δy]

(x,y)=(0.00,0.00)
[EX2,POS4,X-dir., Δy]

(x,y)=(2.98,0.00)
[EX2,POS4,X-dir., Δy]

(x,y)=(0.00,-2.16)
[EX2,POS4,X-dir., Δy]

(x,y)=(2.98,-2.16)
[EX2,POS4,X-dir., Δy]

(x,y)=(0.00,2.16)
[EX2,POS6,X-dir., Δy]

(x,y)=(2.98,2.16)
[EX2,POS6,X-dir., Δy]

(x,y)=(0.00,0.00)
[EX2,POS6,X-dir., Δy]

(x,y)=(2.98,0.00)
[EX2,POS6,X-dir., Δy]

(x,y)=(0.00,-2.16)
[EX2,POS6,X-dir., Δy]

(x,y)=(2.98,-2.16)
[EX2,POS6,X-dir., Δy]

(x,y)=(0.00,2.16)
[EX2,POS1,Y -dir., Δx]

(x,y)=(2.98,2.16)
[EX2,POS1,Y -dir., Δx]

(x,y)=(0.00,0.00)
[EX2,POS1,Y -dir., Δx]

(x,y)=(2.98,0.00)
[EX2,POS1,Y -dir., Δx]

(x,y)=(0.00,-2.16)
[EX2,POS1,Y -dir., Δx]

(x,y)=(2.98,-2.16)
[EX2,POS1,Y -dir., Δx]

(x,y)=(0.00,2.16)
[EX2,POS4,Y -dir., Δx]

(x,y)=(2.98,2.16)
[EX2,POS4,Y -dir., Δx]

(x,y)=(0.00,0.00)
[EX2,POS4,Y -dir., Δx]

(x,y)=(2.98,0.00)
[EX2,POS4,Y-dir., Δx]

(x,y)=(0.00,-2.16)
[EX2,POS4,Y -dir., Δx]

(x,y)=(2.98,-2.16)
[EX2,POS4,Y-dir., Δx]

(x,y)=(0.00,2.16)
[EX2,POS6,Y-dir., Δx]

(x,y)=(2.98,2.16)
[EX2,POS6,Y-dir., Δx]

(x,y)=(0.00,0.00)
[EX2,POS6,Y-dir., Δx]

(x,y)=(2.98,0.00)
[EX2,POS6,Y-dir., Δx]

(x,y)=(0.00,-2.16)
[EX2,POS6,Y-dir., Δx]

(x,y)=(2.98,-2.16)
[EX2,POS6,Y-dir., Δx]

(x,y)=(0.00,2.16)
[EX2,POS1,Y-dir., Δy]

(x,y)=(2.98,2.16)
[EX2,POS1,Y-dir., Δy]

(x,y)=(0.00,0.00)
[EX2,POS1,Y-dir., Δy]

(x,y)=(2.98,0.00)
[EX2,POS1,Y-dir., Δy]

(x,y)=(0.00,-2.16)
[EX2,POS1,Y-dir., Δy]

(x,y)=(2.98,-2.16)
[EX2,POS1,Y-dir., Δy]

(x,y)=(0.00,2.16)
[EX2,POS4,Y-dir., Δy]

(x,y)=(2.98,2.16)
[EX2,POS4,Y-dir., Δy]

(x,y)=(0.00,0.00)
[EX2,POS4,Y-dir., Δy]

(x,y)=(2.98,0.00)
[EX2,POS4,Y-dir., Δy]

(x,y)=(0.00,-2.16)
[EX2,POS4,Y-dir., Δy]

(x,y)=(2.98,-2.16)
[EX2,POS4,Y-dir., Δy]

(x,y)=(0.00,2.16)
[EX2,POS6,Y-dir., Δy]

(x,y)=(2.98,2.16)
[EX2,POS6,Y-dir., Δy]

(x,y)=(0.00,0.00)
[EX2,POS6,Y-dir., Δy]

(x,y)=(2.98,0.00)
[EX2,POS6,Y-dir., Δy]

(x,y)=(0.00,-2.16)
[EX2,POS6,Y-dir., Δy]

(x,y)=(2.98,-2.16)
[EX2,POS6,Y-dir., Δy]

FOCUSING METHOD AND IMAGE-TAKING APPARATUS

This application is based on Japanese Patent Application No. 2006-224612 filed on Aug. 21, 2006 and Japanese Patent Application No. 2006-224624 filed on Aug. 21, 2006, the contents of which are hereby incorporated by reference.

BACKGROUND OF THE INVENTION

1. Field of the Invention

The present invention relates to a focusing method for an optical system and an image-taking apparatus. The invention relates, for example, to a focusing method used in any types of non-coaxial optical systems including an image-taking optical system, a projection optical system, and the like, and to an image-taking apparatus adopting this focusing method for the image-taking optical system. Examples of the image-taking optical system include an optical system forming an optical image of a subject on the light-receiving surface of an image sensor in a digital appliance equipped with an image input capability (for example, a cellular phone). Examples of the projection optical system include, for example, an optical system projecting an image of a display element on a screen in a projector.

2. Description of Related Art

In recent years, to achieve downsizing of an image-taking optical system and a projection optical system, a non-coaxial optical system has been under development which bends an optical path by using an eccentric optical surface (for example, a free-form surface formed into a rotationally-asymmetric, curved shape). To put the image-taking optical system and the projection optical system into practice in the non-coaxial optical system, a focusing method is required which is capable of ensuring favorable imaging performance even at different photographing distances or projection distances. Focusing methods for a non-coaxial optical system conventionally proposed include, for example, those proposed in Patent Documents 1 and 2, and the like. In the non-coaxial optical system described in Patent Document 1, an axial incidence principal ray and an axial exit principal ray of a focusing group are parallel to each other, and focusing is achieved by parallel movement of the focusing group in parallel to the direction in which these principal rays are parallel to each other. In the non-coaxial optical system described in Patent Document 2, an axial incidence principal ray and an axial exit principal ray of an entire optical system are parallel to each other, and focusing is achieved by parallel movement of the focusing group in parallel to the direction in which these principal rays are parallel to each other.

Focusing methods for a projection optical system using an eccentric optical lens include those described in Patent Documents 3 to 5. Patent Documents 3 to 5 propose optical systems with little trapezium distortion which satisfy relationship between inclinations of an object surface and an image surface based on "T. Scheimpflug" theory. Although no detailed numerical examples are provided in the description, the configuration is provided for an optical system with a coaxial system lens inclined with respect to the optical axis, and an image with little trapezium distortion is provided by arranging the coaxial system lens so that the T. Scheimpflug theory holds for an inclined object surface. Then focusing is achieved by changing an optical lens, the image surface position, and the object surface position so that the T. Scheimpflug theory holds.

| [Patent Document 1] | JP-A-H8-292368 |
| [Patent Document 2] | JP-A-2005-134832 |
| [Patent Document 3] | JP-A-H5-80418 |
| [Patent Document 4] | JP-A-H5-113600 |
| [Patent Document 5] | JP-A-H6-148566 |

With the focusing methods proposed in Patent Documents 1 and 2, the axial incidence principal ray and axial exit principal ray of the focusing group or the entire system are parallel to each other, and focusing is achieved by the parallel movement of the focusing group or the entire system in parallel to the direction in which these principal rays are parallel to each other. In achieving the downsizing and slimming-down, optical path bending in the non-coaxial optical system is more effective than optical path bending in a coaxial optical system. That is, orienting an axial incidence principal ray and axial exit principal ray of an optical system or an optical element in parallel reduces effect of downsizing and slimming-down achieved by optical path bending, thus resulting in failure to make full use of an advantage provided by the non-coaxial optical system.

While having the advantage described above, the non-coaxial optical system, risk fluctuation in the angle of incidence of a principal ray located at the image center (that is, axial principal ray) on the image surface during focusing. A great change from vertical incidence of the axial principal ray with respect on the image surface in particular causes non-uniformity in the amount of light at this position, which provides asymmetrical brightness distribution, thereby causing non-uniformity in the brightness of an image. Consequently, the non-uniformity in the brightness of an image results and also this non-uniformity changes following focusing in particular; thus leading to failure to provide a clear image, which is not practical.

The focusing methods proposed in Patent Documents 3 to 5 are difficult to be applied to a more eccentric non-coaxial optical system using an eccentric reflective surface, because the T. Scheimpflug's theory does not apply to such a non-coaxial optical system. Application of the T. Scheimpflug's theory required an optical axis of one straight line, which usually does not exist in the non-coaxial optical system. Therefore, in application of the focusing methods proposed in Patent Documents 3 to 5 to focusing, it is impossible to perform such focusing as is performed by an aggressive non-coaxial optical system in which the optical path is bent.

SUMMARY OF THE INVENTION

In view of such circumstances, the present invention has been made, and it is an object of the invention to provide a focusing method capable of providing a high-quality image in focusing while making full use of features of a non-coaxial optical system.

To achieve the object described above, one aspect of the invention refers to a focusing method for an optical system having a plurality of optical surfaces and an aperture stop and having an eccentric reflective surface as at least one of the plurality of optical surfaces, for different conjugate distances, focusing for keeping a position of an entire image surface substantially constant while keeping substantially constant an axial imaging position and an angle of incidence of an axial principal ray on an image surface is performed by parallel and rotational movement of a group provided as a focusing group having at least one surface as the eccentric reflective surface.

Another aspect of the invention refers to a focusing method for an optical system having a plurality of optical surfaces and an aperture stop and having an eccentric reflective surface as at least one of the plurality of optical surfaces, wherein the optical system has at least one prism optical element having at least one surface as the eccentric reflective surface, and wherein, for different conjugate distances, focusing for keeping a position of an entire image surface substantially constant while keeping substantially constant an axial imaging position and an angle of incidence of an axial principal ray on an image surface by parallel and rotational movement of a group provided as a focusing group including the at least one prism optical element.

Still another aspect of the invention refers to a focusing method for an optical system having a plurality of optical surfaces and an aperture stop and having an eccentric reflective surface as at least one of the plurality of optical surfaces, wherein the optical system has at least one prism optical element having at least one surface as the eccentric reflective surface, and wherein, for different conjugate distances, focusing for keeping a position of an entire image surface substantially constant while keeping substantially constant an axial imaging position and an angle of incidence of an axial principal ray on an image surface by parallel and rotational movement of a group provided as a focusing group located on a most image surface side and including the at least one prism optical element.

Still another aspect of the invention refers to an image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, and performs, for different conjugate distances, focusing for keeping a position of an entire image surface substantially constant while keeping substantially constant an axial imaging position and an angle of incidence of an axial principal ray on an image surface by parallel and rotational movement of a group provided as a focusing group having at least one surface as the eccentric reflective surface.

Still another aspect of the invention refers to an image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, has at least one prism optical element having at least one surface as the eccentric reflective surface, and performs, for different conjugate distances, focusing for keeping a position of an entire image surface substantially constant while keeping substantially constant an axial imaging position and an angle of incidence of an axial principal ray on an image surface by parallel and rotational movement of a group provided as a focusing group including the at least one prism optical element.

Still another aspect of the invention refers to an image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, has at least one prism optical element having at least one surface as the eccentric reflective surface, has a group as a focusing group located on a most image surface side and including the at least one prism optical element, and performs, for different conjugate distances, focusing for keeping a position of an entire image surface substantially constant while keeping substantially constant an axial imaging position and an angle of incidence of an axial principal ray on an image surface by parallel and rotational movement of the focusing.

BRIEF DESCRIPTION OF THE DRAWINGS

FIG. 1 is an optical configuration diagram of a first embodiment (Example 1);

FIGS. 2A, 2B and 2C are optical configuration diagrams showing optical arrangement and the like at focus positions POS 1, POS 4, and POS 6 of the first embodiment (Example 1);

FIGS. 16A, 16B and 16C are optical configuration diagrams showing optical arrangement and the like at focus positions POS 1, POS 4, and POS 6 of the second embodiment (Example 2);

DETAILED DESCRIPTION OF THE PREFERRED EMBODIMENTS

Figure 3A:
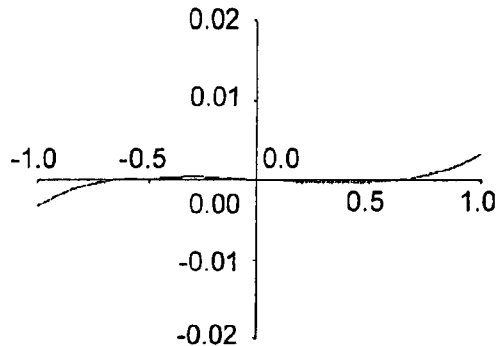
FIGS. 3A to 3F are lateral aberration diagrams showing $\Delta x$ in an X direction at the POS 1 of Example 1.
Figure 3D:
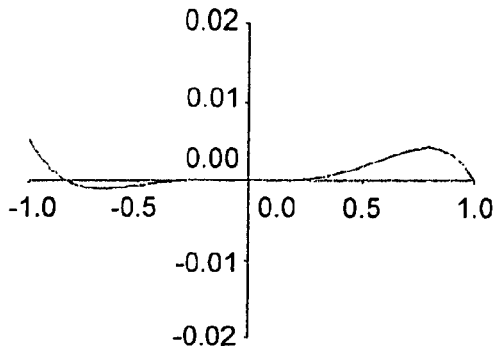
Figure 3B:
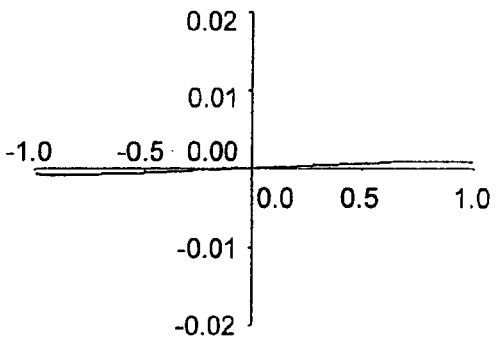
Figure 3E:
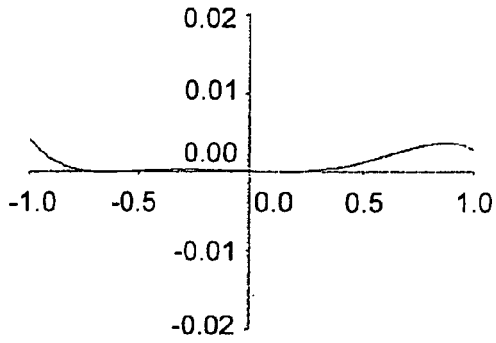
Figure 3C:
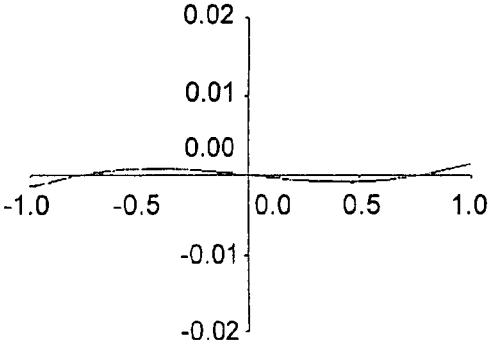
Figure 3F:
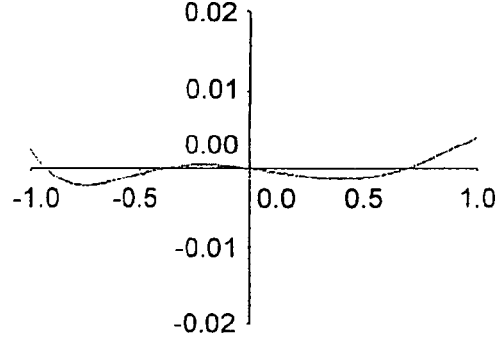
Figure 4A:
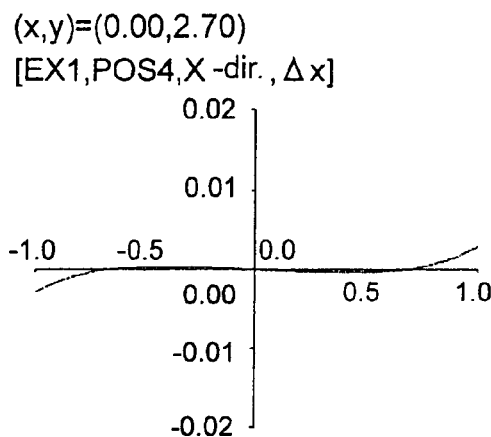
FIGS. 4A to 4F are lateral aberration diagrams showing $\Delta x$ in an X direction at the POS 4 of Example 1.
Figure 4D:
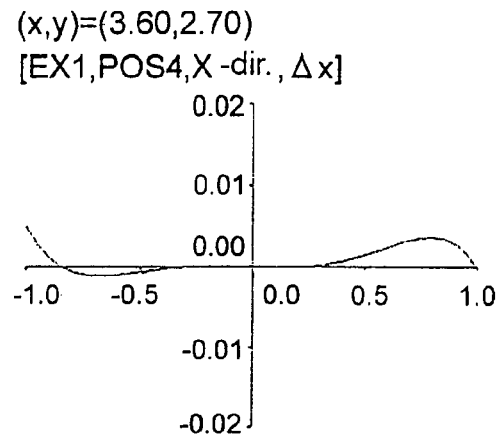
Figure 4B:
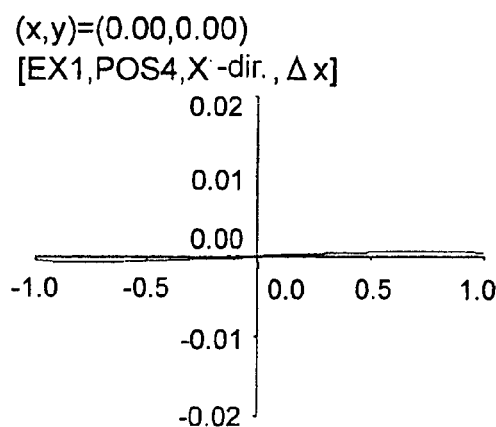
Figure 4E:
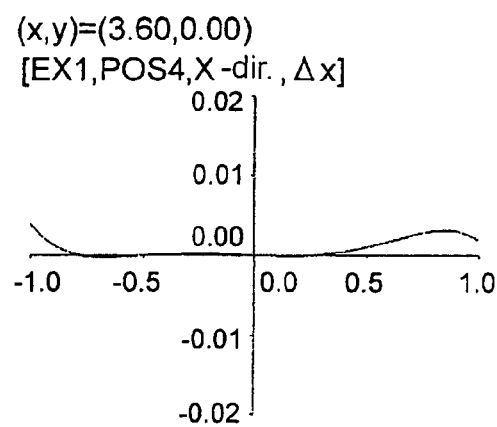
Figure 4C:
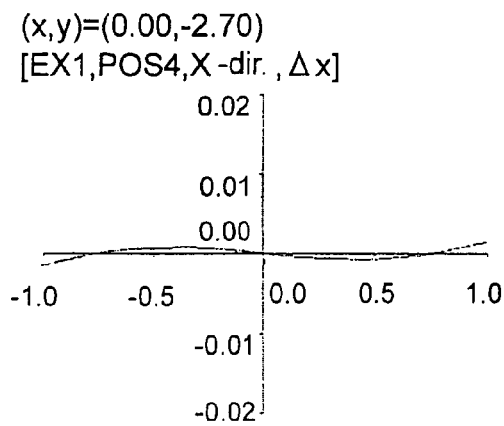
Figure 4F:
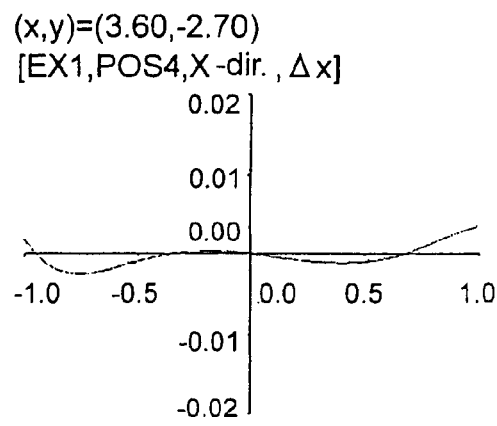
Figure 5A:
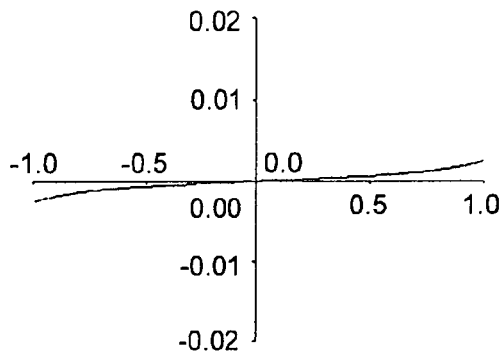
FIGS. 5A to 5F are lateral aberration diagrams showing $\Delta x$ in an X direction at the POS 6 of Example 1.
Figure 5D:
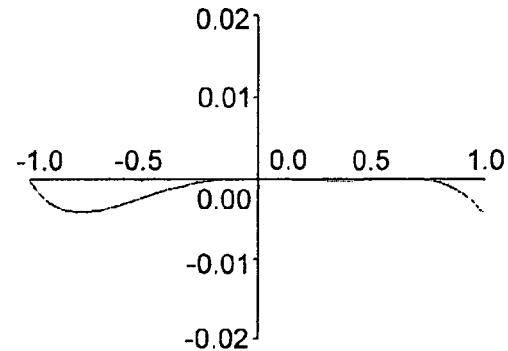
Figure 5B:
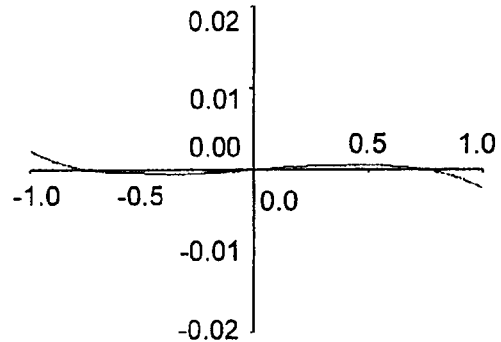
Figure 5E:
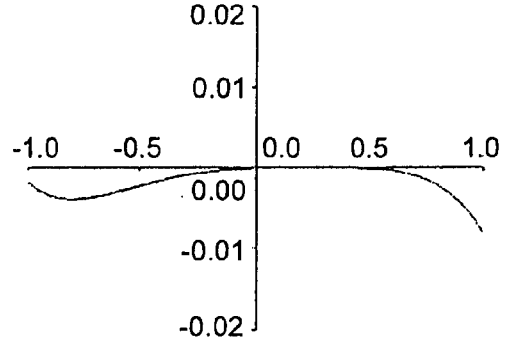
Figure 5C:
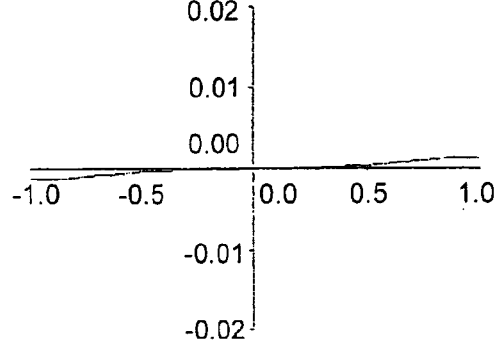
Figure 5F:
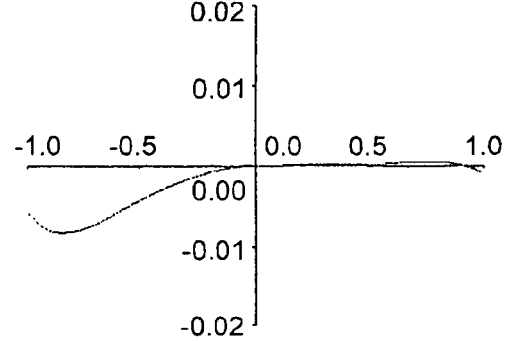
Figure 6A:
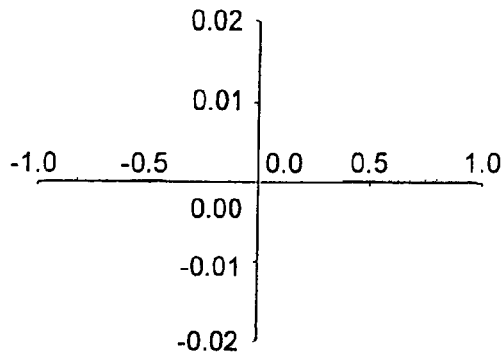
FIGS. 6A to 6F are lateral aberration diagrams showing $\Delta y$ in an X direction at the POS 1 of Example 1.
Figure 6D:
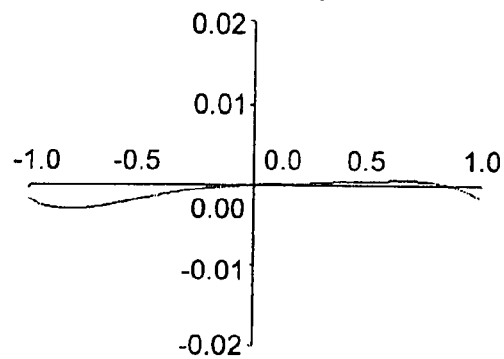
Figure 6B:
Figure 6E:
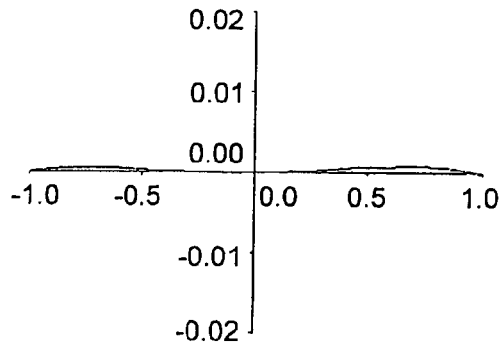
Figure 6C:
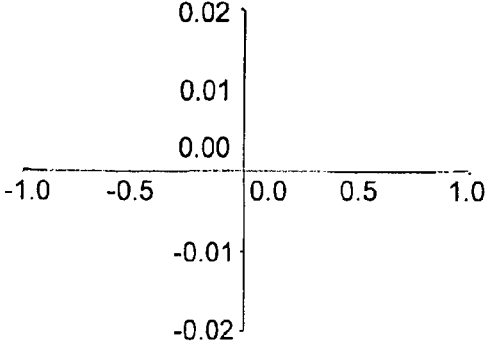
Figure 6F:
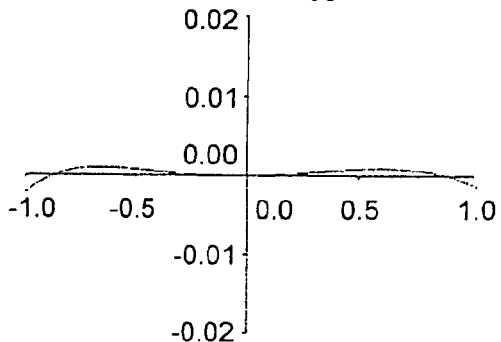
Figure 7A:
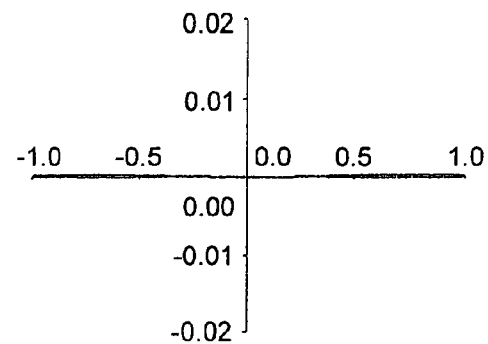
FIGS. 7A to 7F are lateral aberration diagrams showing $\Delta y$ in an X direction at the POS 4 of Example 1.
Figure 7D:
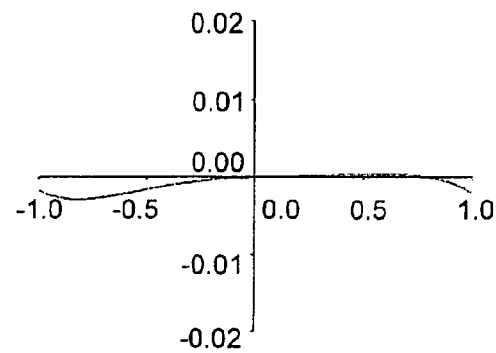
Figure 7B:
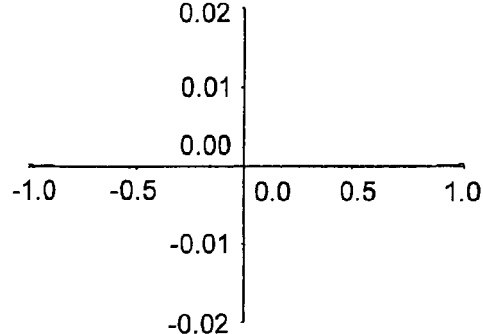
Figure 7E:
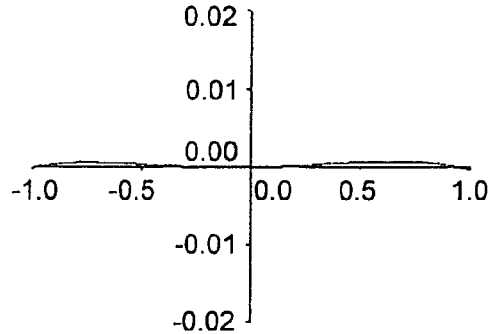
Figure 7C:
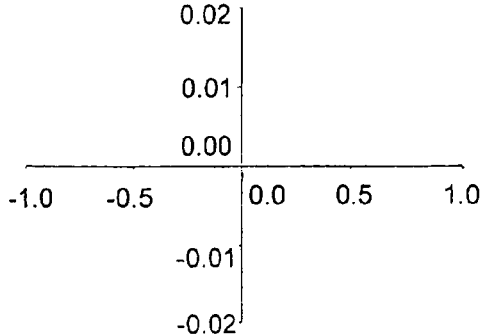
Figure 7F:
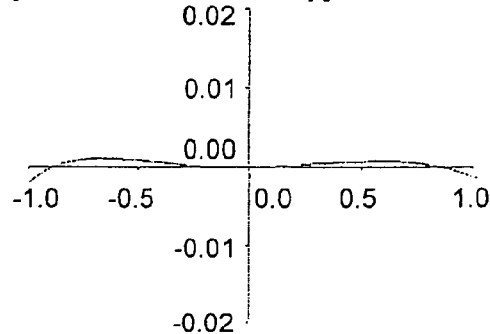
Figure 8A:
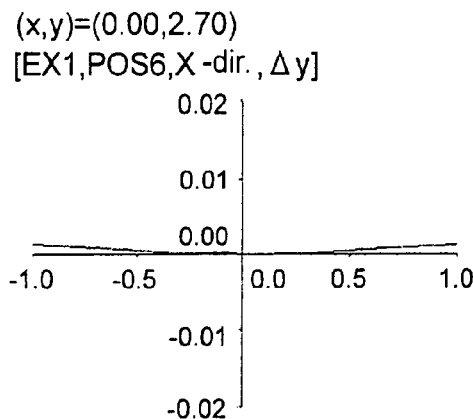
FIGS. 8A to 8F are lateral aberration diagrams showing $\Delta y$ in an X direction at the POS 6 of Example 1.
Figure 8D:
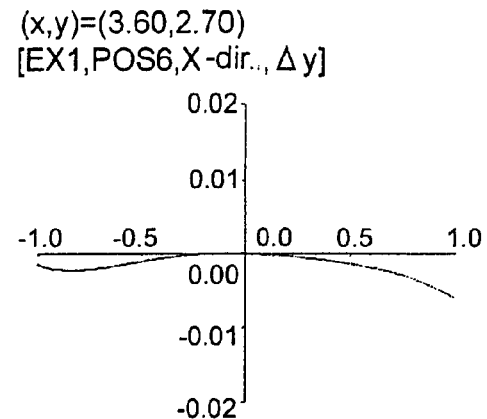
Figure 8B:
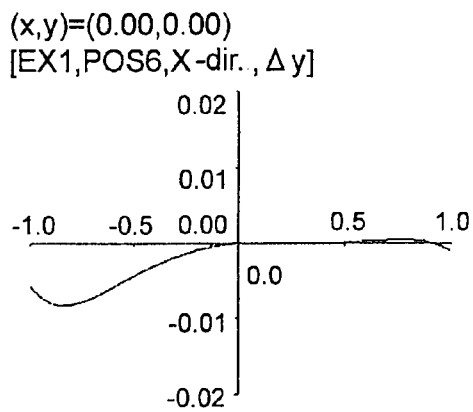
Figure 8E:
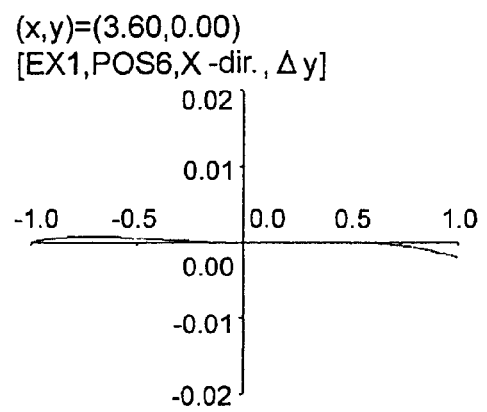
Figure 8C:
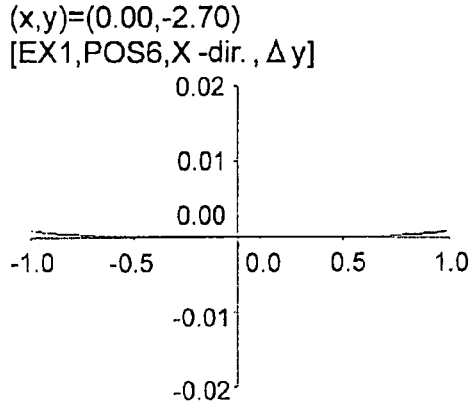
Figure 8F:
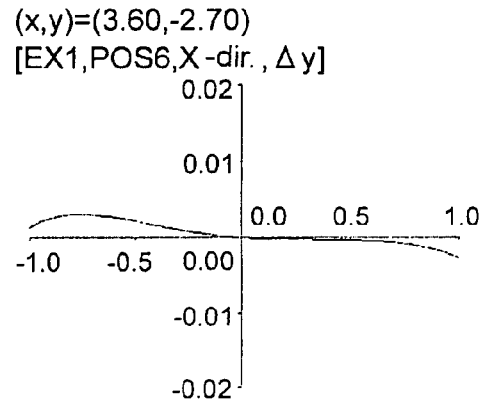
Figure 9A:
FIGS. 9A to 9F are lateral aberration diagrams showing $\Delta x$ in a Y direction at the POS 1 of Example 1.
Figure 9D:
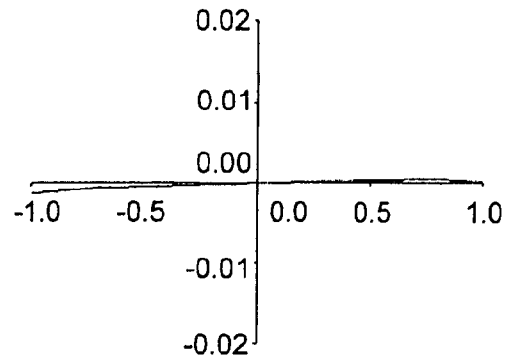
Figure 9B:
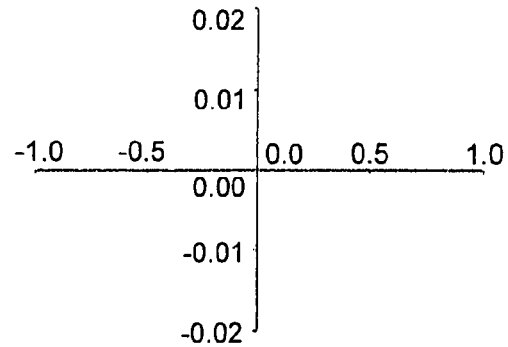
Figure 9E:
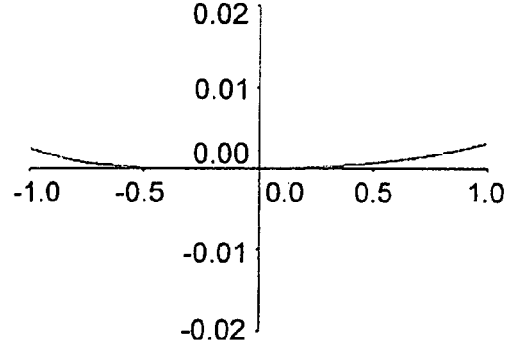
Figure 9C:
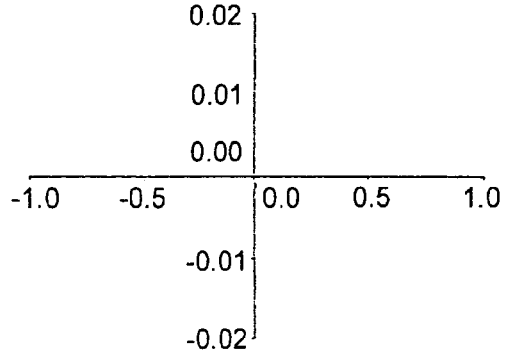
Figure 9F:
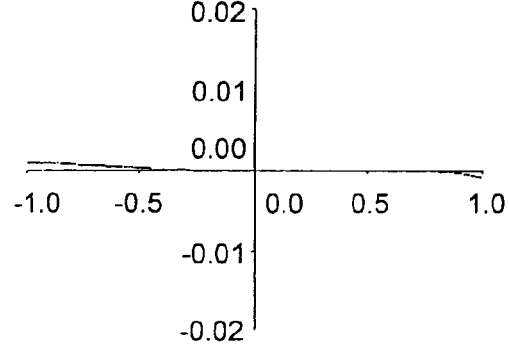
Figure 10A:
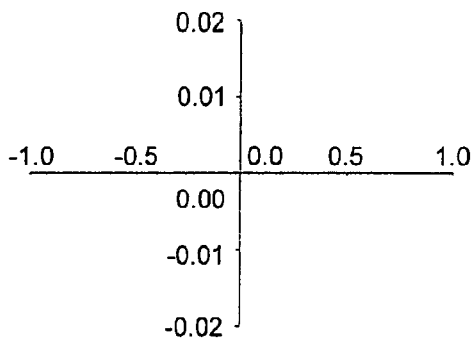
FIGS. 10A to 10F are lateral aberration diagrams showing $\Delta x$ in a Y direction at the POS 4 of Example 1.
Figure 10D:
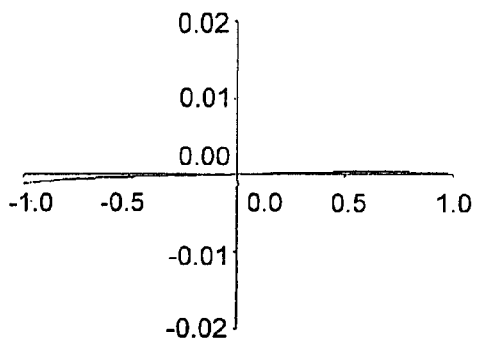
Figure 10B:
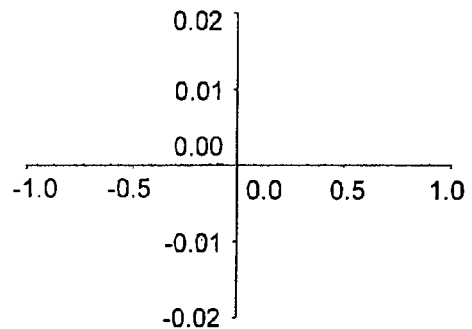
Figure 10E:
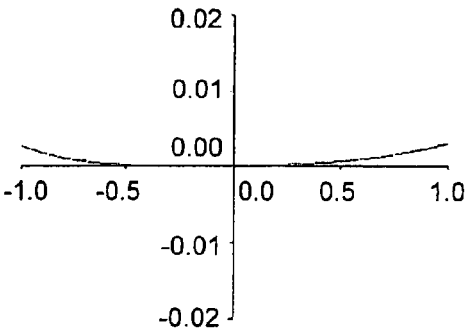
Figure 10C:
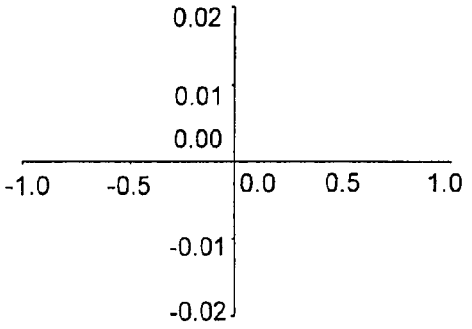
Figure 10F:
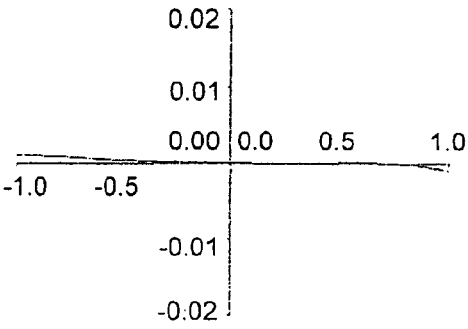
Figure 11A:
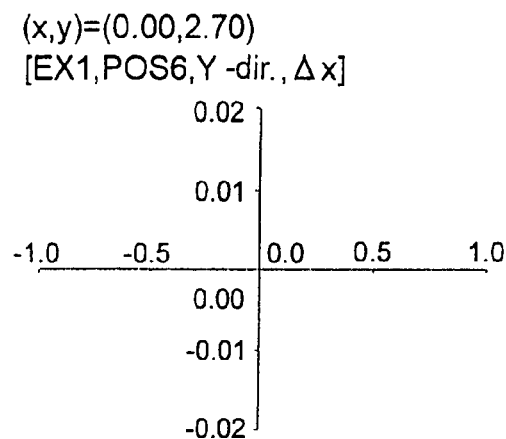
FIGS. 11A to 11F are lateral aberration diagrams showing $\Delta x$ in a Y direction at the POS 6 of Example 1.
Figure 11D:
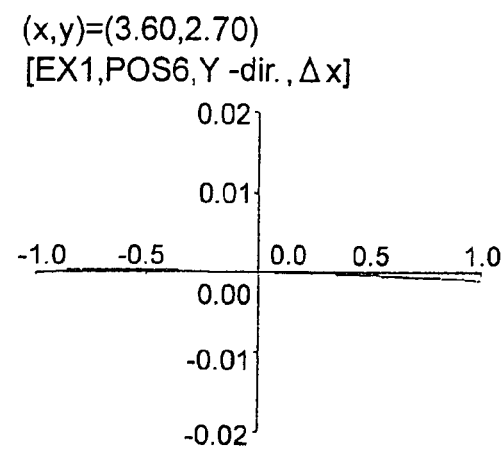
Figure 11B:
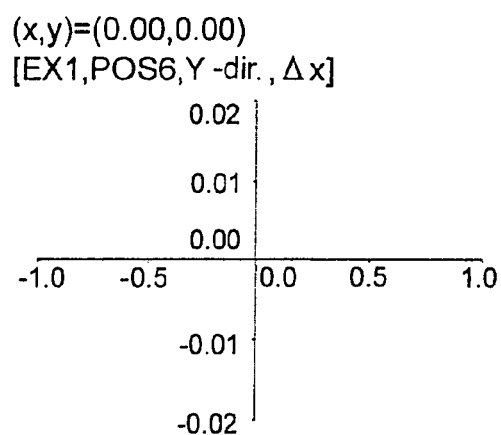
Figure 11E:
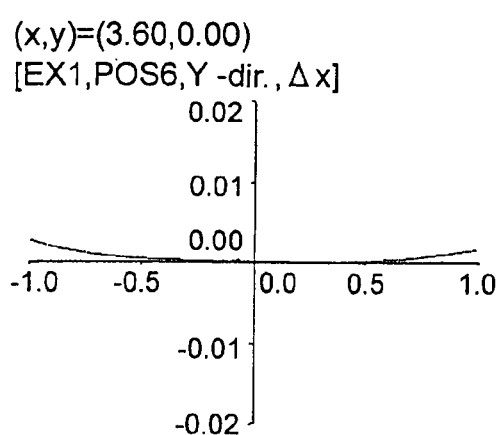
Figure 11C:
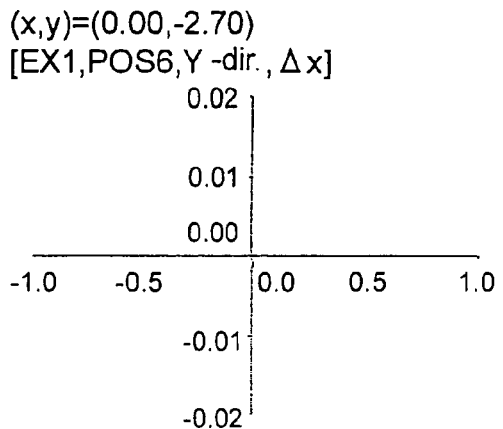
Figure 11F:
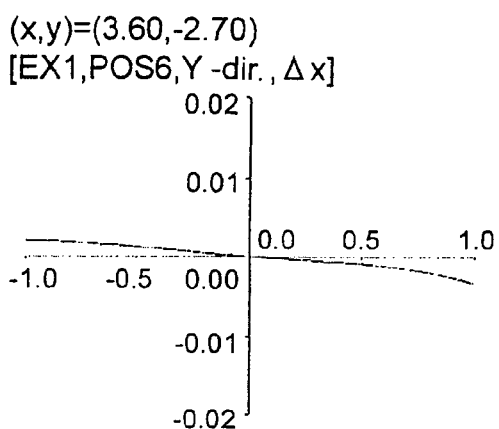
Figure 12A:
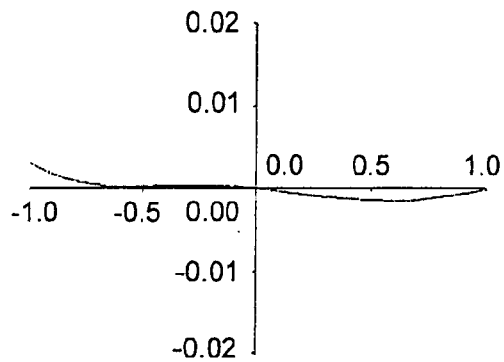
FIGS. 12A to 12F are lateral aberration diagrams showing $\Delta y$ in a Y direction at the POS 1 of Example 1.
Figure 12D:
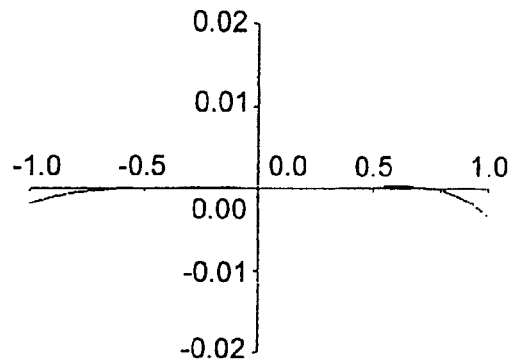
Figure 12B:
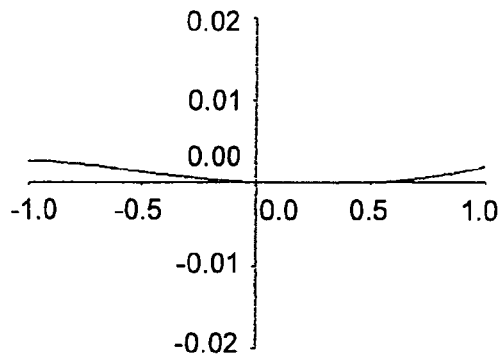
Figure 12E:
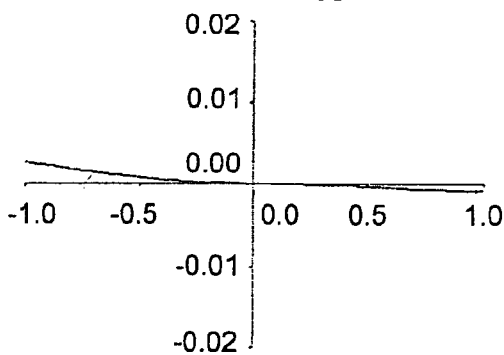
Figure 12C:
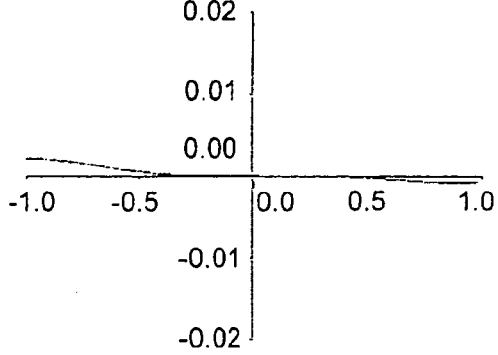
Figure 12F:
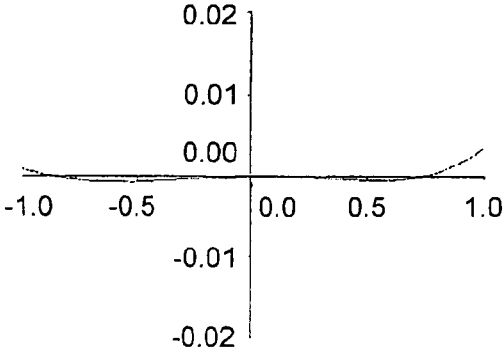
Figure 13A:
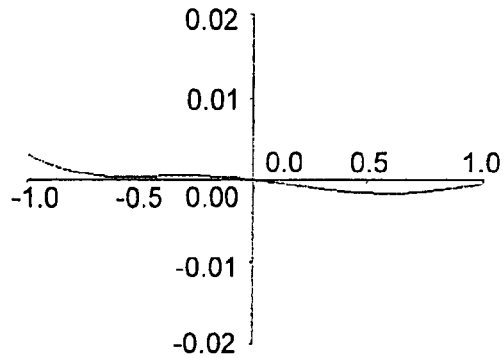
FIGS. 13A to 13F are lateral aberration diagrams showing $\Delta y$ in a Y direction at the POS 4 of Example 1.
Figure 13D:
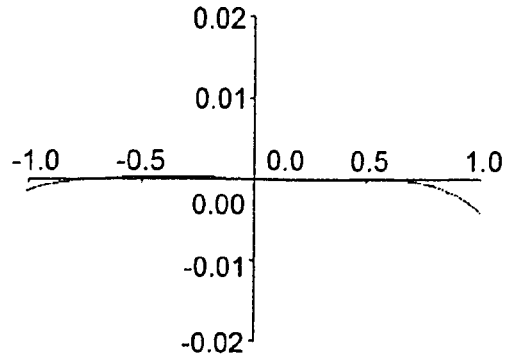
Figure 13B:
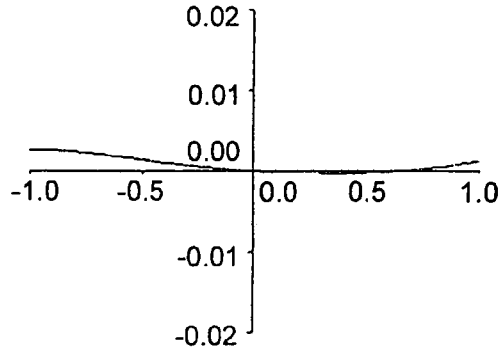
Figure 13E:
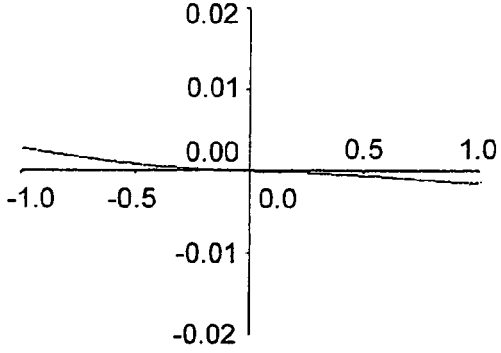
Figure 13C:
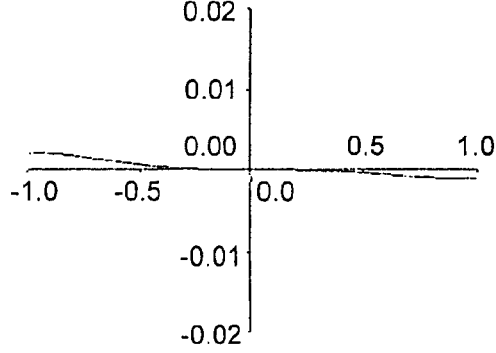
Figure 13F:
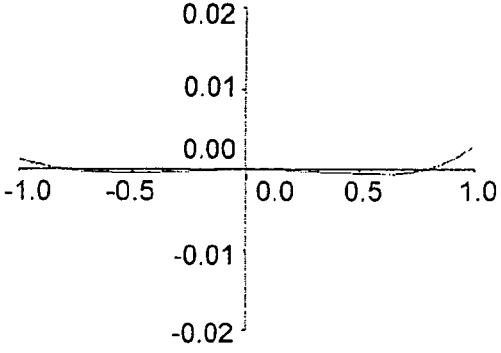
Figure 14A:
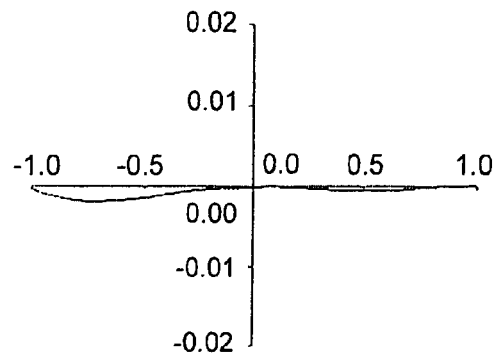
FIGS. 14A to 14F are lateral aberration diagrams showing $\Delta y$ in a Y direction at the POS 6 of Example 1.
Figure 14D:
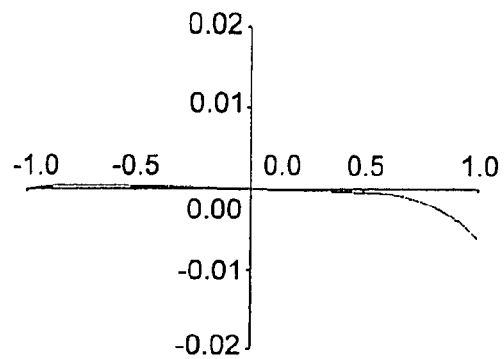
Figure 14B:
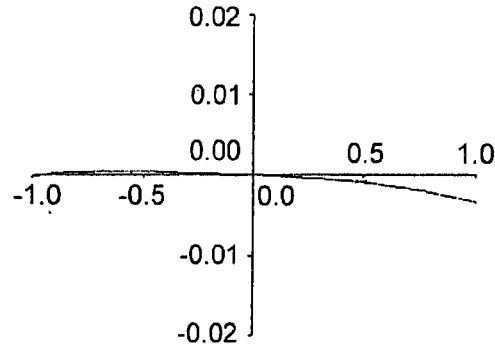
Figure 14E:
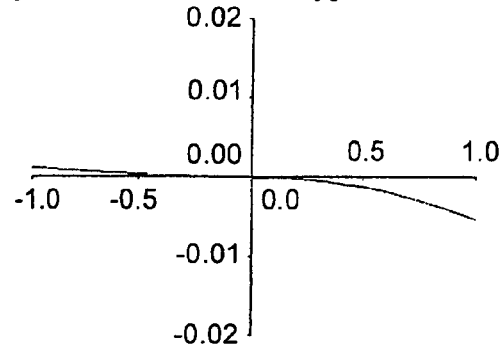
Figure 14C:
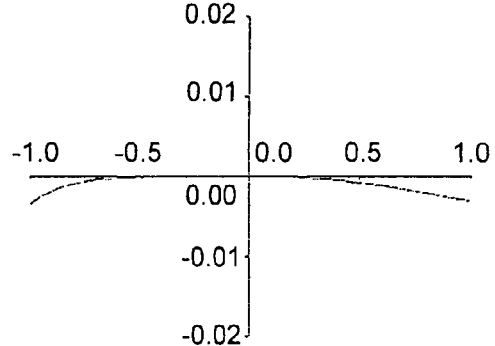
Figure 14F:
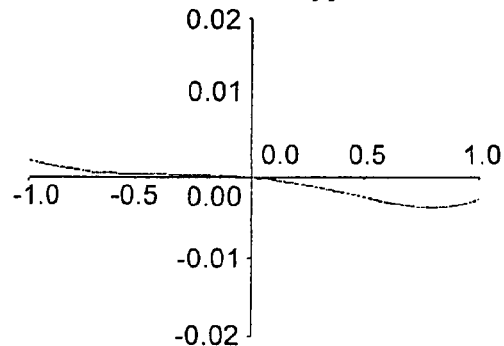
Figure 15:
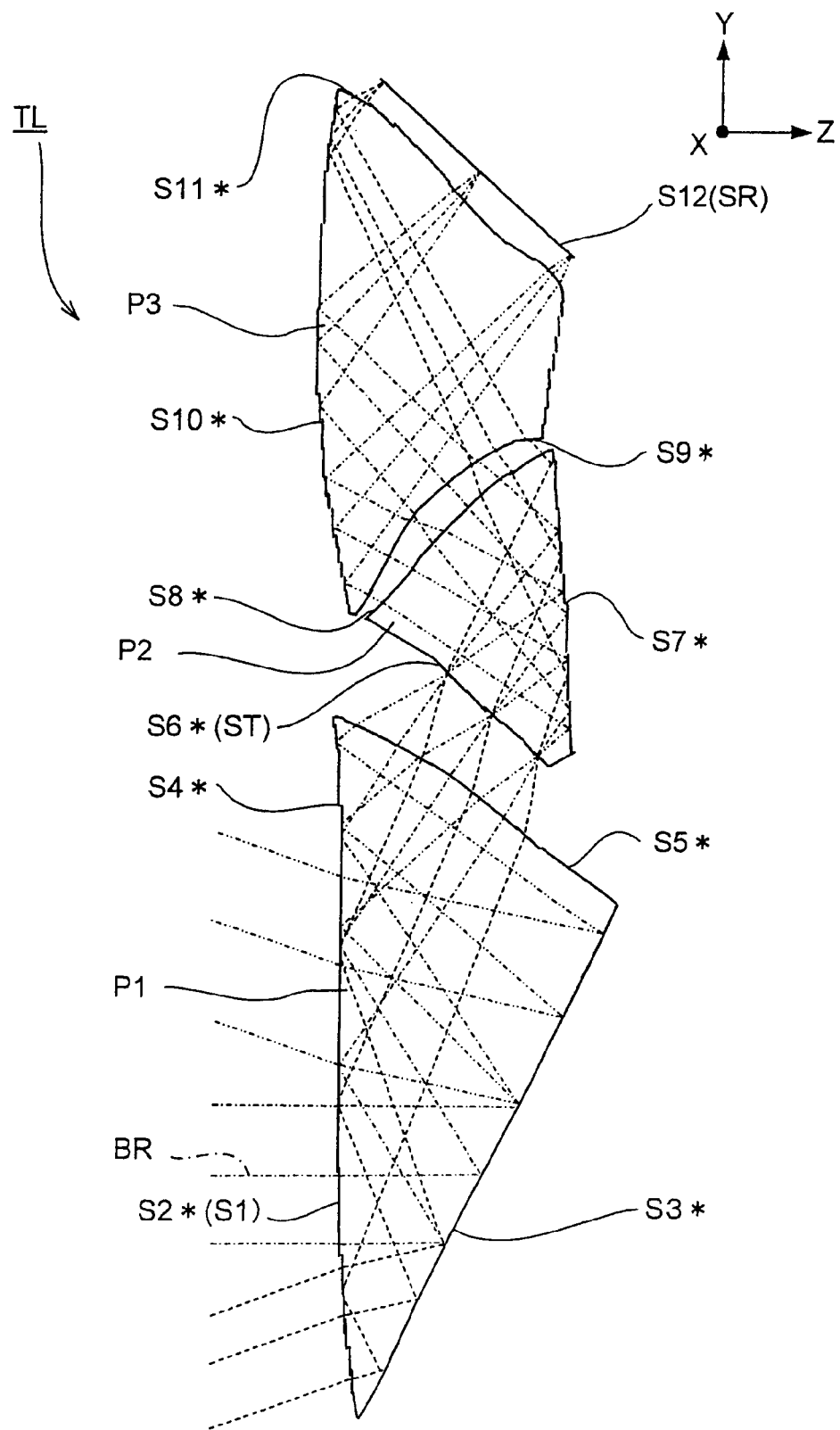
FIG. 15 is an optical configuration diagram of a second embodiment (Example 2)
Figure 17A:
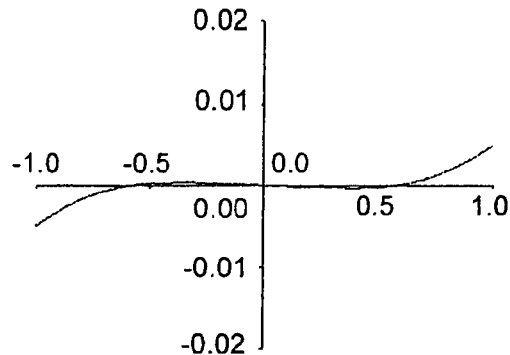
FIGS. 17A to 17F are lateral aberration diagrams showing $\Delta x$ in an X direction at the POS 1 of Example 2.
Figure 17D:
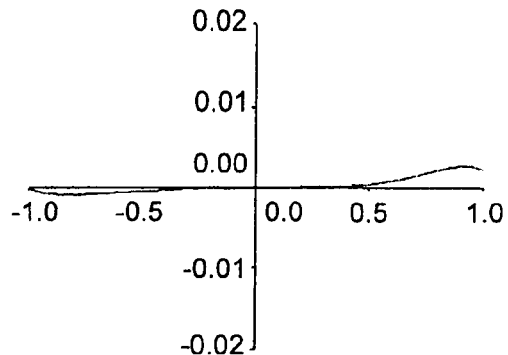
Figure 17B:
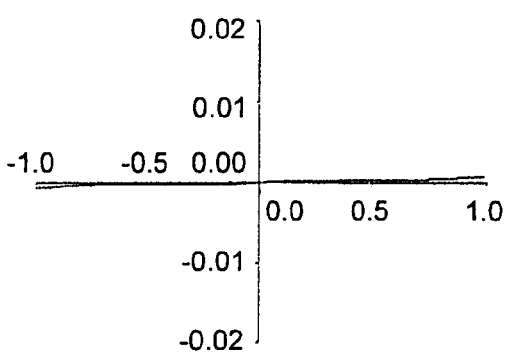
Figure 17E:
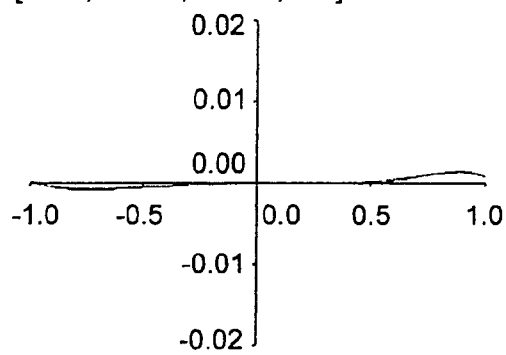
Figure 17C:
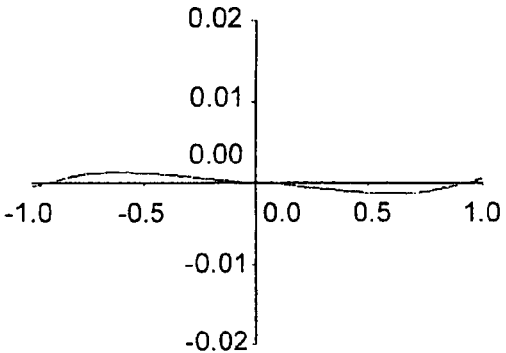
Figure 17F:
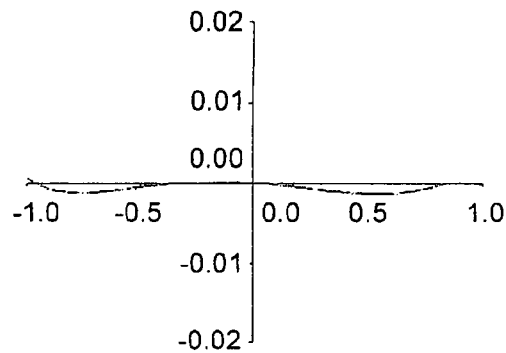
Figure 18A:
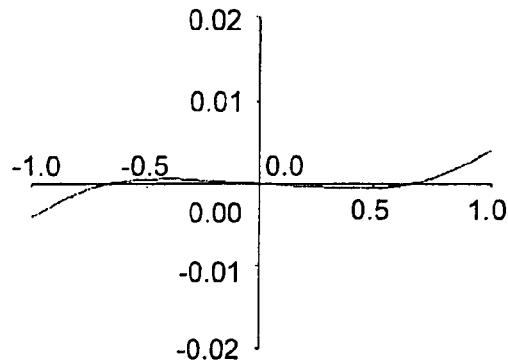
FIGS. 18A to 18F are lateral aberration diagrams showing $\Delta x$ in an X direction at the POS 4 of Example 2.
Figure 18D:
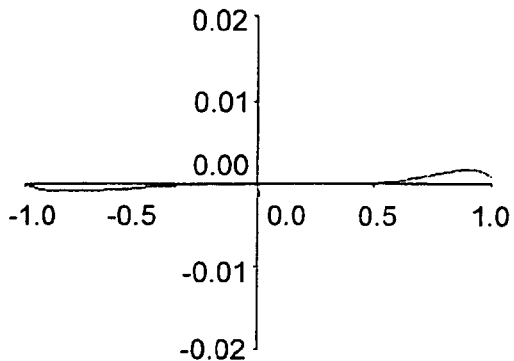
Figure 18B:
Figure 18E:
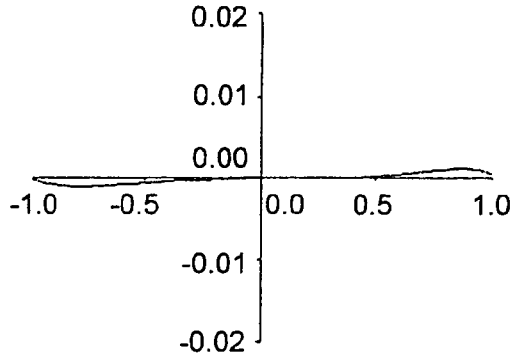
Figure 18C:
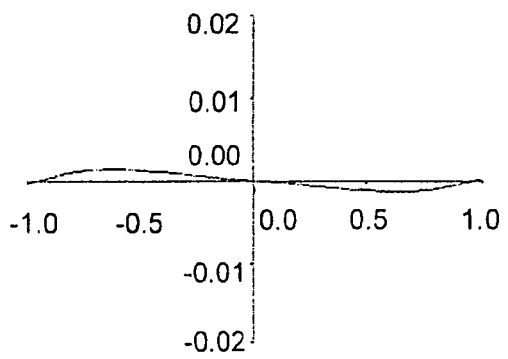
Figure 18F:
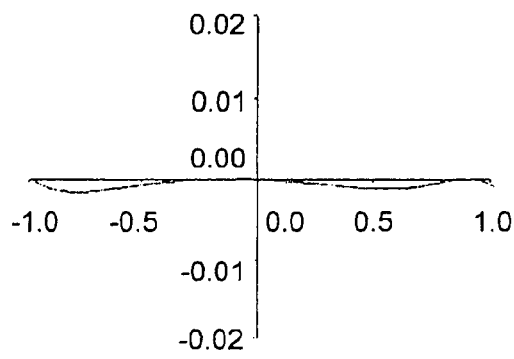
Figure 19A:
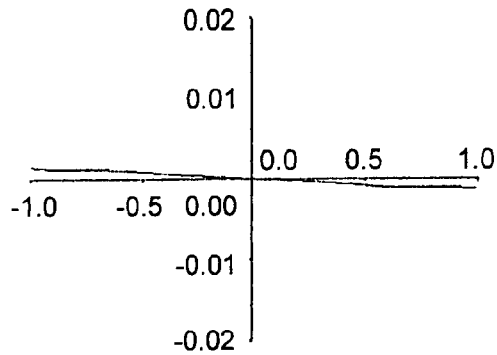
FIGS. 19A to 19F are lateral aberration diagrams showing $\Delta x$ in an X direction at the POS 6 of Example 2.
Figure 19D:
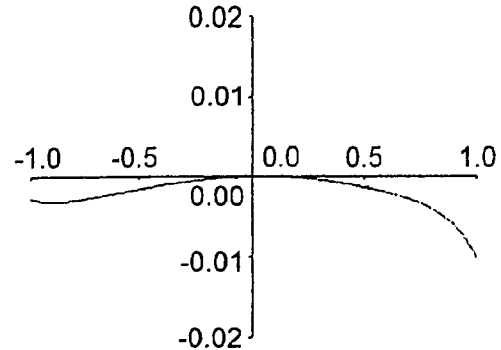
Figure 19B:
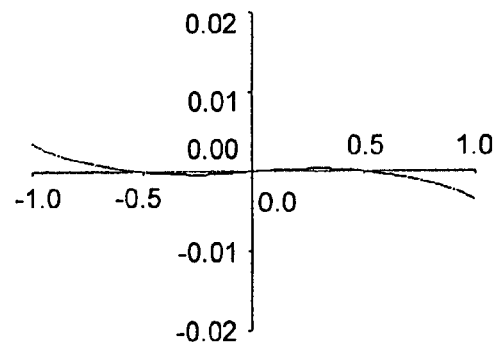
Figure 19E:
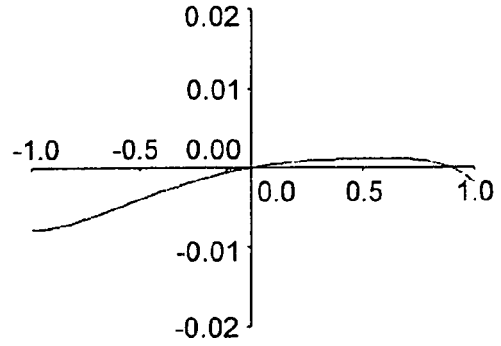
Figure 19C:
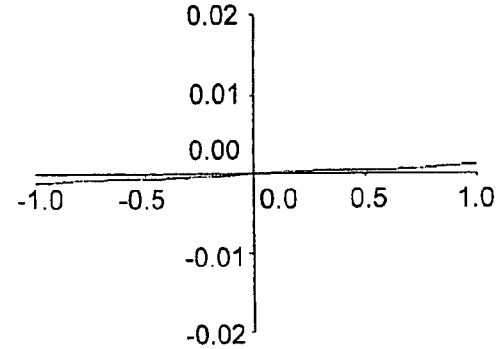
Figure 19F:
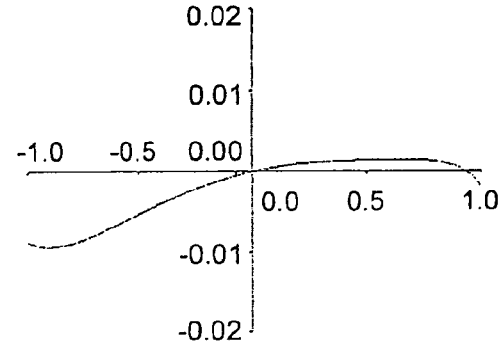
Figure 20A:
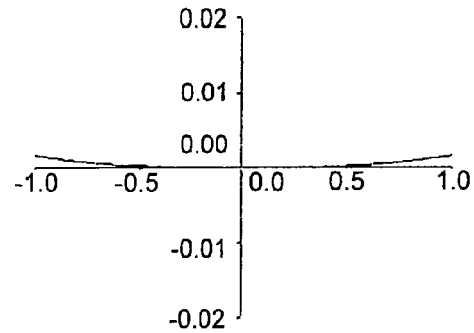
FIGS. 20A to 20F are lateral aberration diagrams showing $\Delta y$ in an X direction at the POS 1 of Example 2.
Figure 20D:
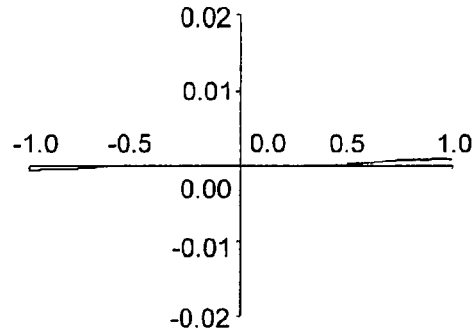
Figure 20B:
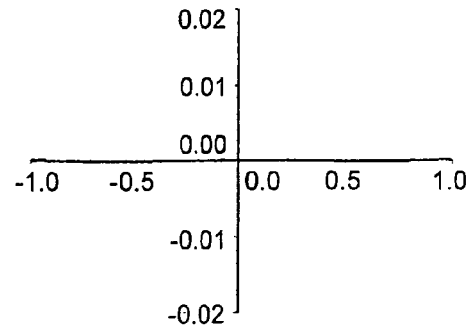
Figure 20E:
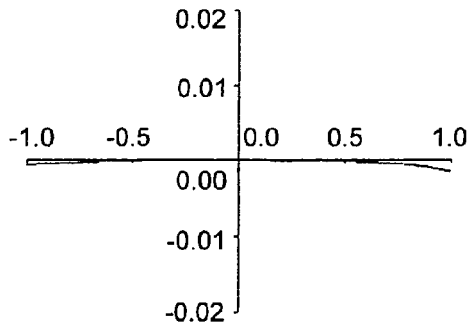
Figure 20C:
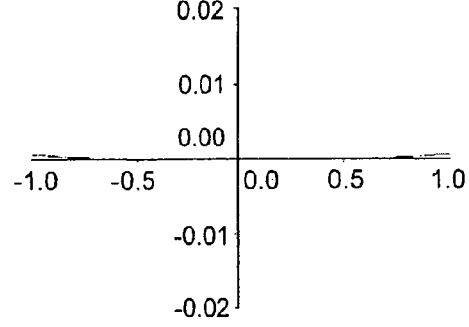
Figure 20F:
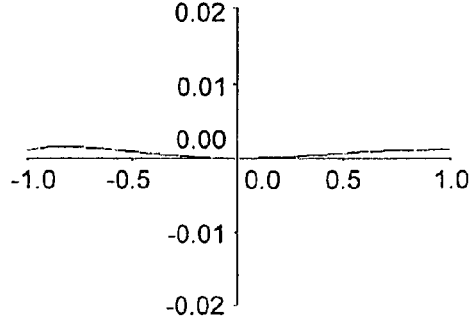
Figure 21A:
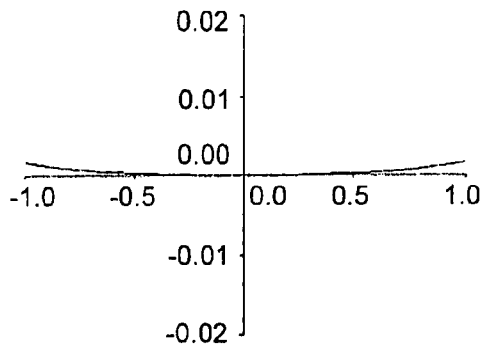
FIGS. 21A to 21F are lateral aberration diagrams showing $\Delta y$ in an X direction at the POS 4 of Example 2.
Figure 21D:
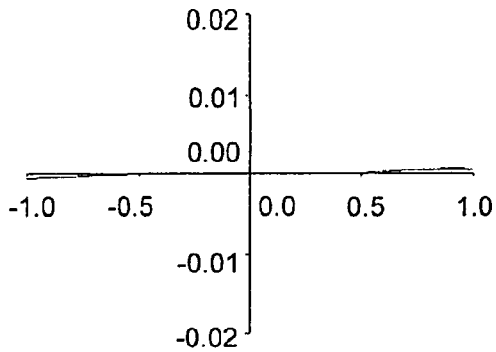
Figure 21B:
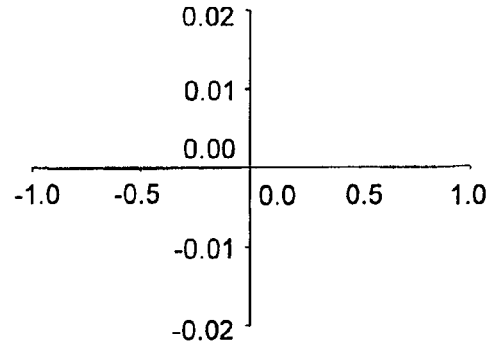
Figure 21E:
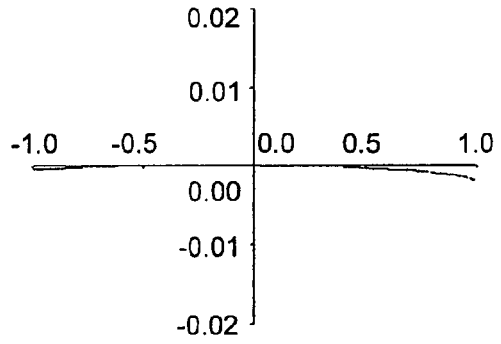
Figure 21C:
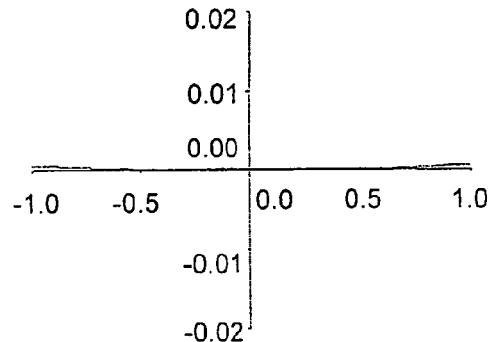
Figure 21F:
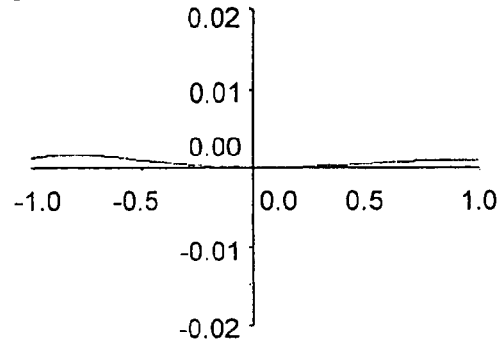
Figure 22A:
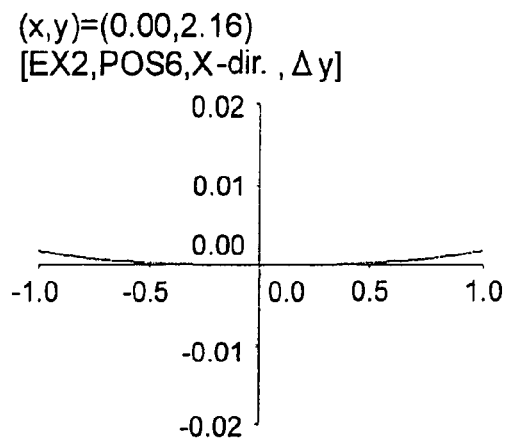
FIGS. 22A to 22F are lateral aberration diagrams showing $\Delta y$ in an X direction at the POS 6 of Example 2.
Figure 22D:
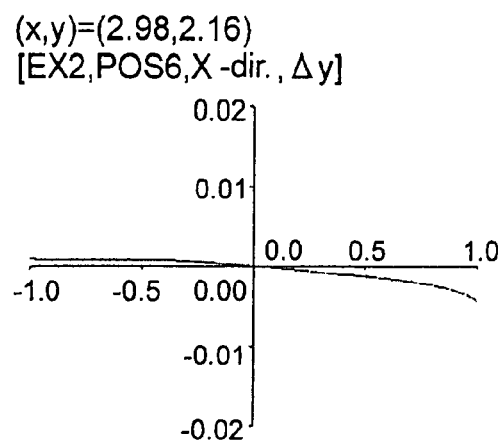
Figure 22B:
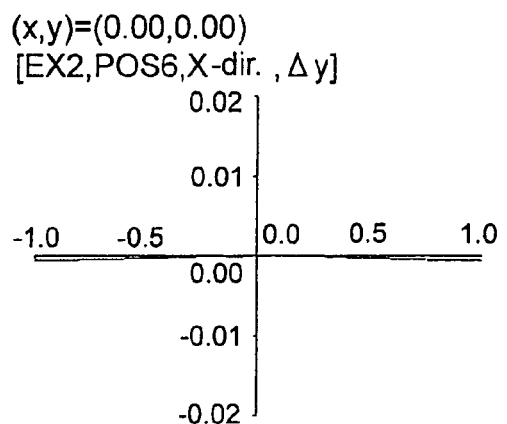
Figure 22E:
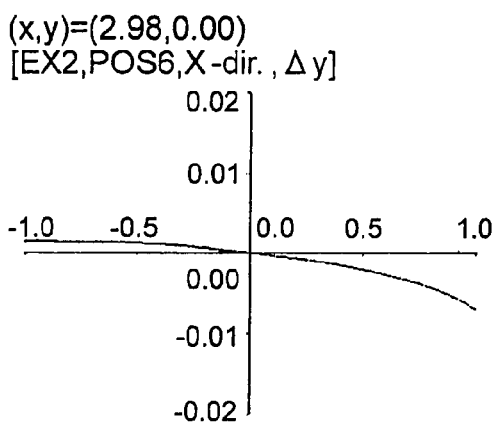
Figure 22C:
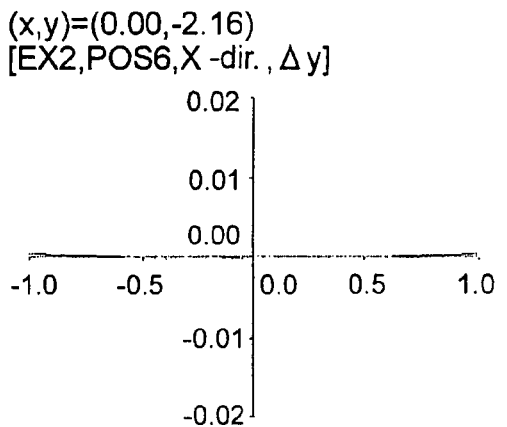
Figure 22F:
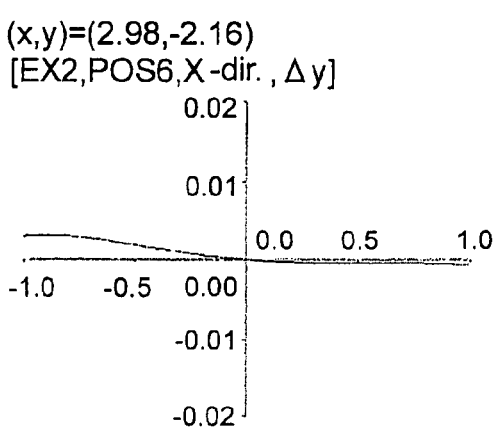
Figure 23A:
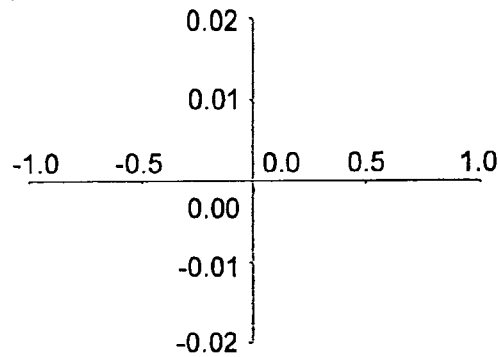
FIGS. 23A to 23F are lateral aberration diagrams showing $\Delta x$ in a Y direction at the POS 1 of Example 2.
Figure 23D:
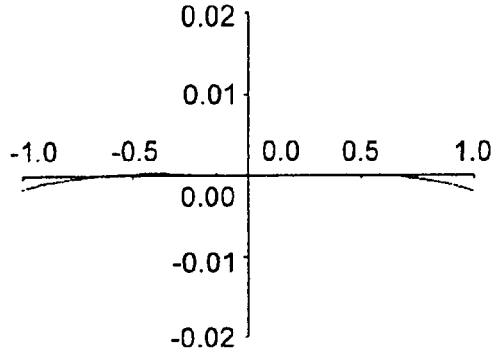
Figure 23B:
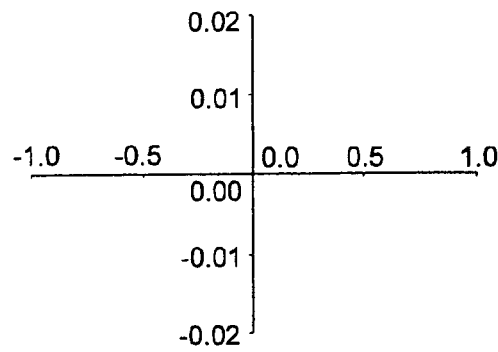
Figure 23E:
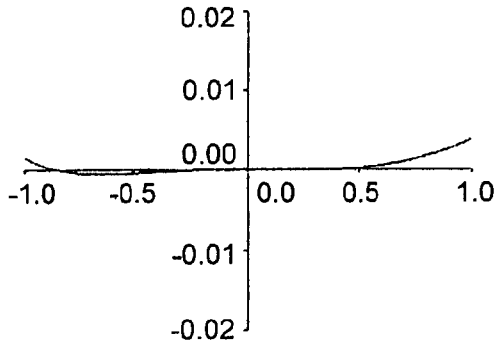
Figure 23C:
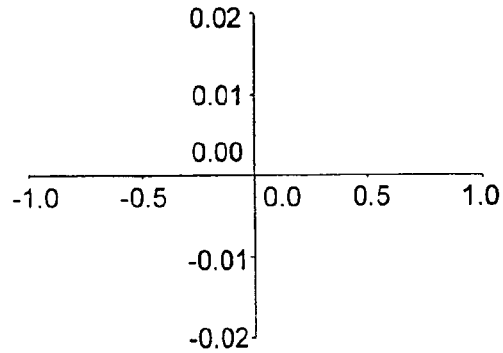
Figure 23F:
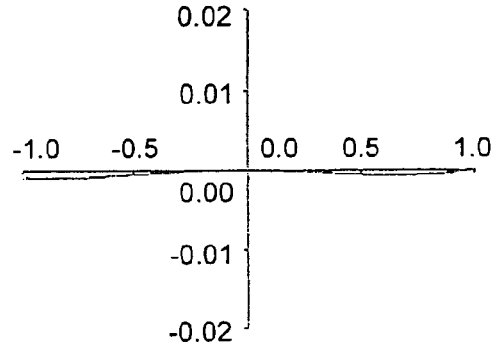
Figure 24A:
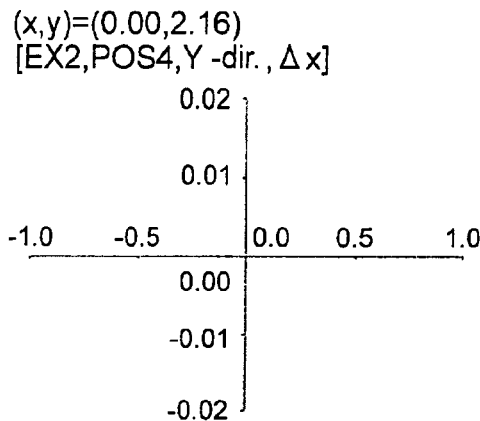
FIGS. 24A to 24F are lateral aberration diagrams showing $\Delta x$ in a Y direction at the POS 4 of Example 2.
Figure 24D:
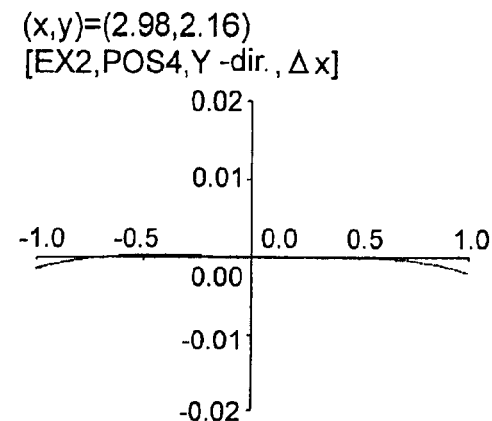
Figure 24B:
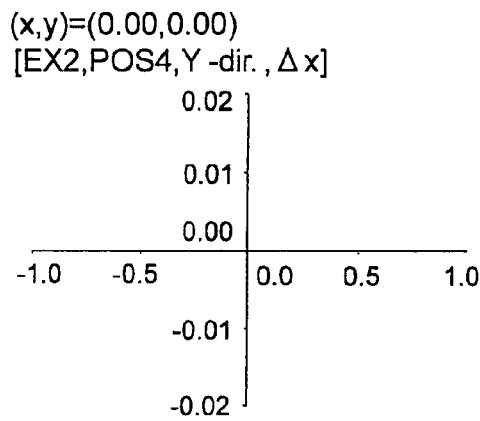
Figure 24E:
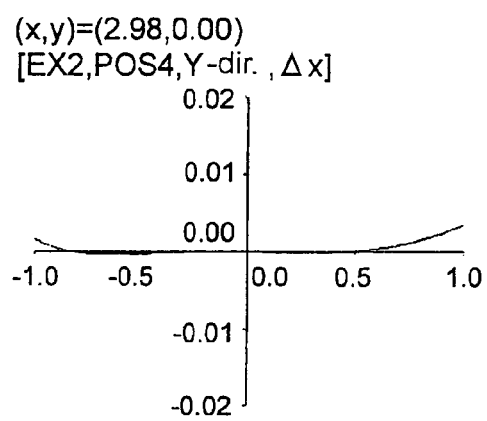
Figure 24C:
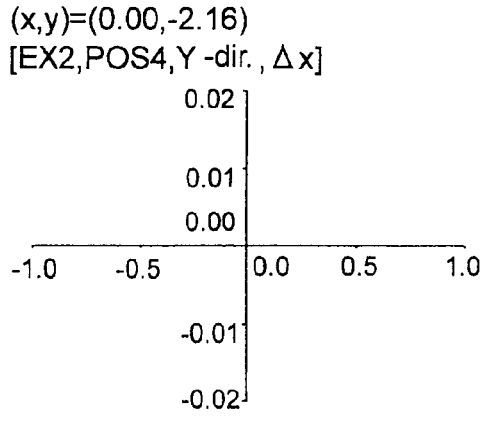
Figure 24F:
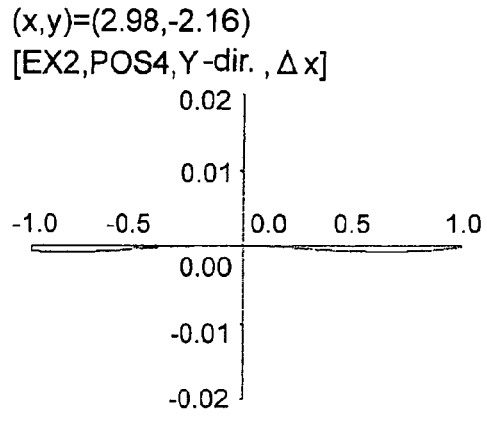
Figure 25A:
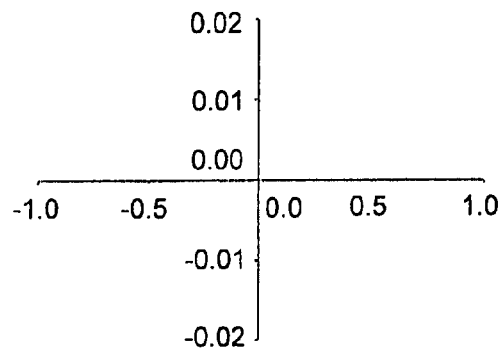
FIGS. 25A to 25F are lateral aberration diagrams showing $\Delta x$ in a Y direction at the POS 6 of Example 2.
Figure 25D:
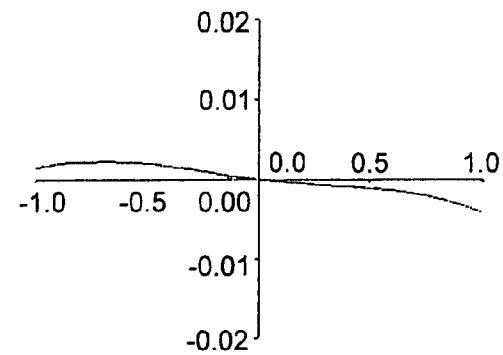
Figure 25B:
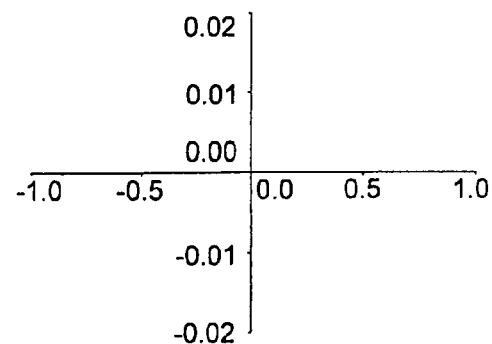
Figure 25E:
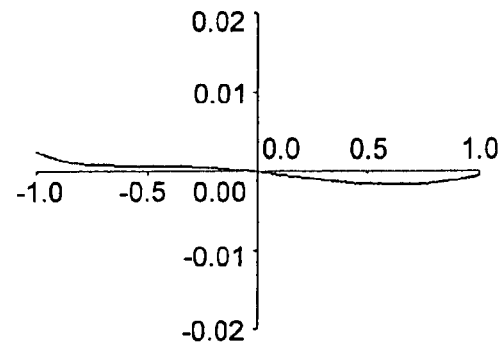
Figure 25C:
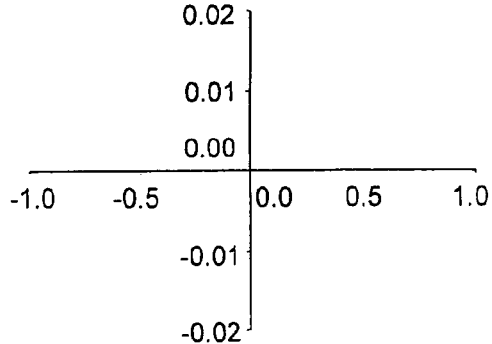
Figure 25F:
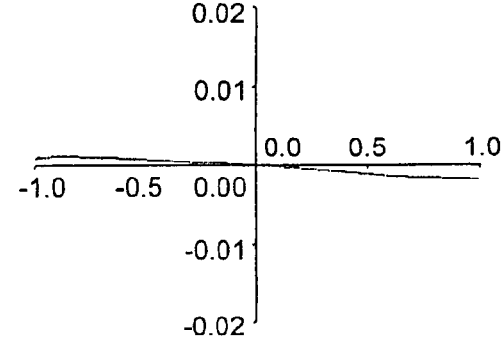
Figure 26A:
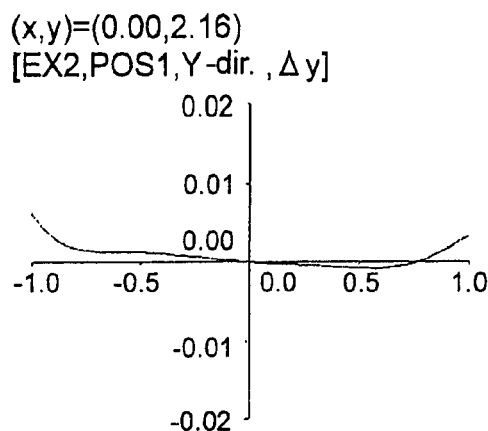
FIGS. 26A to 26F are lateral aberration diagrams showing $\Delta y$ in a Y direction at the POS 1 of Example 2.
Figure 26D:
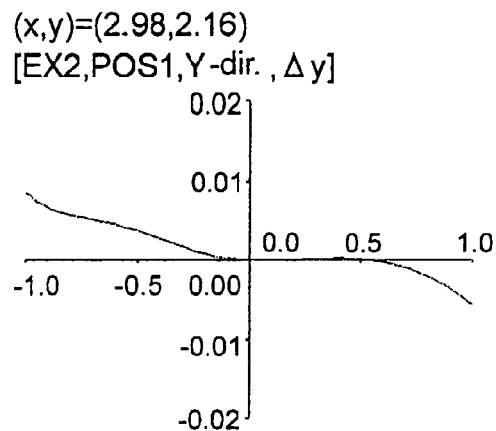
Figure 26B:
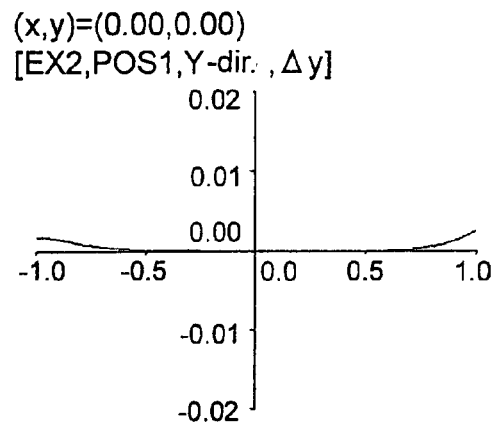
Figure 26E:
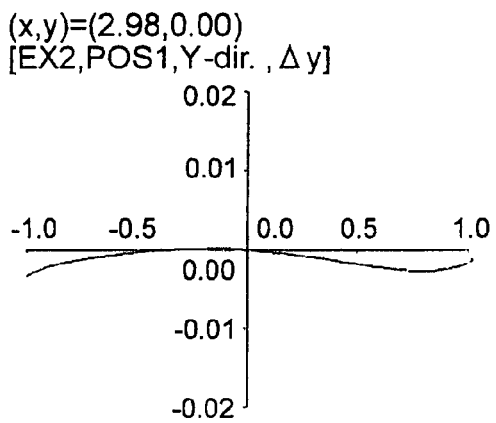
Figure 26C:
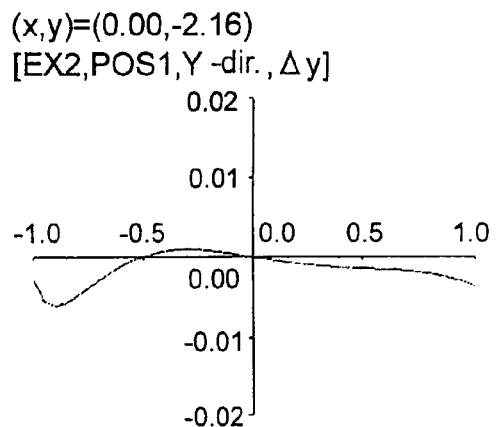
Figure 26F:
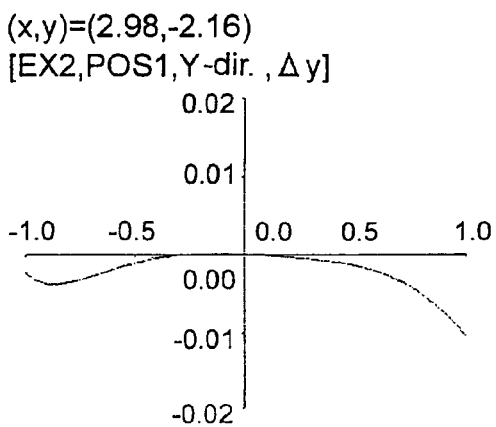
Figure 27A:
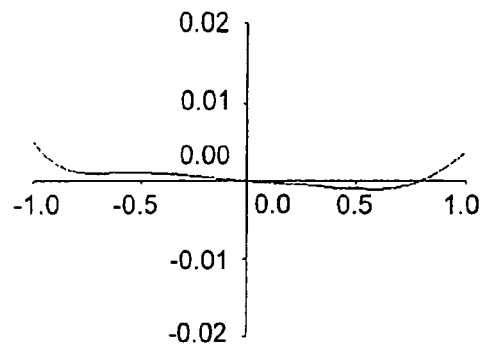
FIGS. 27A to 27F are lateral aberration diagrams showing Δy in a Y direction at the POS 4 of Example 2.
Figure 27D:
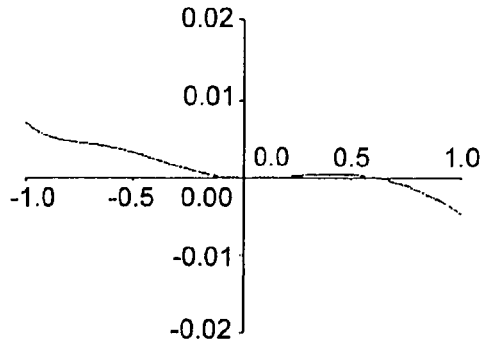
Figure 27B:
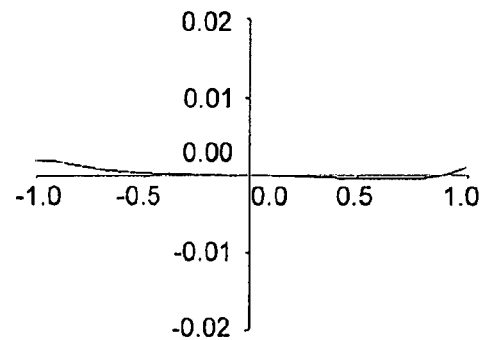
Figure 27E:
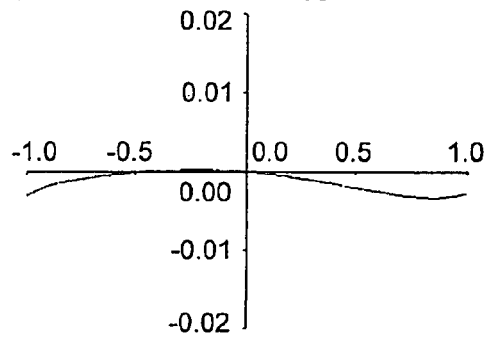
Figure 27C:
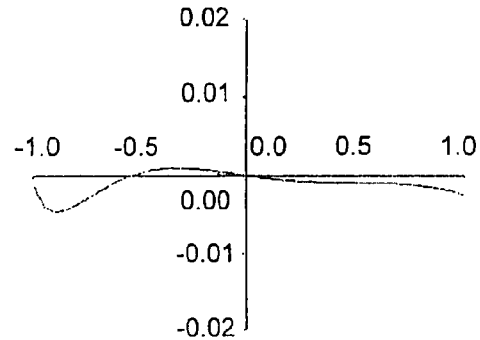
Figure 27F:
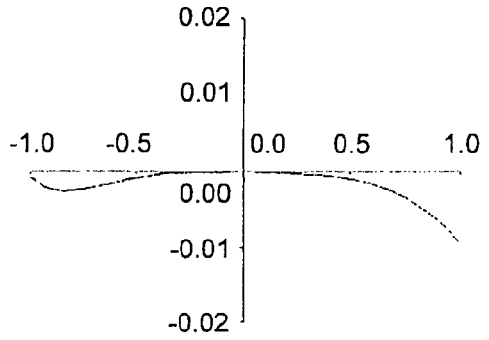
Figure 28A:
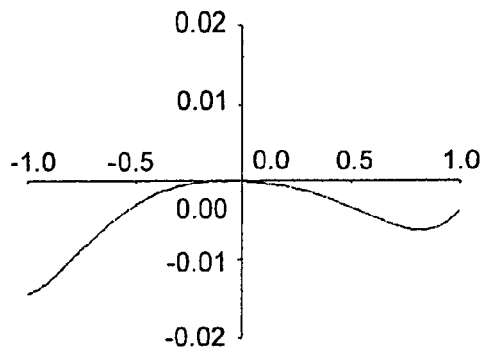
FIGS. 28A to 28F are lateral aberration diagrams showing Δy in a Y direction at the POS 6 of Example 2.
Figure 28D:
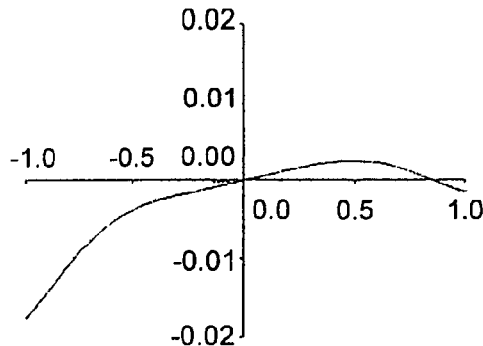
Figure 28B:
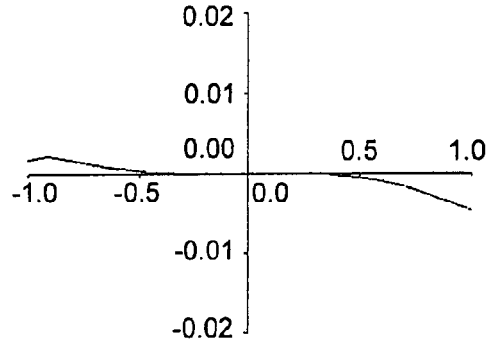
Figure 28E:
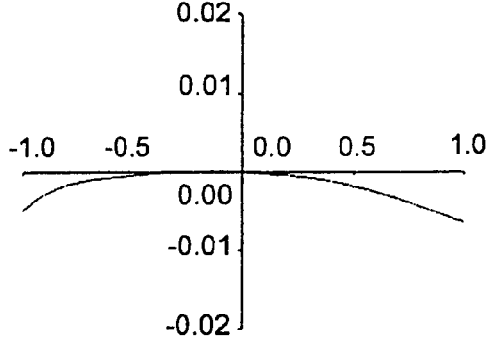
Figure 28C:
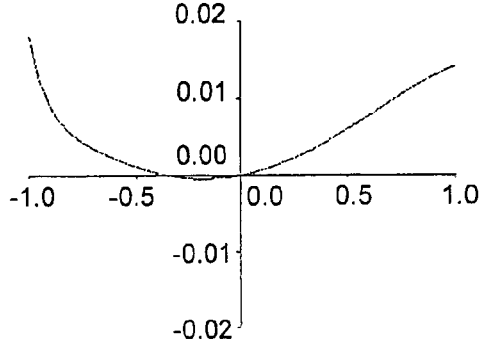
Figure 28F:
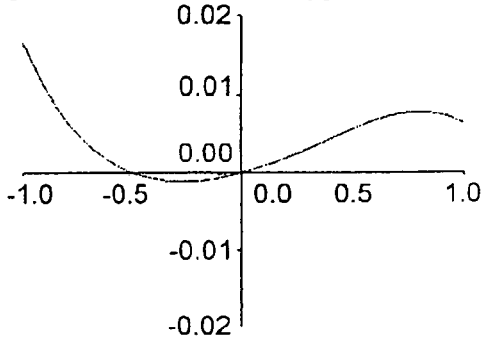

Hereinafter, embodiments of a focusing method according to the present invention will be described with reference to the accompanying drawings. FIGS. 1, 2A, 2B and 2C cross-sectionally show optical configuration of an image-taking optical system TL adopting the focusing method of the first embodiment. FIGS. 15, 16A, 16B and 16C cross-sectionally show optical configuration of an image-taking optical system TL adopting the focusing method of the second embodiment. FIGS. 2A and 16A respectively show optical positions, optical paths, and the like at a first focus position POS1, FIGS. 2B and 16B respectively show optical positions, optical paths, and the like at a fourth focus position POS4, and FIGS. 2C and 16C respectively show optical positions, optical paths, and the like at a sixth focus position POS6. In FIGS. 1 and 15, a surface provided with Si (where i=1, 2, 3, . . . ) is a surface located at the i-th position counted from the object side, a surface provided with an asterisk mark is a free-form surface, and the first surface S1 is a dummy surface (reference surface) for expressing the vertex position of each surface to be described later.

The image-taking optical systems TL according to the embodiments are each a single-focus optical system for forming an optical image of an object (that is, subject) on the light-receiving surface of an image sensor SR (a solid-state image sensor, for example, a CCD (Charge Coupled Device) or the like), and composed of three prism optical elements: in order from the object side, a first prism P1, a second prism P2, and a third prism P3 as a focusing group. Hereinafter, the optical configuration of the first and second embodiments will be described in the order on optical path.

In the first embodiment (FIG. 1), a second surface S2 as a most object side surface of the image-taking optical system TL is an incidence surface of the first prism P1. Rays of light incident on the image-taking optical system TL from the second surface S2 is reflected on a third surface S3 as a reflective surface (first reflective surface) and directed toward a fourth surface S4. The fourth surface S4 is a total-reflective surface (second reflective surface), and the rays of light reflected on the fourth surface S4 is transmitted through a fifth surface S5. The fifth surface S5 is an exit surface of the first prism P1, and the rays of light exiting the first prism P1 from the fifth surface S5 are directed to a sixth surface S6 serving as an aperture stop ST. The rays of light passing through the aperture stop ST of the sixth surface S6 are directed to the second prism P2. A seventh surface S7 as a most object side surface of the second prism P2 is an incidence surface of the second prism P2. The rays of light incident on the second prism P2 from the seventh surface S7 are reflected on an eighth surface S8 (third reflective surface) serving as a reflective surface and then directed to a ninth surface S9. The ninth surface S9 is an exit surface of the second prism P2, and the rays of light exiting the second prism P2 from the ninth surface S9 are made incident on a tenth surface S10 of the third prism P3. The tenth surface S10 is an incidence surface of the third prism P3, and the rays of light incident on the third prism P3 from the tenth surface S10 are reflected on an eleventh surface S11 (fourth reflective surface) serving as a reflective surface and then are transmitted through a twelfth surface S12. The surface S12 is an exit surface of the third prism P3, and the rays of light exiting the third prism P3 from surface S12 forms an optical image of a subject on a light-receiving surface S13 of the image sensor SR.

In the second embodiment (FIG. 15), a second surface S2 as a most object side surface of the image-taking optical system TL is an incidence surface of the first prism P1. Rays of light incident on the image-taking optical system TL from the second surface S2 is reflected on a third surface S3 as a reflective surface (first reflective surface) and directed toward a fourth surface S4. The fourth surface S4 is a total-reflective surface (second reflective surface), and the rays of light reflected on the fourth surface S4 is transmitted through a fifth surface S5. The fifth surface S5 is an exit surface of the first prism P1, and the rays of light exiting the first prism P1 from the fifth surface S5 are directed to the second prism P2. A sixth surface S6 as a most object side surface of the second prism P2 is an incidence surface of the second prism P2, and also serves as an aperture stop ST. The rays of light incident on the second prism P2 from the sixth surface S6 are reflected on a seventh surface S7 (third reflective surface) and then directed to an eighth surface S8. The eighth surface S8 is an exit surface of the second prism P2, and the rays of light exiting the second prism P2 from the eighth surface S8 is made incident on a ninth surface S9 of the third prism P3. The ninth surface S9 is an incidence surface of the third prism P3, and the rays of light incident on the third prism P3 from the ninth surface S9 are first reflected on a tenth surface S10 (fourth reflective surface) serving as a reflective surface and then are transmitted through an eleventh surface S11. The eleventh surface S11 is an exit surface of the third prism P3, and the rays of light exiting the third prism P3 from eleventh surface S11 forms an optical image of a subject on a light-receiving surface S12 of the image sensor SR.

As described above, the rays of light exiting the third prism P3 in the embodiments reach the light-receiving surface of the image sensor SR corresponding to an image surface (the thirteenth surface S13 in FIG. 1 and the twelfth surface S12 in FIG. 15) and form an optical images of the subject on the light-receiving surface of the image sensor SR. The optical image formed is converted into an electrical signal by the image sensor SR. Here, "image sensor" has a two-dimensional, flat light-receiving surface. The two-dimensional image sensor, which is wide both horizontally and vertically, employs a complicated image-taking optical system and has complicated aberration that deteriorates performance. To correct this, as in the embodiments, it is preferable that a rotationally asymmetric surface, such as a free-form surface, be used after appropriately set.

The image-taking optical system TL of the first embodiment has a plurality of optical surfaces S2 to S12 and the aperture stop ST, with the eleventh surface S11 provided as an eccentric reflective surface in the third prism P3. The image-taking optical system TL of the second embodiment has a plurality of optical surfaces S2 to S111 and the aperture stop ST, with the tenth surface S10 provided as an eccentric reflective surface in the third prism P3. In the first and second embodiments, focusing for keeping the position of an entire image substantially constant is achieved by parallel and rotational movement of the third prism P3 provided as a focusing group while keeping substantially constant the axial imaging position and the angle of incidence of an axial principal ray on the image surface. A focusing method for performing the focusing as described above for keeping the position of an entire image substantially constant while keeping substantially constant the axial imaging position by the parallel and rotational movement of a group provided as a focusing group having at least one eccentric reflective surface is applicable to an optical system having a plurality of optical surfaces, at least one of which is an eccentric reflective surface, and an aperture stop, although not limited to the optical system according to the embodiments. Hereinafter, their characteristic configuration, their effects, and the like will be described.

Typically, to provide a slim optical system, it is effective to arrange the optical system in a manner such that an optical path is bent by an eccentric reflective surface. This arrangement permits achieving an optical system having a considerably smaller thickness than a coaxial optical system. To put the optical system into practical use, a focusing function is required. The focusing function is maintaining imaging performance even at different conjugate distances. To this end, it is necessary that the image surface be kept substantially constant and further that the axial imaging position be not dislocated, even at different conjugate distances. In the coaxial optical system, focusing is typically achieved by moving the entire optical system or a partial focusing block thereof on the optical axis parallelly thereto.

Hereinafter, referring to an image-taking optical system as an example, a focusing method with different photographing distances, that is, with different object surface positions will be described. The coaxial optical system typically has an optical axis that is expressed by a straight line and that agrees with an axial principal ray. The focusing block (that is, focusing group) that moves upon focusing achieves focusing by moving on the optical axis parallelly thereto. That is, the focusing group, upon focusing, moves in directions parallel to an axial principal ray incident thereon (that is, axial incidence principal ray) and an axial principal ray exiting therefrom (that is, axial exit principal ray).

Now, consider an entire-movement focusing method in the coaxial optical system. When the photographing distance S1 and the photographing distance S2 are different, an image point at the photographing distance S1 and an image point at the photographing distance S2 are also formed at different positions on the optical axis. The entire-movement focusing method moves the entire system along the optical axis to match these different image point positions.

Figure 29:
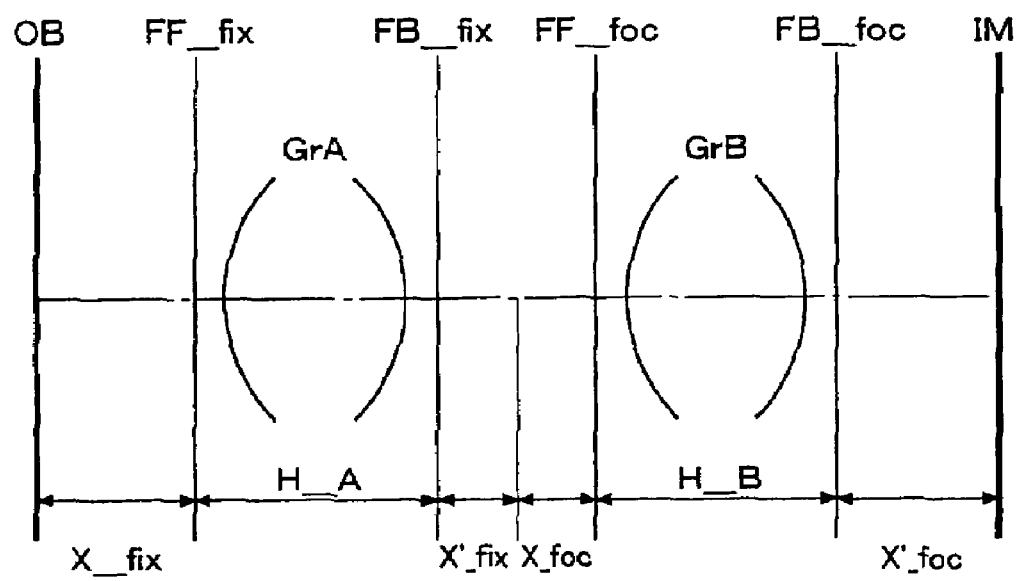
FIG. 29 is a pattern diagram for explaining rear focus of a coaxial optical system.

Next, consider an inner focusing method in the coaxial optical system. In particular, consider a method of focusing (so-called rear-focus) by moving a part of optical elements located on the image surface side. As is the case with the entire-movement focusing method, consider two conditions including the photographing distances S1 and S2. In this case, as shown in FIG. 29, a block of optical surfaces or elements moving during focusing is defined as a focusing group GrB, and a block of optical surfaces or elements not moving during focusing is defined as a fixed group GrA. In the rear-focus, the fixed group GrA is located on the object side and the focusing group GrB is located on the image side.

In FIG. 29, FF_fix denotes a front-side focus position of the fixed group GrA, FB_fix denotes a back-side focus position of the fixed group GrA, FF_foc denotes a front-side focus position of the focus group GrB, and FB_foc denotes a back-side focus position of the focus group GrB. X_fix denotes a distance from the front-side focus position FF_fix of the fixed group GrA to an object surface OB, X'_fix denotes a distance from the back-side focus position FB_fix of the fixed group GrA to an image point of the fixed group GrA, X_foc denotes a distance from the front-side focus position FF_foc of the focus group GrB to an object point of the focusing group GrB, and X'_foc denotes a distance from the back-side focus position FB_foc of the fixed group GrB to an image point IM of the focusing group GrB. H_A denotes a distance from the front-side focus position FF_fix of the fixed group GrA to the back-side focus position FB_fix thereof, and H_B denotes a distance from the front-side focus position FF_foc of the focusing group GrB to the back-side focus position FB_foc thereof. Here, for convenience sake, distance from the front-side focus position FF_fix of the fixed group GrA to the object surface OB is defined as the photographing distances S1 and S2.

Based on imaging relationship of the fixed group GrA, a relational formula (J1) below holds. In addition, based on imaging relationship of the focusing group GrB, a relational formula (J2) below holds.

$$(X\_fix)(X'\_fix) = -(f'\_fix)^2 \qquad (J1)$$

$$(X\_foc)(X'\_foc) = -(f'\_foc)^2 \qquad (J2)$$

where f'_fix denotes a focal length of the fixed group GrA; and f'_foc denotes a focal length of the focusing group GrB.

To keep constant the positions of the image surface IM at the two photographing distances S1 and S2, the focusing group GrB may be moved so that a formula (J3) below holds when the image point position of the fixed group GrA and the object point position of the focusing group GrB are brought into agreement with each other. That is, the focusing group GrB may be moved so that the image point positions of the focusing group GrB at the different photographing distances S1 and S2, when the image point position of the fixed group GrA is provided as the object point position of the focusing group GrB, agree with each other. Therefore, when the formula (J3) below holds, the image surface is constant even at the different photographing distances.

$$(X'\_fix)_{S1} - (X\_foc)_{S1} + (X'\_foc)_{S1} = (X'\_fix)_{S2} - (X\_foc)_{S2} + (X'\_foc)_{S2} \qquad (J3)$$

where parameters at the photographing distance S1 are suffixed with S1 and parameters at the photographing distance S2 are suffixed with S2.

Next, consider a non-coaxial optical system. Here, a focusing method performed for the non-coaxial optical system will be described in detail, referring to an image-taking optical system as an example. As is the case with the coaxial optical system, the description refers to rear-focus, although the focusing method is not limited thereto. This focusing method is also applicable in the same manner to, for example, front focus, inner focus, and entire-movement focus. Moreover, this focusing method is applicable not only to the image-taking optical system but also to any optical systems, such as a projection optical system and the like.

Figure 30:
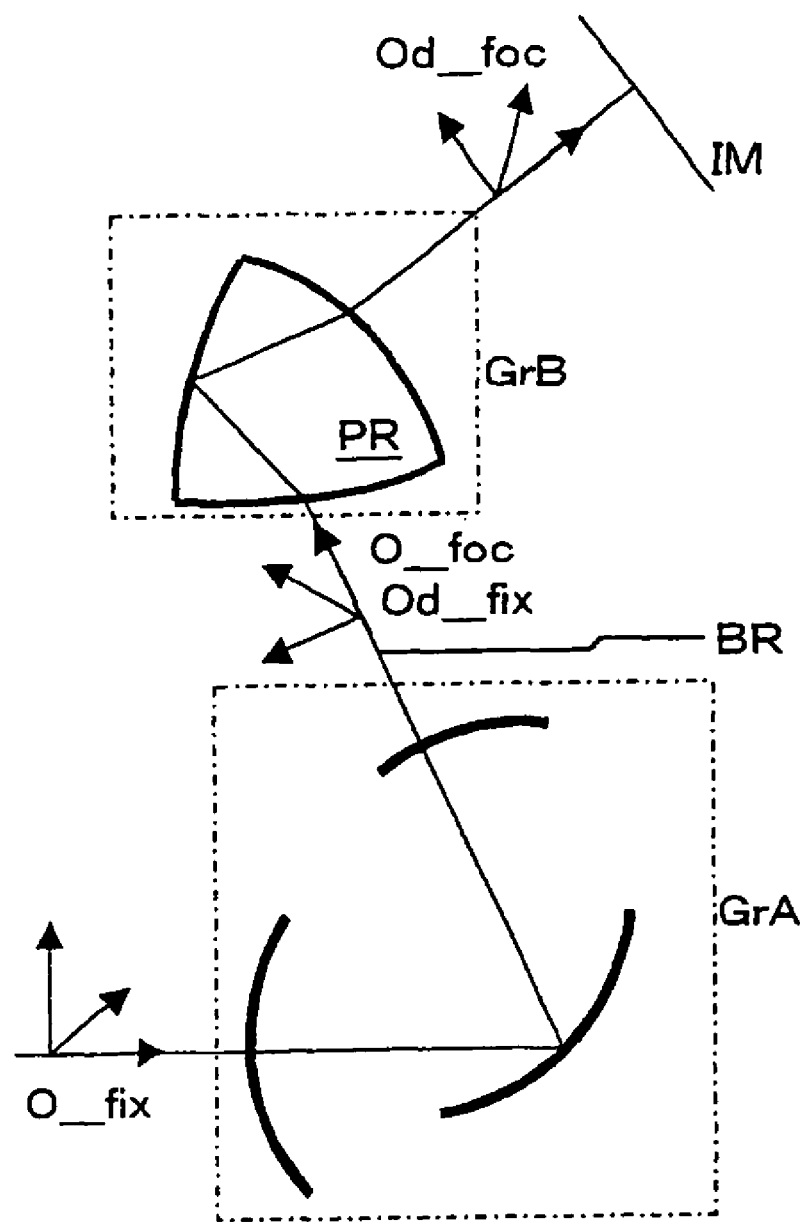
FIG. 30 is a pattern diagram for explaining rear focus of a non-coaxial optical system.

In this description, a characteristic function based on Hamilton's method is used, and a first-order characteristic function matrix in particular is used which is introduced in a paper "B. D. Stone and G. W. Forbes, "Foundations of first-order layout for asymmetric systems: an application of Hamilton's methods" J. Opt. Soc. Am. A 9, 96-109 (1992)". Now the first-order characteristic function matrix is defined as an angle characteristic function matrix. Again, consider a non-coaxial optical system having a fixed group GrA as a front-side group and a focusing group GrB as a back-side group, as shown in FIG. 30. Note that each of these groups can be formed with any of a single optical surface, a plurality of optical surfaces, a single optical element, or a plurality of optical elements, and that the focusing group is a group of those which are moved integrally or independently during focusing.

The non-coaxial optical system typically has no optical axis formed with such a straight line that is present in the coaxial optical system. Thus, a ray, instead of an optical axis, is considered as a reference. This ray passes through the center of the aperture stop from the center of an object and then reaches the center of the image surface. This is a principal ray of axial rays, and called "base ray". This ray serves as a reference but is not a straight line as is formed by the coaxial optical system. Also in the non-coaxial optical system, focusing is so performed as to satisfy the imaging relationship by moving the focusing group. However, since the base ray is not a straight line, simple parallel movement of the entire or part of the optical system usually moves the base ray. Specifically, the parallel movement of the focusing group GrB shown in FIG. 30 changes the incidence position of a base ray BR on the focusing group GrB, thus changing the passage position, exit position, and direction of the base ray BR. In this case, the direction of the base ray traveling toward the image surface IM changes, thus moving the position of the base ray BR on the image surface IM, that is, axial imaging position. Occurrence of such a phenomenon results in movement of the axial position (center position) during focusing, whereby the image moves or wobbles during focusing. Further, the dislocation of the center results in lack of a portion at the image periphery. In any case, practicality is lost.

Figure 31A:
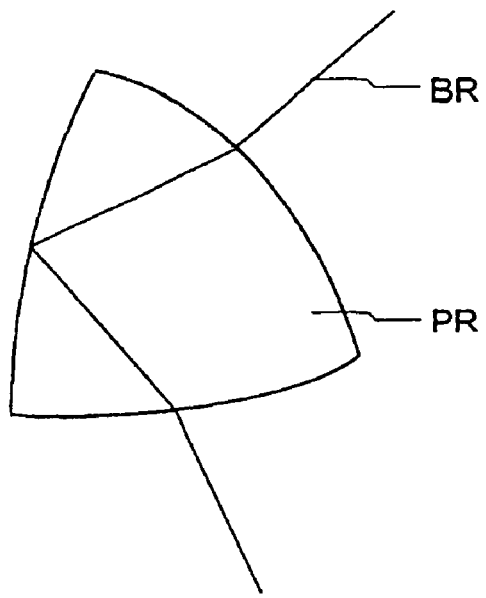
FIGS. 31A to 31C are pattern diagrams for explaining movement of a base ray caused by parallel movement of a triangular prism having an eccentric reflection surface in the non-coaxial optical system shown in FIG. 30.
Figure 31B:
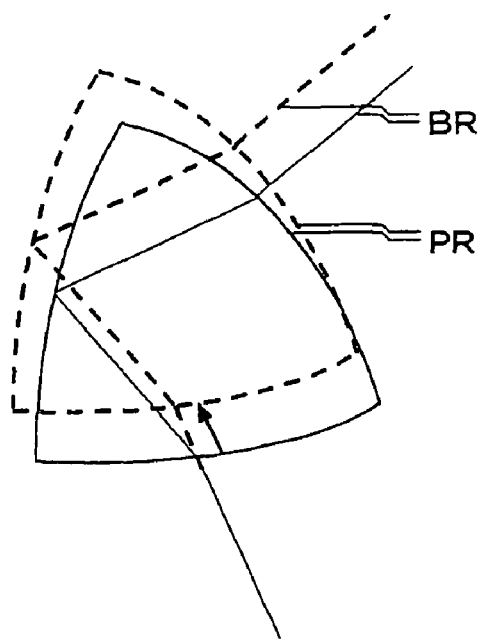
Figure 31C:
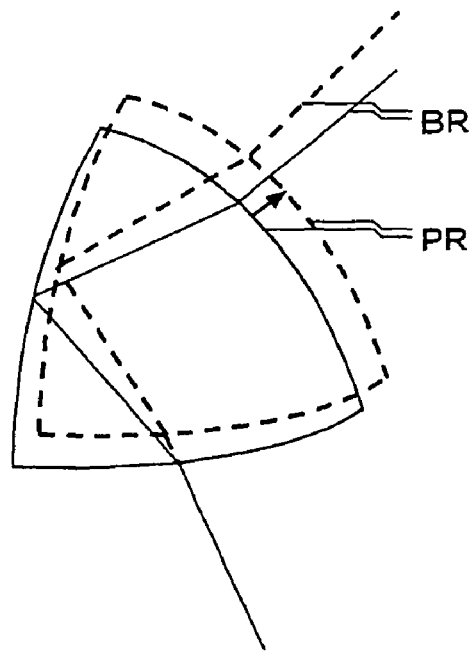

Failure to keep the axial exit principal ray constant only by parallel movement will be described, referring to, as an example, a triangular prism PR (focusing group GrB in FIG. 30) having an eccentric reflective surface. FIG. 31A shows condition of the base ray BR passing through the triangular prism PR at a given photographing distance. FIG. 31B pictures condition of the passage of the base ray BR when the triangular prism PR is parallely moved toward the axial incidence principal ray (base ray BR) (where the position after the movement is indicated by a broken line). As can be understood from FIG. 31B, the axial exit principal ray (base ray BR) is dislocated from the original ray position (indicated by a solid line). FIG. 31C pictures condition of the passage of the base ray BR when the triangular prism PR is parallely moved toward the axial exit principal ray (base ray BR) (where the position after the movement is indicated by a broken line). Also in this case, it can be figured out that the axial exit principal ray (base ray BR) is dislocated from the original ray position (indicated by a solid line).

As described above, the parallel movement of the triangular prism PR dislocates the axial exit principal ray in any of the cases. This phenomenon does not occur when the axial incidence principal ray and axial exit principal ray of the focusing group are parallel to each other and are moved in this direction. However, such arrangement is extraordinary in the non-coaxial optical system in many cases. Moreover, such arrangement reduces the effect of bending the optical path and requires large space, thus resulting in failure to make the full use of advantages provided by the non-coaxial optical system. Then such design limitations reduce the degree of freedom in designing.

To solve the problem described above, it is preferable to perform parallel and rotational movement as focus movement of the focusing group. Performing the parallel and rotational movement permits changing the angles of incidence and incidence positions of the base ray on the different surfaces. By appropriately setting the position, shape, and movement of each of the surfaces, the base ray exiting from the final surface of the focusing group can be brought into substantial agreement with a base ray at a different focus position (that is, photographing distance). The presence of an eccentric reflective surface in particular makes it easy to adopt such arrangement. This requirement not necessarily applies to all the focusing groups. The focusing groups may be individually parallely and rotationally moved so that the base ray exiting from the final group among the groups to be moved achieves agreement between before and after the movement. The focusing groups may include those moved only parallely and those moved only rotationally. Moreover, the base ray may move between the focusing groups.

Figure 32:
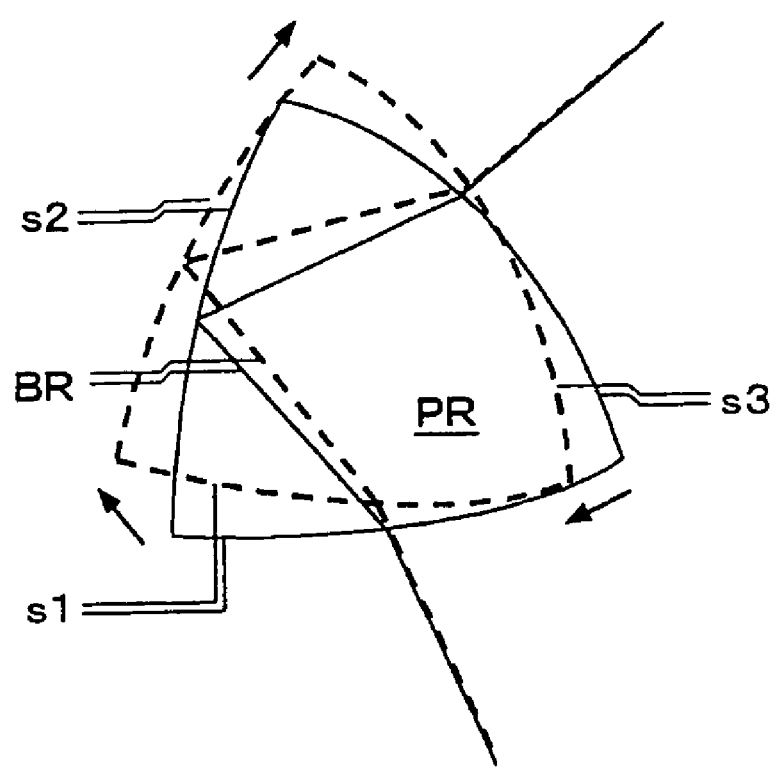
FIG. 32 is a pattern diagram for explaining movement of a base ray caused by parallel and rotational movement of the triangular prism having an eccentric reflection surface in the non-coaxial optical system shown in FIG. 30.

FIG. 32 shows an example in which the aforementioned parallel and rotational movement of the triangular prism PR is performed. Performing the parallel and rotational movement of the triangular prism PR results in fluctuation in the base ray BR as follows (the positions of the triangular prism PR and the base ray BR after the movement are indicated by a broken line in FIG. 32). First, an intersection between a first surface s1 (incidence surface) and the base ray BR moves, and further the angle of incidence of the base ray BR on the first surface s1 changes. Therefore, the direction of the base ray BR exiting from this first surface s1 changes. A difference in the position and direction of the exit base ray BR from the first surface s1 arises between before and after the movement of the triangular prism PR, thus also resulting in a difference in the position of an intersection between a second surface s2 (reflective surface) and the base ray BR. Further, a difference arises in the angle of incidence on the second surface s2, thus also resulting in a difference in the angle of reflection on the second surface s2. A difference arises in the position and direction of the base ray BR exiting from the second surface s2, thus permitting a change in the position of an intersection between the base ray BR and a third surface s3 (exit surface).

The difference in the position and direction of the base ray BR exiting from the second surface s2 changes the position of the intersection between the third surface s3 and the base ray BR, and also a difference arises in the angle of incidence on the third surface s3, thus resulting in a change in the angle of exit from the third surface s3. The base ray BR as an exit ray does not move if the intersection between the third surface s3 and the base ray BR is laid on the exit base ray BR at the original position of the triangular prism PR and if the exit direction is brought into agreement with that of the original base ray BR. To this end, parallel and rotational movement of the triangular prism PR is required. The movement can change the intersections between the respective surfaces and the base ray BR and the angles of incidence on the respective surfaces, thus keeping the exit base ray BR constant. Although the focusing method of moving the triangular prism PR has been illustrated here, the same applies to a focusing method of moving an optical element having a single eccentric optical surface or a plurality of optical surfaces, also in which case an exit base ray BR can be kept constant by parallel and rotational movement.

Focusing in the non-coaxial optical system requires the following two conditions. Specifically, through focusing at different conjugate distances, (i) the image surface position (primary imaging position) is substantially constant; and (ii) the position and direction of the axial principal ray on the image surface are substantially constant. The condition (i) means that the image surface lies at a constant position even with different conjugate distances (different photographing distances in the image-taking optical system). Movement of the image position in accordance with the photographing distance results in considerable deterioration in imaging performance, which is not practical. The condition (ii) means that the position and angle of incidence of the axial ray on the image surface are almost not changed by focusing. The movement of the axial ray caused by focusing results in fluctuation in the image position and range, which is not practical. The fluctuation in the angle of incidence of the ray results in a change in brightness, which is not practical. The conditions (i) and (ii) cannot be satisfied simply by parallel movement of the focusing group as has been practiced conventionally. To satisfy the two conditions (i) and (ii), parallel movement and rotation are required.

Returning to FIG. 30, a preferable focusing method for the non-coaxial optical system will be further discussed in detail. First, coordinate systems for the respective groups GrA and GrB are introduced in the following manner. The front-side coordinate system of the fixed group GrA is defined as O_fix and the back-side coordinate system of the fixed group GrA is defined as Od_fix. The front-side coordinate system of the focusing group GrB is defined as O_foc and the back-side coordinate system of the focusing group GrB is defined as Od_foc. Origins of the respective coordinate systems are located on the base ray BR and a z-axis is located in a direction toward the base ray BR. An x-axis perpendicular to the base ray BR is located in a direction from the front to the rear as viewed on the plane of figure. A y-axis (lying on the plane of figure) is located in the direction in which the z-axis and the x-axis forms a right-handed system. The back-side coordinate system Od_fix of the fixed group GrA and the front-side coordinate system O_foc of the focusing group GrB are brought into agreement with each other. For easier explanation purposes, the non-coaxial optical system is symmetrical with respect to the y-z plane.

Arbitrary two photographing distance state are defined as $\Theta 1$ and $\Theta 2$, and distances along the base ray BR from the fixed group GrA to the object surface are defined as S1 and S2, respectively. That is, S1 denotes a distance, at the photographing distance state $\Theta 1$, along the base ray from an intersection between the most object side surface of the fixed group and the base ray to the object surface, and S2 denotes a distance, at the photographing distance state $\Theta 2$, along the base ray from an intersection between the most object side surface of the fixed group and the base ray to the object surface.

Distances in x- and y-directions along the base ray BR from a front-side focal position of the fixed group GrA to the object surface are defined as $x_{fix}$ and $y_{fix}$ respectively. Distances along the base ray BR from a back-side focal position of the fixed group GrA to a point of primary imaging by the fixed group GrA are defined as $x'_{fix}$ and $y'_{fix}$ respectively. Thus, based on the imaging relationship of the fixed group GrA, formulae (J4) and (J5) below hold:

$$x\text{-direction: } (x_{fix})(x'_{fix}) = -(-M_{11})_{fix}^2 \tag{J4}$$

$$y\text{-direction: } (y_{fix})(y'_{fix}) = -(-M_{22})_{fix}^2 \tag{J5},$$

and note that, for the photographing distance states $\Theta 1$ and $\Theta 2$, $$(x_{fix})_{\Theta 1} = S1 + (F_{11})_{fix}$$

$$(y_{fix})_{\Theta 1} = S1 + (F_{22})_{fix}$$

$$(x_{fix})_{\Theta 2} = S2 + (F_{11})_{fix}$$

$$(y_{fix})_{\Theta 2} = S2 + (F_{22})_{fix}$$

where F, M, and B are first-order characteristic function matrix, the suffixes 11 and 22 respectively represent an 11 component and a 12 component of the matrix, and the suffix "fix" represents a characteristic function matrix of the fixed group GrA.

Next, focus on the focusing group GrB. Origins of the coordinates systems Od_fix and O_foc are brought into agreement with each other. Further, origins of the coordinate system Od_foc at the photographing distances $\theta 1$ and $\theta 2$ are brought into agreement with each other. Since the origin of the coordinate system Od_foc is set on the axial exit principal ray, when the axial incidence principal ray into the focusing group GrB and the axial exit principal ray from the focusing group GrB are not parallel to each other, simple parallel movement does not bring the origins of the coordinate system Od_foc at the different photographing distances into agreement with each other. To bring the origins of the coordinate system Od_foc at the different photographing distances $\theta 1$ and $\theta 2$ into agreement with each other, the focusing group GrB requires not only simple parallel movement but also rotation. This permits keeping the axial exit ray substantially constant even at the different photographing distances. That is, the parallel and rotational movement of the eccentric reflective surface can keep the axial exit ray constant with different optical paths at the different photographing distances.

When the origins of the coordinate system Od_foc at the different photographing distances agree with each other, a primary imaging point of the focusing group GrB in a case where a primary imaging point of the fixed group GrA is defined as the object surface of the focusing group GrB also serves as a primary imaging point of the entire system. For the primary imaging point at the coordinate system Od_foc, based on the imaging relationship of the focusing group GrB, formulae (J6) and (J7) below hold:

$$x\text{-direction: } (x_{foc})(x'_{foc}) = -(-M_{11})_{foc}^2 \tag{J6}$$

$$y\text{-direction: } (y_{foc})(y'_{foc}) = -(-M_{22})_{foc}^2 \tag{J7},$$

and note that:

$$x\text{-direction: } (x_{foc}) = (B_{11})_{fix} + (x'_{fix}) + (F_{11})_{foc}$$

$$y\text{-direction: } (y_{foc}) = (B_{22})_{fix} + (y'_{fix}) + (F_{22})_{foc}$$

where $(F_{11})_{foc}$, $(F_{22})_{foc}$, $(M_{11})_{foc}$, and $(M_{22})_{foc}$ are first-order characteristic function matrix of the focusing group GrB, suffixes 11 and 22 respectively represent an 11 component and a 22 component of the matrix, and the suffix "foc" represents a characteristic function matrix of the focusing group GrB.

When the primary imaging points of the focusing group GrB, that is, the positions of the imaging point of the entire system, from the origin of the back-side coordinate system Od_foc of the focusing group GrB in the x- and y-directions are defined as $fb_x$ and $fb_y$, respectively, formulae (J8) and (J9) below hold:

x-direction: $(fb_x) = (B_{11})_{foc} + (x'_{foc})$ (J8)

y-direction: $(fb_y) = (B_{22})_{foc} + (y'_{foc})$ (J9)

Therefore, the position of the primary imaging point of the focusing group GrB at the photographing distance θ1 is expressed by formulae (J10) and (J11) below:

x-direction: $(fb_x)_{\_\theta1} = B_{C11} + \{-M_{C11}^2(F_{X11}+S1)\}/\{(F_{X11}+S1)(B_{X11}+F_{C11})-M_{X11}^2\}$ (J10)

y-direction: $(fb_y)_{\_\theta1} = B_{C12} + \{-M_{C12}^2(F_{X12}+S1)\}/\{(F_{X12}+S1)(B_{X12}+F_{C2})-M_{X12}^2\}$ (J11)

Therefore, the position of the primary imaging point of the focusing group GrB at the photographing distance θ2 is expressed by formulae (J12) and (J13) below:

x-direction: $(fb_x)_{\_\theta2} = BC_{21} + \{-M_{C21}^2(F_{X21}+S2)\}/\{(F_{X21}+S2)(B_{X21}+F_{C21})-M_{X21}^2\}$ (J12)

y-direction: $(fb_y)_{\_\theta1} = B_{C22} + \{-M_{C22}^2(F_{X22}+S2)\}/\{(F_{X22}+S2)(B_{X22}+F_{C22})-M_{X22}^2\}$ (J13)

Note that:

$F_{X11} = (F_{11})_{fix}, F_{X12} = (F_{22})_{fix}$ $M_{X11} = (M_{11})_{fix}, M_{X12} = (M_{22})_{fix}$ $B_{X11} = (B_{11})_{fix}, B_{X12} = (B_{22})_{fix}$ $F_{C11} = (F_{11})_{foc\_\theta1}, F_{C12} = (F_{22})_{foc\_\theta1}$ $F_{C21} = (F_{11})_{foc\_\theta2}, F_{C22} = (F_{22})_{foc\_\theta2}$ $M_{C11} = (-M_{11})_{foc\_\theta2}, M_{C12} = (-M_{22})_{foc\_\theta1}$ $M_{C21} = (-M_{11})_{foc\_\theta2}, M_{C22} = (-M_{22})_{foc\_\theta2}$ $B_{C11} = (B_{11})_{foc\_\theta1}, B_{C22} = (B_{22})_{foc\_\theta1}$ $B_{C21} = (B_{11})_{foc\_\theta2}, B_{C22} = (B_{22})_{foc\_\theta2}$.

Since the primary imaging points at the photographing distances θ1 and θ2 need to be equal to each other, the focusing group GrB may be designed so that formulae (J14) and (J15) are satisfied for parallel and rotational movement:

$B_{C11} + \{-M_{C11}^2(F_{X11}+S1)\}/\{(F_{X11}+S1)(B_{X11}+F_{C11})-M_{X11}^2\} = B_{C21} + \{-M_{C21}^2(F_{X21}+S2)\}/\{(F_{X21}+S2)(B_{X21}+F_{C21})-M_{X21}^2\}$ (J14)

$B_{C12} + \{-M_{C12}^2(F_{X12}+S1)\}/\{(F_{X12}+S1)(B_{X12}+F_{C12})-M_{X12}^2\} = B_{C22} + \{-M_{C22}^2(F_{X22}+S2)\}/\{(F_{X22}+S2)(B_{X22}+F_{C22})-M_{X22}^2\}$ (J15)

Satisfying the above formulae (J14) and (J15) can keep the position of the entire image surface substantially constant, which permits focusing in the non-coaxial optical system. Considering fluctuation in the best image surface due to aberration, the above formulae (J14) and (J15) need not to have equality, as long as they satisfy the conditions within predetermined ranges. For example, it is preferable that a conditional formula (3A) below be satisfied for the x-direction, and it is preferable that a conditional formula (3B) below be satisfied for the y-direction. Moreover, it is further preferable that the conditional formulae (3A) and (3B) be satisfied. Note that "fx" is a focal length of the entire system in the x-direction, "fy" is a focal length of the entire system in the y-direction, and the origin of the back-side coordinate system Od_foc of the focusing group GrB is located at the position of the axial exit ray on the final optical surface of the focusing group GrB. Deviation from the respective ranges of the conditional formulae (3A) and (3B) moves the image surface in focusing, thus resulting in failure to obtain a favorable image.

$|[(B_{C11}-B_{C21})+(\{M_{C21}^2(F_{X21}+S2)\}/\{(F_{X21}+S2)(B_{X21}+F_{C21})-M_{X21}^2\}-\{M_{C11}^2(F_{X11}+S1)\}/\{(F_{X11}+S1)(B_{X11}+F_{C11})-M_{X11}^2\})]/f_x| \leq 0.10$ (3A)

$|[(B_{C12}-B_{C22})+\{M_{C22}^2(F_{X22}+S2)\}/\{(F_{X22}+S2)(B_{X22}+F_{C22})-M_{X22}^2\}-\{M_{C12}^2(F_{X12}+S1)\}/\{(F_{X12}+S1)(B_{X12}+F_{C12})-M_{X12}^2\}]/f_y| \leq 0.10$ (3B)

It is further preferable that a conditional formula (3Aa) below be satisfied for the x-direction, and it is further preferable that a conditional formula (3Ba) below be satisfied for the y-direction. These conditional formulae (3Aa) and (3Ba) define, of the conditional ranges defined by the conditional formulae (3A) and (3B), even more preferable conditional ranges based on the above viewpoints and the like:

$|[(B_{C11}-B_{C21})+\{M_{C21}^2(F_{X21}+S2)\}/\{(F_{X21}+S2)(B_{X21}+F_{C21})-M_{X21}^2\}-\{M_{C11}^2(F_{X11}+S1)\}/\{(F_{X11}+S1)(B_{X11}+F_{C11})-M_{X11}^2\}]/f_x| \leq 0.02$ (3Aa)

$|[(B_{C12}-B_{C22})+\{M_{C22}^2(F_{X22}+S2)\}/\{(F_{X22}+S2)(B_{X22}+F_{C22})-M_{X22}^2\}-\{M_{C12}^2(F_{X12}+S1)\}/\{(F_{X12}+S1)(B_{X12}+F_{C12})-M_{X12}^2\}]/f_y| \leq 0.02$ (3Ba).

Compared to conventional focusing methods, the aforementioned focusing method employed in the non-coaxial optical system has great advantage. In a coaxial optical system and also in a non-coaxial optical system in which a focusing group moves in a direction parallel to an axial incidence ray and an axial exit ray, the focal length of a focusing group is constant. On the other hand, performing focusing in the non-coaxial optical system by parallel and rotational movement of the focusing group can change the passage position of an axial ray, which permits the focal length of the focusing group to be changed depending on a photographing distance. Since the change in the focal length of the focusing group can change the values of $M_{11}$ and $M_{12}$ in the imaging relationship of the focusing group, which permits a reduction in the amount of movement of the focusing group. This permits a reduction in space for the movement of the focusing group, which in turn permits the thickness of the optical system to be even more reduced. This point is great effect that cannot be provided by the conventional methods.

A smaller group to be moved parallely and rotationally for focusing requires smaller energy for this movement, which also improves the focusing accuracy. In an optical system, a portion located close to the object surface has a large effective diameter and thus is not suitable to be moved for focusing. Contrarily, an optical element located close to the image surface has a small effective diameter, thus small volume and weight, and can be easily moved for focusing. Therefore, it can be said that a rear-focus method is advantageous.

For a transmissive surface, coefficients of M of the non-coaxial optical system are expressed by formulae (J16) and (J17) below. For a reflective surface, coefficients of M of the non-coaxial optical system are expressed by formulae (J18) and (J19) below.

$M_{11} = 1/[L_{11}\{n\cos(\theta)-n'\cos(\theta')\}]$ (J16)

$M_{22} = \{\cos(\theta)\times\cos(\theta')\}/[L_{22}\{n\cos(\theta)-n'\cos(\theta')\}]$ (J17)

$M_{11} = 1/\{2L_{11}\cdot n\cos(\theta)\}$ (J18)

$M_{22} = \{\cos(\theta)\}^2/\{2L_{22}\cdot n\cos(\theta)\}$ (J19)

where "$L_{11}$" and "$L_{22}$" denote curvatures of the surface in the respective directions, "θ" denotes an angle of incidence, "θ'" denotes an exit angle, "n" denotes a refractive index of a medium before incidence, and "n'" denotes a refractive index of the medium after exit.

As can be understood from the above formulae (J16) to (J39), even with the same surface curvature, the use of a reflective surface can increase the optical power two- to fourfold. With a reflective surface that is eccentric as in the noncoaxial optical system, unlike the coaxial optical system, the angle of incidence θ has an influence on the optical power of the surface. An influence of fluctuation in this angle of incidence θ permits, for cos (θ), two-to four-fold change in the optical power of the reflective surface compared to the optical power of a refractive surface. That is, changing the angle of incidence θ of a base ray by rotating the eccentric reflective surface permits a greater optical power change than is observed in a refractive optical system. Therefore, adopting such a reflective surface as the focusing group permits a great change in the optical power of the focusing group, which in turn permits a great reduction in the amount of movement for the focusing. Consequently, a more compact optical system can be achieved. Therefore, based on the above, it is preferable that rotational movement for focusing be adopted under the condition that an optical surface group including an eccentric reflective surface or an optical element group including an eccentric reflective surface is provided as a focusing group.

The above description refers to the rear-focus method. Focusing is possible by performing parallel movement and rotation of a focusing group, which moves parallely and rotates for focusing, so as to keep a primary imaging point substantially constant as described above, regardless of the position and number (single or multiple) of the focusing group and regardless of whether the focusing group moves integrally or independently. Moreover, the above description refers to a case where the image-taking optical system has different photographing distances. However, the focusing method embodying the invention is not limited to the image-taking optical system, and thus also applicable to pint position adjustment performed in a projection optical system.

Therefore, as in each of the embodiments, the configuration, in which focusing for keeping the position of an entire image surface substantially constant while keeping the axial imaging position substantially constant is performed by parallel and rotational movement of a group as a focusing group having at least one eccentric reflective surface, can be generalized in an optical system having a plurality of optical surfaces, at least one of which is an eccentric reflective surface, and an aperture stop or can be generalized in application of a focusing method of this optical system. Examples of the focusing group include: an optical element having only an eccentric reflective surface as an optical surface, an optical element having an eccentric reflective surface as an optical surface and a different type of optical surface, those just mentioned in combination, or the one composed of at least one of those just mentioned and a different type of optical element in combination. As in the embodiments described above, the optical system may be configured to have at least one prism optical element having at least one eccentric reflective surface and have as a focusing group a group including at least one of the prism optical elements. The optical system may also be configured to have a plurality of focusing groups and perform parallel and rotational movement on individual focusing groups.

As shown in FIG. 30 and the like, it is preferable that a triangular prism be used as a focusing group. A change in the conjugate distance results in fluctuation in aberration occurring in an optical system, but the fluctuation in the chromatic aberration cannot be corrected by a reflective surface. Therefore, a transmissive surface is required. The use of two transmissive surfaces permits favorable correction of the fluctuation in the chromatic aberration caused by the fluctuation in the conjugate distance while canceling out the chromatic aberration each other. Since such configuration is very simple, the focusing group itself can be formed small. This consequently makes it easy to perform parallel and rotational movement of the focusing group, and also permits the thickness of the entire optical system to be reduced.

Therefore, as in each of the embodiments, the configuration, in which focusing for keeping the position of an entire image surface substantially constant while keeping the axial imaging position substantially constant is performed by parallel and rotational movement of a group as a focusing group located on the most image surface side and including a prism optical element having at least one eccentric reflective surface, can be generalized in an optical system having a plurality of optical surfaces, at least one of which is an eccentric reflective surface, and an aperture stop or can be generalized in application of a focusing method of this optical system. Examples of the focusing group include: a prism optical element having only an eccentric optical surface as an optical surface, a prism optical element having an eccentric reflective surface as an optical surface and a different type of optical surface, those just mentioned in combination, or the one composed of at least one of those just mentioned and a different type of optical element in combination. As in the embodiments described above, the optical system may be configured to have at least one prism optical element having at least one eccentric reflective surface and have as a focusing group a group including at least one of the prism optical elements arranged on the most image surface side. The optical system may also be configured to have a plurality of focusing groups on the most image surface side and perform parallel and rotational movement on the individual focusing groups.

More specifically, it is preferable that, an optical system having at least one eccentric reflective surface as an optical surface or a focusing method thereof have configuration in which focusing for keeping the position of an entire image surface substantially constant while keeping the axial imaging position substantially constant is performed by integral or individual parallel and rotational movement of the following (a) to (e). Moreover, it is preferable that an optical system having at least one eccentric reflective surface as an optical surface in a prism optical element or a focusing method thereof have configuration in which focusing for keeping the position of an entire image surface substantially constant while keeping the axial imaging position substantially constant is performed by integral or individual parallel and rotational movement of the following (a) to (e).

(a): At least one eccentric reflective surface, (b): A plurality of optical surfaces including at least one eccentric reflective surface (including an optical surface other than the eccentric reflective surface), (c): At least one optical element having at least one eccentric reflective surface, (d): A plurality of optical elements including an optical element having at least one eccentric reflective surface (including an optical element not having an eccentric reflective surface), (e): All optical elements including an optical element having at least one eccentric reflective surface (including an optical element not having an eccentric reflective surface).

As described above, according to the configuration in which focusing for keeping the position of the entire image surface substantially constant while keeping the axial imaging position substantially constant is performed by parallel and rotational movement of a focusing group having at least one eccentric reflective surface, a high-quality image can be obtained in focusing while making full use of good points of the non-coaxial optical system. More specifically, according to configuration in which focusing for keeping the position of an entire image surface substantially constant while keeping the axial imaging position substantially constant is performed by parallel and rotational movement of a group as a focusing group located on the most image surface side and including a prism optical element having at least one eccentric reflective surface, a high-quality image can be obtained in focusing while making full use of good points of the non-coaxial optical system. Condition, other preferable configuration, and the like, in addition to this effect, for achieving even higher optical performance and the like will be described below.

It is preferable to provide configuration in which focusing for keeping the position of an entire image surface substantially constant while keeping substantially constant the axial imaging position and the angle of incidence of an axial principal ray on the image surface be performed by parallel and rotational movement of a focusing group. Non-perpendicularly incidence of the axial principal ray on the image surface results in asymmetry in brightness on the image surface, thus causing non-uniformity in the brightness. In this condition, an image at the defocused position appears an asymmetric, fuzzy image, which results in failure to obtain a clear image. A great change in the angle of incidence of the axial principal ray on the image surface during focusing results in a great change in non-uniformity in the brightness of the image during focusing, thereby losing practicality. Thus, it is preferable that the angle of incidence of the axial principal ray on the image surface do not greatly change during focusing. Therefore, it is preferable that focusing for keeping the position of an entire image surface substantially constant while keeping substantially constant the axial imaging position and the angle of incidence of an axial principal ray on the image surface be performed by parallel and rotational movement of a focusing group having at least one eccentric reflective surface.

From the viewpoint described above, it is preferable that a conditional formula (5) below be satisfied. A great change in the angle of incidence as a result of deviation from the conditional range of the conditional formula (5) results in too great non-uniformity in the brightness of the image during focusing, thereby losing practicality.

$$|\theta I - \theta N| < 5.0° \quad (5)$$

where

θI denotes an angle of incidence of an axial principal ray on the image surface at an infinite photographing distance; and θN denotes an angle of incidence of an axial principal ray on the image surface at a close photographing distance.

It is preferable that a conditional formula (5a) below be satisfied, and it is further preferable that a conditional formula (5b) be satisfied:

$$|\theta I - \theta N| < 3.0° \quad (5a)$$

$$|I - \theta N| < 1.0° \quad (5b).$$

These conditional formulae (5a) and (5b) define, of the conditional range defined by the above conditional formula (5), more preferable conditional ranges based on the viewpoints described above and the like.

Now, condition for keeping the angle of incidence of an axial principal ray on the image surface substantially constant will be described. In the coaxial optical system, even when a focusing group is moved, an incidence ray and exit ray of axial rays lie on the optical axis. However, in a typical non-coaxial optical system, unless an incidence ray and exit ray of axial rays are not parallel to a focusing group, the exit ray moves as a result of movement of the focusing group, whereby the image position moves. To prevent this, it is preferable, as described above, to perform appropriate rotational movement of the focusing group in addition to parallel movement thereof, which permits keeping the axial exit ray constant.

Condition for keeping an axial principal ray directed to the image surface almost immobile even when a focusing group is moved for focusing will be obtained as follow. For simplified description, referring to a case where the triangular prism PR shown in FIG. 32 is provided as a focusing group located closest to the image surface, consider a case where an axial exit ray does not move as a result of parallel and rotational movement of the focusing group. This triangular prism PR is composed of: in order along the optical path, one incidence surface (first surface s1); one reflective surface (second surface s2); and one exit surface (third surface s3). The origin of a global coordinate system is an intersection between a predetermined reference surface and a base ray BR, a Z-axis is set in a direction of the base ray BR, an X-axis is set in a direction from the front to the rear as viewed on the plane of figure, and a direction in which a right-handed system is formed by the Z- and X-axes is provided as a Y-axis (which is located on the plane of figure). For simplified description, the optical system is symmetrical with respect to the Y-Z plane.

Consider two mutually different photographing distances F1 and F2 in focusing. In FIG. 32, a solid line indicates the position at the photographing distance F1 and a broken line indicates the position at the photographing distance F2. As shown in FIG. 32, the locus of the base ray BR passing through the inside of the triangular prism PR is different between the photographing distances F1 and F2. Thus, setting the origin of the global coordinate system at a certain position of this optical system, for example, on an axial ray incident on the triangular prism PR, this coordinate system will be described.

For the photographing distance F1, a direction cosine vector of an incidence ray incident on the first surface s1 is $Q_{A1} = Q_{A1}(l_{A1}, m_{A1}, n_{A1})$, and a direction cosine vector of an exit ray exiting from the first surface s1 is $Q_{dA1} = Q_{dA1}(l_{dA1}, m_{dA1}, n_{dA1})$. Similarly for the second and third surfaces s2 and s3, direction cosine vectors of the incidence ray are $Q_{B1} = Q_{B1}(l_{B1}, m_{B1}, n_{B1})$ and $Q_{C1} = Q_{C1}(l_{C1}, m_{C1}, n_{C1})$, respectively, and direction cosine vectors of the exit ray are $Q_{dB1} = Q_{dB1}(l_{dB1}, m_{dB1}, n_{dB1})$ and $Q_{dC1} = Q_{dC1}(l_{dC1}, M_{dC1}, n_{dC1})$, respectively. Apparently, $Q_{dA1} = Q_{B1}$, $Q_{dB1} = Q_{C1}$. Intersections between the respective first to third surfaces s1 to s3 and the base ray BR are $(x_{A1}, y_{A1}, Z_{A1})$, $(x_{B1}, y_{B1}, z_{B1})$, and $(x_{C1}, y_{C1}, z_{C1})$, respectively. Unit normal vectors at the intersections between the respective first to third surfaces s1 to s3 and the base ray BR are $E_{A1}$, $E_{B1}$, and $E_{C1}$, respectively. Refractive indexes of media before and after the first surface s1 are $n_A$ and $n_{Ad}$, respectively. Similarly for the second and third surfaces s2 and s3, refractive indexes are $n_B$, $n_{Bd}$ and $n_C$, $n_{Cd}$, respectively. Since the second surface s2 is a reflective surface, $n_B = n_{Bd}$, and further, $n_B = n_{Ad}$ and $n_C = n_{Ad}$. For photographing distance F2, the suffix "1" for the photographing distance F1 is replaced with "2".

Since the position on the ray incident on the focusing group (that is, triangular prism PR) and the vectors of the incidence ray are known, the intersection $(x_{A1}, y_{A1}, z_{A1})$ between the first surface s1 and the base ray BR can be calculated, from which $E_{A1}$ is calculated. The vector $Q_{dA1}$ can be obtained from $n_A(E_{A1} \times Q_{A1}) = n_{Ad}(E_{A1} \times Q_{Ad1})$. Through sequential tracking, the intersection $(x_{C1}, y_{C1}, z_{C1})$ between the third surface s3 and the base ray BR, and $Q_{dC1}$ can be calculated.

Since the Y-Z plane is a plane of symmetry, the base rays BR exiting from the third surface s3 at the photographing distances F1 and F2 can be expressed by formulae below:

–Photographing distance $F1$: $(Y-y_{C1})/(m_{dC1}) = (Z-z_{C1})/(n_{dC1})$

–photographing distance $F2$: $(Y-y_{C2})/(m_{dC2}) = (Z-z_{C2})/(n_{dC2})$.

When the two straight lines at the two photographing distances F1 and F2 agree with each other, the position of an axial ray on the image surface and the angle of incidence do not change during focusing. This condition is expressed by a formula below:

$(m_{dC1})/(m_{dC2}) = (n_{dC1})/(n_{dC2}) = (y_{C1}-y_{C2})/(z_{C1}-z_{C2})$ where some difference is permitted.

The focal length of the focusing group as shown in FIG. 32 is expressed by a formula below:

$M_{11} = (n_{Ad})/(2 \cdot L_{B11} \cdot V_{11} \cdot V_{12} \cdot \cos\theta_{Bs} - E_A \cdot L_{A11} \cdot V_{12} - E_C \cdot L_{C11} \cdot V_{11})$ $M_{22} = (n_{Ad} \cdot \cos\theta_{Csd} \cdot \cos\theta_{Cs} \cdot \cos\theta_{Bs} \cdot \cos\theta_{Asd} \cdot \cos\theta_{As})/(2 \cdot L_{B22} \cdot V_{21} \cdot V_{22} \cdot E_A \cdot L_{A22} \cdot V_{22} \cdot \cos\theta_{Bs} - E_C \cdot L_{C22} \cdot V_{21} \cdot \cos\theta_{Bs})$.

Here, curvatures in the x- and y-directions at the intersections between the respective surfaces and the base ray BR are $L_{A11}$, $L_{A22}$; $L_{B11}$, $L_{B22}$; and $L_{C11}$, $L_{C22}$. The angles of incidence and exit angles of the base ray BR on the respective surfaces are $\theta_{As}$, $\theta_{Asd}$; $\theta_{Bs}$, $\theta_{Bsd}$ ($=\theta_{Bs}$); and $\theta_{Cs}$, $\theta_{Csd}$, respectively. Symbol $n_{Ad}$ denotes a refractive index, and $V_{11}$, $V_{12}$, $V_{21}$, $V_{22}$, $E_A$, and $E_C$ are as shown below, where a distance from the origin of the front side coordinate system O_foc of the triangular prism PR as a focusing group (focusing group GrB in FIG. 30) to the intersection between the first surface s1 and the base ray BR is $d_A$, a distance from the intersection between the base ray BR and the first surface s1 to the intersection between the base ray BR and the second surface s2 is $d_B$, and a distance from the intersection between the base ray BR and the second surface s2 to the intersection between the base ray BR and the third surface s3 is $d_C$:

$V_{11} = (E_A \cdot L_{A11} \cdot d_B - n_{Ad})$ $V_{12} = (E_C \cdot L_{C11} \cdot d_C + n_{Ad})$ $V_{21} = (E_A \cdot L_{A22} \cdot d_B - n_{Ad} \cdot \cos^2\theta_{Asd})$ $V_{22} = (E_C \cdot L_{C22} \cdot d_C + n_{Ad} \cdot \cos^2\theta_{Cs})$ $E_A = (n_A \cdot \cos\theta_{As} - n_{Ad} \cdot \cos\theta_{Asd})$ $E_C = (n_C \cdot \cos\theta_{Cs} - n_{Cd} \cdot \cos\theta_{Csd})$.

When an axial incidence principal ray and axial exit principal ray of the focusing group are parallel to each other, the focusing group can be moved parallely in this direction to thereby keep the direction of the axial exit principal ray constant. However, in this case, only magnification variation through a change in the inter-group distance by the focusing group contributes to focusing, because the passage position of the base ray does not fluctuate, the positions of the intersections between the respective optical surfaces and the base ray are constant, and further the angles of incidence of the base ray on the respective optical surfaces do not change, thus resulting in no optical power change of this focusing group.

The non-coaxial optical system can perform focusing by changing the inter-group distance with an axial exit ray kept constant and further changing the optical power (focal length) of the focusing group through parallel and rotational movement of the focusing group. That is, achieving variation magnification by changing the optical power of the focusing group permits a more reduction in the moving distance of the focusing group. A smaller moving distance requires a smaller space accordingly, which permits achieving a more compact optical system. On the other hand, the arrangement of the axial incidence principal ray and axial exit principal ray of the focusing group in parallel to each other requires a large space, which results in smaller effect of bending the optical path and thus failure to achieve a compact optical system. In addition, as a result of such design limitations, the degree of freedom in designing decreases. Therefore, to achieve a more compact optical system, it is preferable to provide, as a focusing group having at least one eccentric reflective surface, at least one group in which an axial incidence principal ray and an axial exit principal ray are not parallel to each other. Due to an improvement in the degree of freedom in designing and the effect of bending the optical path, the optical system can be effectively slimmed down.

From the viewpoints described above, it is preferable to provide, as the focusing group having at least one eccentric reflective surface, at least one group that satisfies a conditional formula (4) below:

$5 < |\theta pr| < 175$ \hfill (4)

where $\theta pr$ denotes an angle (in °) formed by an axial incidence principal ray and axial exit principal ray of axial principal rays with respect to the focusing group.

This conditional formula (4) defines a preferable conditional range for the change of direction of the axial principal ray in the focusing group. The value for $|\theta pr|$ represents the degree in which the optical path is bent. A smaller change in the axial principal ray below the lower limit of the conditional formula (4) reduces the effect of bending the optical path, thus resulting in failure to provide a compact optical system. Reversely, bending the optical path in the opposite direction exceeding the upper limit of the conditional formula (4) also reduces the effect of bending the optical path, thus resulting in failure to provide a compact optical system. Especially in performing focusing in a non-coaxial optical system, for the focusing group, the small bending effect requires a larger space accordingly, thus making it difficult to achieve a compact optical system.

It is preferable that a conditional formula (4a) below be satisfied, and it is further preferable that a conditional formula (4b) be satisfied:

$20 < |\theta pr| < 160$ \hfill (4a)

$30 < |\theta pr| < 150$ \hfill (4b).

These conditional formulae (4a) and (4b) define, of the conditional range defined by the above conditional formula (4), even more preferable conditional ranges based on the viewpoints described above and the like.

It is preferable to provide, as the focusing group having at least one eccentric reflective surface, at least one group that satisfies a conditional formula (1) below with at least one conjugate distance during focusing:

$$|\phi foc/\phi all| < 5.0 \quad (1)$$

where $\phi foc$ denotes an optical power of the focusing group; and $\phi all$ denotes an optical power of the entire system.

This conditional formula (1) defines a preferable conditional range for the optical power of the focusing group. Strong optical power of the focusing group can reduce the moving distance for focusing, thus permitting a reduction in a space for focusing, which consequently permits the entire optical system to be compact. However, too strong optical power of the focusing group results in great fluctuation in aberration caused by the focusing group following the movement. A total of fluctuation in aberration attributable to a difference in the conjugate distance and the fluctuation in the aberration caused by the movement of the focusing group is performance fluctuation. In this condition, too large fluctuation caused by the movement of the focusing group results in failure to ensure the total performance of the optical system. That is, deviation from the conditional range of the conditional formula (1) makes it difficult to ensure the total performance of the optical system.

It is further preferable that a conditional formula (1 a) below be satisfied:

$$|\phi foc/\phi all| < 3.0 \quad (1a).$$

This conditional formula (1a) defines, of the conditional range defined by the above conditional formula (1), an even more preferable conditional range based on the viewpoints described above and the like.

The aforementioned focusing group in the non-coaxial optical system performs parallel and rotational movement, causing a difference in the passage path of the base ray in the focusing group. Thus, the optical power of the focusing group differs depending on the conjugate distance. As described above, a change in the focal length of the focusing group can change the values of $M_{11}$ and $M_{12}$ in the imaging relationship of the focusing group, thus permitting a reduction in the amount of movement of the focusing group. This permits a reduction in a space for the movement of the focusing group, which in turn permits the thickness of the optical system to be even more reduced. Therefore, it is preferable to provide, as a focusing group having at least one eccentric reflective surface, at least one group whose optical power is not constant during focusing. Performing focusing while varying the focal length has great effect of reducing the amount of movement of the focusing group.

It is preferable that the focusing group having at least one eccentric reflective surface include at least one prism optical element having at least one incidence surface, the at least one eccentric reflective surface, and at least one exit surface. A change in the conjugate distance fluctuates aberration occurring in the optical system. Since the fluctuation in the chromatic aberration in particular cannot be corrected by the reflective surface, correction of the fluctuation in the chromatic aberration requires a transmissive surface. The use of two transmissive surfaces permits favorable correction of the fluctuation in the chromatic aberration caused by the fluctuation in the conjugate distance while canceling out the chromatic aberration each other. Since such configuration is very simple, the focusing group itself can be formed small. This consequently makes it easy to perform parallel and rotational movement of the focusing group, and also permits the thickness of the entire optical system to be reduced.

It is preferable that the prism optical element having at least one eccentric reflective surface in the focusing group have at least one incidence surface, the at least one eccentric reflective surface, and at least one exit surface. A change in the conjugate distance fluctuates aberration occurring in the optical system. Since the fluctuation in the chromatic aberration in particular cannot be corrected by the reflective surface, correction of the fluctuation in the chromatic aberration requires a transmissive surface. The use of two transmissive surfaces permits favorable correction of the fluctuation in the chromatic aberration caused by the fluctuation in the conjugate distance while canceling out the chromatic aberration each other. Since such configuration is very simple, the focusing group itself can be formed small. This consequently makes it easy to perform parallel and rotational movement of the focusing group, and also permits the thickness of the entire optical system to be reduced.

It is preferable that the optical system have at least three prism optical elements each having an incidence surface, at least one reflective surface, and an exit surface. Further, as in the embodiments described above, it is preferable to provide three prism optical elements. To achieve higher performance, aberration correction capability needs to be enhanced. In particular, following an increase in the angle of field, an increase in the image height, an increase in the focal length, and the like, off-axis aberration increases. To correct this aberration, a larger number of optical surfaces are more advantageous. However, the increase in the number of optical elements sacrifices compactness. To improve the aberration correction capability while maintaining the compactness, it is preferable to provide at least three prism optical elements. Further, forming the optical system with three optical elements permits achieving higher performance while maintaining the compactness.

It is preferable to provide, as an eccentric reflective surface, at least one surface formed of a free-form surface or a non-rotationally symmetric surface. The use of the eccentric reflective surface permits achieving a more slimming-down optical system owing to effect of eccentricity, such as bending the optical path, and the like. However, due to the eccentricity, aberration attributable and specific to the eccentricity occurs. For example, astigmatism occurs even on the axis. Correction of this aberration cannot be achieved until when the radius of curvature of the optical surface is varied in the horizontal and vertical directions. This condition also applies to the peripheral portion. As a reflective surface formed of such a non-rotationally symmetric surface, a free-form surface is suitable which can arbitrarily select radii of curvature in the horizontal and vertical directions. Therefore, to achieve a high-performance optical system, it is preferable to use a free-form surface.

It is preferable to provide, as the focusing group having at least one eccentric reflective surface, at least one group that satisfies a conditional formula (2) below with at least one of a combination of arbitrary conjugate distances s1 and s2 during focusing:

$$|(\phi i\_s2 - \phi i\_s1)/\phi i\_s2 \times 100| < 25.0 \quad (2)$$

where $\phi i\_s1$ denotes an optical power of the focusing group at the conjugate distance s1; and $\phi i\_s2$ denotes an optical power of the focusing group at the conjugate distance s2.

This conditional formula (2) defines a preferable conditional range for optical power fluctuation during focusing concerning the focusing group that performs parallel and rotational movements at focusing. With the focusing method described above, the optical power of the focusing group fluctuates through focusing, thus permitting a small amount of movement by focusing. Moreover, this optical power fluctuation permits correction of various types of aberration at different conjugate distances, thus achieving higher-performance. However, too large fluctuation in the aberration of the focusing group causes the aberration fluctuating at the different conjugate distances to fluctuate more than can be corrected, thus resulting in considerable performance deterioration. Deviation from the conditional range of the conditional formula (2) results in excessive correction of the aberration fluctuating at the different conjugate distances or too large aberration of the focusing group, thus leading to failure to achieve higher performance.

It is preferable that a conditional formula (2a) below be satisfied:

$$|(\phi i\_s2 - \phi i\_s1)/\phi i\_s2 \times 100| < 15.0 \qquad (2a).$$

This conditional formula (2a) defines, of the conditional range defined by the above conditional formula (2), an even more preferable conditional range based on the viewpoints described above and the like.

It is preferable that the mount of rotational movement made by the focusing group for focusing satisfy a conditional formula (6) below:

$$0.2 < |\Delta r/\beta| < 100 \qquad (6)$$

where $\Delta r$ denotes an amount (in °) of rotation of the focusing group during focusing at a certain object distance with respect to an infinite object distance; and $\beta$ denotes a magnification ratio during the focusing at the certain object distance.

A decrease in amount of rotation below the lower limit of the conditional formula (6) increases the sensitivity of the focusing group in a change of the focus position, resulting in failure to perform stable focusing. Moreover, a change in the image surface position as a result of slight rotation increases, which creates needs for improving the positional accuracy, thus leading to cost increase. An increase in the amount of rotation over the upper limit of the conditional formula (6) results in needs for a mechanism for achieving a large number of rotations during focusing, which in turn results in complicated mechanism, thus leading to cost increase. Moreover, a large space is required for movement for focusing, thus resulting in failure to achieve compactness.

To provide favorable balance between costs and compactness, it is further preferable that a conditional formula (6a) below be satisfied:

$$0.5 < |\Delta r/\beta| < 20 \qquad (6a).$$

It is preferable that at least one of optical elements forming the optical system described above be formed of a plastic material. "Formed of a plastic material" means that a base material is a plastic material, including the one the surface of which has been subjected to coating treatment intended to prevent reflection and improve surface hardness. In addition, "plastic material" here includes a plastic material disclosed in JP-A-2005-55852. The plastic material disclosed in JP-A-2005-55852 undergoes a smaller temperature-induced change in the refractive index than normal plastic materials. Such a plastic material that undergoes a small temperature-induced change in the refractive index in particular is called "athermal resin" here. The plastic material disclosed in JP-A-2005-55852 is, specifically, a plastic material formed with a raw material obtained by dispersing fine particles (for example, inorganic fine particles or the like) of 30 nanometers or less in a maximum length in a plastic material. An example of such a plastic material is the one having fine particles of niobium oxide ($Nb_2O_5$) dispersed in acrylic resin.

The use of a plastic material for an optical system provides many advantages, such as weight-saving, cost reduction, ease of integral formation, and the like. On the other hand, disadvantages brought about by the use of a plastic material include a large change in the refractive index induced by environmental temperature change. This influence brings about a problem that the image point position of an entire image-sensing lens fluctuates upon ambient temperature change. To correct this, it is preferable that an athermal resin be used as a plastic material for part or all of plastic components. This permits the change in the image point position of the optical system to be kept small. JP-A-2005-55852 indicates an example of a plastic material in which fine particles with dn/dt (where n is a refractive index and t is a temperature) of a different sign are dispersed. Dispersion of fine particles with a smaller absolute value of dn/dt than that of dn/dt of the plastic material results in a small temperature-induced change in the refractive index even when the signs of dn/dt are the same, thus permitting a smaller amount of change in the image point position of the optical system than that in a case where a conventional plastic material is used. However, the dispersion of fine particles with dn/dt of a different sign in a plastic material permits a smaller amount of fine particles to be dispersed in the plastic material.

For an optical system having an eccentric reflective surface as in the embodiments described above, a large change in the refractive index induced by environmental temperature causes a problem of increased astigmatic difference. For correction of this change, performing only conventional optical power allocation adjustment has limitations, and thus the use of athermal resin is required. In an eccentric optical system as in the embodiments, to achieve a high-performance optical system, the astigmatic difference needs to be kept small, and it is particularly preferable that athermal resin be used as a prism material.

To practice the characteristic focusing method described above, it is preferable to adopt configuration such that an optical image is formed on an image sensor. The focusing method according to the embodiments described above is used in the image-taking optical system TL for forming an optical image of an object on the light-receiving surface of the image sensor SR. In this manner, it is preferable that the optical system described above be an image-taking optical system for forming an optical image of an object on the light-receiving surface of an image sensor. However, the focusing method is not limited to application to the image-taking optical system but applicable to any non-coaxial optical system, and thus also applicable to a projection optical system, a display optical system, and the like.

It is preferable that a surface forming a reflective surface of a prism optical element have a reflective region and a transmissive region. In fabricating the prism surfaces, forming all the prism surfaces into reflective surfaces causes a problem of stray light generated at the edge portion and also a problem of failure to ensure a portion for holding the prism optical element. Providing configuration such that light outside the reflective region is transmitted permits use of only an effective range, which is preferable as a countermeasure against stray light. Moreover, although the prism can be held in this region, configuration such that light is cut or absorbed at the holding part provides countermeasures against stray light.

It is preferable that the surface forming the reflective surface of the prism optical element have a reflective region and an absorbing region. In fabricating the prism surfaces, forming all the prism surfaces into reflective surfaces causes a problem of stray light generated at the edge portion and also a problem of failure to ensure a portion for holding the prism optical element. Providing configuration such that light outside the reflective region is absorbed permits use of only an effective range, which is preferable as a countermeasure against stray light. Moreover, the prism can be held in the absorbing portion.

It is preferable that the surface forming the reflective surface of the prism optical element have a reflective region and a light-shielding region. In fabricating the prism surfaces, forming all the prism surfaces into reflective surfaces causes a problem of stray light generated at the edge portion and also a problem of failure to ensure a portion for holding the prism optical element. Providing configuration such that light outside the reflective region is shielded permits use of only an effective range, which is preferable as a countermeasure against stray light. Moreover, the prism can be held in the light-shielding portion.

It is preferable that the reflective region be provided with a reflection coating. Providing the reflective portion with a reflection coating permits efficient light reflection. For example, to use a reflective surface having an aperture stop, it is preferable that a reflection coating is provided only within an effective diameter of the aperture stop. This permits cutting light outside the effective diameter of the aperture stop, which in turn permits adopting low-cost configuration without increasing the number of components.

It is preferable that the absorbing region or the light-shielding region be formed through black oxide finish. Providing the black oxide finish permits preventing deformation of the surface of this region. Moreover, this surface can be provided as a holding part or a measurement reference surface to maintain high accuracy.

It is preferable that the absorbing region or the light-shielding region be formed through rough grinding. Forming the rough surface to scatter light permits only light within the effective diameter to be targeted for reflection. Moreover, the region can be modified easily by rough grinding, which provides an advantage in capability to achieve low-cost machining.

It is preferable that the absorbing region or the light-shielding region be machined into a rough surface. Roughly forming the surface to scatter light permits only light within the effective diameter to be targeted for reflection. In fabrication of the surface through polishing or pressing, finishing by polishing is not performed. In pressing, roughly forming a corresponding portion of a mold permits formation of the absorbing region or the light-shielding region with ease and at low costs.

It is preferable that the absorbing region or the light-shielding region have a light-scattering, pyramidal, minute shape. Forming the absorbing region or the light-shielding region in the light-scattering, pyramidal, minute shape permits light attenuation in this portion, which can provide a countermeasure against stray light in particular. If this portion is formed to be transmissive, light reflected or diffusedly reflected on the barrel or the like becomes a cause of stray light, which creates needs for devising the shape of this portion or adding a component. By comparison therewith, the light-scattering, pyramidal, minute shape can be machined at low costs through pressing or the like.

It is preferable that the absorbing region or the light-shielding region be formed through chemical reaction to an organic solvent. The use of the organic solvent and causing chemical reaction in the formation of the absorbing region or the light-shielding region can modify properties of this portion. This just involves processing of applying the solvent to this portion or soaking this portion in the solvent, which permits mass production at one time.

It is preferable that the reflective region be in the form of a mirror surface. For effective light reflection, it is preferable that the reflective portion be in the form of a mirror surface, because the presence of microscopic asperities, such as ripples, in particular causes reflection efficiency deterioration or stray light.

It is preferable that the reflective surface be provided with an aluminum-evaporated coating. The aluminum-evaporated coating provides advantages of a high reflection rate and lower machining costs. Moreover, it is preferable that the reflective surface be provided with an aluminum reflection-enhancing coating. The aluminum reflection-enhancing coating can be formed so as to provide a higher reflection rate than a normal aluminum-evaporated coating.

Further, to provide a high reflection rate, it is preferable that the reflective surface be provided with a dielectric coating. The dielectric coating has a very high reflection rate. Especially in a case where there are a plurality of reflective surfaces, loss in the amount of light needs to be controlled small, in which case the dielectric coating is effective. Moreover, it is preferable that the reflective surface be provided with a silver-evaporated coating. The silver-evaporated coating has a very high reflection rate. Especially in a case where there are a plurality of reflective surfaces, loss in the amount of light needs to be controlled small, in which case the silver-evaporated coating is effective.

It is preferable that reflective surfaces of the prism optical element include a mixture of a surface provided with an aluminum-evaporated coating, a surface provided with an aluminum reflection-enhancing coating, a surface provided with a dielectric coating, and a surface provided with a silver-evaporated coating. In a case where one prism optical element has a plurality of reflective surfaces, providing all the reflective surfaces with an aluminum-evaporated coating permits low-cost fabrication, but may lead to reflection rate deterioration. On the other hand, providing all the reflective surfaces with a reflection-enhancing coating, a silver-evaporated coating, or a dielectric coating succeeds in reducing the reflection rate deterioration, but results in high costs. To achieve low costs while reducing the reflection rate deterioration, it is preferable that the aforementioned four surfaces be provided in favorable balance. Moreover, two or three of the four surfaces may be selected.

It is preferable that at least one of reflective surfaces have a reflection rate of 80% or more. The reflection rate of the entire system is obtained by multiplication of the reflection rates of the reflective surfaces. To improve the overall reflection rate, the individual reflection rates need to be increased, but presence of one surface with a low reflection rate results in large deterioration in the overall reflection rate. Thus, at least one of the reflective surfaces needs to have a reflection rate of 80% or more.

It is preferable that at least one of the transmissive surface and the reflective surface of the prism optical element be provided with a coating for absorbing light in a long wavelength range. For imaging performance dependent on the wavelength of the optical system, light in a long wavelength region is harmful. Thus, a parallel-plane plate provided with a coating for absorbing light in a long wavelength range is arranged in front of the image sensor. However, the absorption of light in such a long wavelength range by the reflective surface of the prism optical element eliminates harmful light. Therefore, a member for absorbing light in a long wavelength range is no longer required, thus permitting cost reduction.

It is preferable that the prism optical element be formed of a plastic material. The use of a plastic material permits the formation of the prism optical element at low costs and also permits mass production of prism optical elements through pressing. From a different viewpoint, it is preferable that the prism optical element be formed of a glass material. The formation of the prism optical element with a glass material permits selection of a material with high reflective index, which is advantageous in achieving slimming-down and higher performance accordingly.

The image-taking optical system TL of each of the embodiments uses a refractive lens surface that deflects an incidence ray by refraction (that is, a lens surface of a type that performs deflection at an interface between media having different refractive indexes), although an applicable lens surface is not limited thereto. The applicable surfaces may include: for example, a diffractive lens surface that deflects an incidence ray by diffraction, a refractive-diffractive hybrid lens surface that deflects an incidence ray by refraction and diffraction in combination, and the like.

The image-taking optical system TL of each of the embodiments is suitable for use as a slim image-taking optical system for a digital appliance equipped with an image input capability (for example, a cellular phone furnished with a camera). Combining this with the image sensor SR and the like permits achieving an image-taking apparatus that optically takes in a video of a subject and outputs it as an electrical signal. The image-taking apparatus is an optical apparatus that forms a main component of a camera used in photographing a moving image and still image of a subject, and includes: for example, in the order from the object (subject) side, an image-taking optical system for forming an optical image of an object, and an image sensor for converting into an electrical signal the optical image formed by the image-taking optical system.

Examples of such cameras include digital cameras, video cameras, surveillance cameras, car-mounted cameras, cameras for videophones, cameras for intercoms, and cameras incorporated in or externally fitted to digital appliances: personal computers, portable data appliances (for example, small-size, portable appliance terminals, such as mobile computers, cellular phones, personal digital assistants (PDA)), peripheral devices therefor (such as mouses, scanners, and printers), and other digital appliances. As these examples show, by the use of an image-taking apparatus, it is possible not only to build a camera but also to incorporate an image-taking apparatus in various devices to provide them with a camera capability. Moreover, it is possible to use the image-taking apparatus in the form in accordance with needs to achieve a camera capability. For example, an image-taking apparatus provided as a unit may be so formed as to be detachable from or rotatable about the camera body, or the image-taking apparatus provided as a unit may be so formed as to be detachable from or rotatable about a portable data appliance (such as a cellular phone or PDA).

Figure 33:
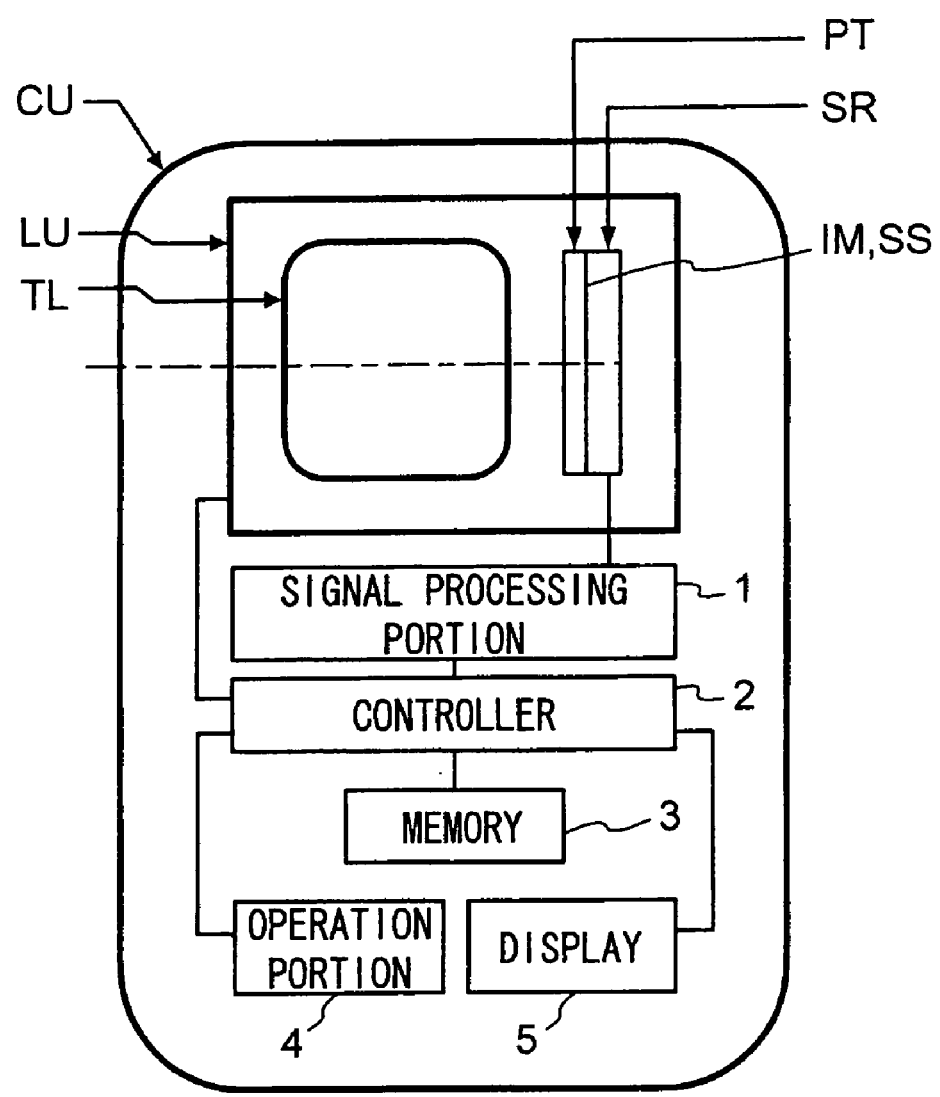
FIG. 33 is a sectional view schematically showing an example of the outline construction of a digital appliance equipped with the image-taking apparatus according to the invention.

FIG. 33 schematically and cross-sectionally shows an example of the outline construction of a digital appliance CU (corresponding to a digital appliance equipped with an image input capability, such as a cellular phone furnished with a camera, a digital camera, or the like). An image-taking apparatus LU to be mounted in the digital appliance CU is composed of: from the object (i.e., subject) side thereof, an image-taking optical system TL that forms an optical image (image surface) IM of an object with a variable magnification; a parallel-plane plate PT (corresponding to an optical filter such as an optical low-pass filter or infrared cut filter arranged as required, the cover glass of the image sensor SR, or the like); and an image sensor SR for converting the optical image IM formed on the light-receiving surface SS thereof by the image-taking optical system TL into an electrical signal.

Used as the image sensor SR is, for example, a solid-state image sensor such as a CCD (charge-coupled device) or CMOS (complementary metal oxide semiconductor) sensor having a plurality of pixels. The image-taking optical system TL is provided so that the optical image IM of a subject is formed on a light-receiving surface SS of the image sensor SR. The optical image IM formed by the image-taking optical system TL is converted into an electrical signal by the image sensor SR.

The digital appliance CU includes: in addition to the image-taking apparatus LU, a signal processing portion 1, a controller 2, a memory 3, an operation portion 4, a display 5, and the like. A signal produced by the image sensor SR is subjected, in the signal processing portion 1, to predetermined digital image processing, image compression processing, and the like as required, and is recorded in the memory 3 (such as a semiconductor memory or an optical disk) as a digital video signal; in some cases, the signal is transferred to another appliance through a cable or after being converted into an infrared signal. The controller 2 is composed of a microcomputer and centrally controls an image-taking function, an image reproducing function, a lens transfer system for focusing, and the like. For example, the controller 2 controls the image-taking apparatus LU so that at least one of still image photographing and moving image photographing of a subject is performed. The display 5 includes a display such as a liquid crystal monitor, and displays an image by using the image signal converted by the image sensor SR or the image data recorded in the memory 3. The operation portion 4 includes an operation member such as operation buttons (for example, a release button) and operation dials (such as a photographing mode dial), and transfers to the controller 2 data input by the user's operation.

The optical image to be formed by the image-taking optical system TL passes through the optical low-pass filter (corresponding to the parallel-plane plate PT shown in FIG. 33) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electric signal. This helps alleviate the generation of color moiré. Aiming at moderate performance around the resolution limit frequency makes it possible to disregard the generation of noise without the use of an optical low-pass filter. Moreover, in a case where the user photographs or observes images by the use of a display system (such as the liquid crystal display screen of a cellular phone or the like) on which noise is inconspicuous, there is no need to use an optical low-pass filter.

As can be understood from the above description, the embodiments described above and Examples to be described later include the following configuration. This configuration permits achieving favorable optical performance and a low-cost, slim, compact image-taking apparatus, and its application to a camera, a digital appliance, or the like can contribute to achieving higher performance, higher function, lower costs, and compactness.

(AU1) An image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, and performs focusing for keeping the position of an entire image surface substantially constant while keeping substantially constant the axial imaging position and the angle of incidence of an axial principal ray on the image surface by parallel and rotational movement of a group provided as a focusing group having the at least one eccentric reflective surface.

(AU2) An image-taking apparatus including: an image-taking optical system forming an optical image; and an image sensor converting the optical image formed by the image-taking optical system into an electrical signal, wherein the image-taking optical system has at least one prism optical element having at least one eccentric reflective surface, and perform focusing for keeping the position of an entire image surface substantially constant while keeping substantially constant the axial imaging position and the angle of incidence of an axial principal ray on the image surface by parallel and rotational movement of a group provided as a focusing group including the at least one prism optical element.

(AU3) The image-taking apparatus described in the above (AU1), wherein the focusing group is formed of any of an optical element having only the eccentric reflective surface as the optical surface, an optical element having the eccentric reflective surface as an optical surface and another optical surface, those just mentioned in combination, and at least one of those just mentioned and a different type of optical element in combination.

(AU4) The image-taking apparatus described in the above (AU2), wherein the focusing group is formed of any of a prism optical element having only an eccentric optical surface as the optical surface, a prism optical element having the eccentric reflective surface as the optical surface and another optical surface, the aforementioned two optical elements in combination, and at least one of the aforementioned two optical elements and another optical element in combination.

(AU5) The image-taking apparatus described in any one of the above (AU1) to (AU4), wherein the image-taking optical system has a plurality of the focusing groups, and performs the parallel and rotational movement for the individual focusing groups.

(AU6) The image-taking apparatus described in any one of the above (AU1) to (AU5), wherein, as the focusing group, at least one group is provided in which an axial incidence principal ray and an axial exit principal ray are not parallel to each other.

(AU7) The image-taking apparatus described in any one of the above (AU1) to (AU6), wherein, as the focusing group, at least one group is provided in which an optical power is not constant during focusing.

(AU8) The image-taking apparatus described in any one of the above (AU1) to (AU7), wherein, as the focusing group, at least one group is provided which satisfies either of the conditional formulae (1) and (1a) with at least one conjugate distance during focusing.

(AU9) The image-taking apparatus described in any one of the above (AU1) to (AU8), wherein, as the focusing group, at least one group is provided which satisfies either of the conditional formula (2) and (2a) with at least one of a combination of arbitrary conjugate distances s1 and s2 during focusing.

(AU10) The image-taking apparatus described in any one of the above (AU1) to (AU9), wherein the image-taking optical system has a fixed group on an object side of the focusing group and satisfies either conditional formulae (3A) and (3B) below or the above conditional formulae with narrower conditional ranges than conditional ranges of the conditional formulae (3A) and (3B):

$$|[(B_{C11}-B_{C21})+\{M_{C21}^2(F_{X21}+S2)\}/\{(F_{X21}+S2)(B_{X21}+F_{C21})-M_{X21}^2\}-\{M_{C11}^2(F_{X11}+S1)\}/\{(F_{X11}+S1)(B_{X11}+F_{C11})-M_{X11}^2\}]/f_x| \leq 0.10 \quad (3A)$$

$$|[(B_{C12}-B_{C22})+\{M_{C22}^2(F_{X22}+S2)\}/\{(F_{X22}+S2)(B_{X22}+F_{C22})-M_{X22}^2\}-\{M_{C12}^2(F_{X12}+S1)\}/\{(F_{X12}+S1)(B_{X12}+F_{C12})-M_{X12}^2\}]/f_y| \leq 0.10 \quad (3B),$$

and where arbitrary two photographing distance state are defined as θ1 and θ2, and an axial principal ray passing through the center of the aperture stop from the center of an object and then reaching the center of the image surface is defined as a base ray, S1 denotes a distance, at the photographing distance state θ1, along the base ray from an intersection between the most object side surface of the fixed group and the base ray to the object surface, and S2 denotes a distance, at the photographing distance state θ2, along the base ray from an intersection between the most object side surface of the fixed group and the base ray to the object surface, and, for an orthogonal coordinate system formed with a z-axis set in a direction of the base ray from the origin thereon and with an x- and y-axes set perpendicular to the z-axis, fx denotes a focal length of the entire system in the x-direction; and fy denotes a focal length of the entire system in the y-direction, and $$F_{X11}=(F_{11})_{fix}, F_{X12}=(F_{22})_{fix}$$

$$M_{X11}=(M_{11})_{fix}, M_{X12}=(M_{22})_{fix}$$

$$B_{X11}=(B_{11})_{fix}, B_{X12}=(B_{22})_{fix}$$

$$F_{C11}=(F_{11})_{foc\_\theta1}, F_{C12}=(F_{22})_{foc\_\theta1}$$

$$F_{C21}=(F_{11})_{foc\_\theta2}, F_{C22}=(F_{22})_{foc\_\theta2}$$

$$M_{C11}=(-M_{11})_{foc\_\theta1}, M_{C12}=(-M_{22})_{foc\_\theta1}$$

$$M_{C21}=(-M_{11})_{foc\_\theta2}, M_{C22}=(-M_{22})_{foc\_\theta2}$$

$$B_{C11}=(B_{11})_{foc\_\theta1}, B_{C12}=(B_{22})_{foc\_\theta1}$$

$$B_{C21}=(B_{11})_{foc\_\theta2}, B_{C22}=(B_{22})_{foc\_\theta2}$$

where F, M, and B are first-order characteristic function matrix, the suffixes 11 and 22 respectively represent an 11 component and a 12 component of this matrix, and the suffixes "fix" and "foc" respectively represent characteristic function matrixes of the fixed group and the focusing group, and the suffixes _θ1 and _θ2 respectively represent characteristic function matrixes at the photographing distances state θ1 and θ2.

(AU11) The image-taking apparatus described in any one of the above (AU1) to (AU10), wherein, as the focusing group, at least one group is provided which satisfies at least one of the conditional formula (4) and the above conditional formula with a narrower conditional range than a conditional range of the conditional formula (4).

(AU12) The image-taking apparatus described in any one of the above (AU1) to (AU11), wherein at least one of the conditional formula (5) and the above conditional formula with a narrower conditional range than a conditional range of the conditional formula (5) is satisfied.

(AU13) The image-taking apparatus described in any one of the above (AU1) to (AU12), wherein, as the eccentric reflective surface, at least one surface is provided which is formed of a free-form surface.

(AU14) The image-taking apparatus described in any one of the above (AU1) to (AU13), wherein, as the eccentric reflective surface, at least one surface is provided which is formed of a rotationally asymmetric surface.

(AU15) The image-taking apparatus described in any one of the above (AU1) to (AU14), wherein at least one of optical elements forming the image-taking optical system is formed of a plastic material.

(AU16) The image-taking apparatus described in the above (AU15), wherein the plastic material is athermal resin.

(AC1) A camera including the image-taking apparatus described in any one of the above (AU1) to (AU16) and being used for at least one of moving image photographing and still image photographing of a subject.

(AC2) The camera described in the above (AC1), which is any of a digital camera, a video camera, and a camera incorporated in or externally fitted to a cellular phone, a personal digital assistant, a personal computer, a mobile computer, or a peripheral device therefor.

(AD1) A digital appliance including the image-taking apparatus described in any one of the above (AU1) to (AU16), whereby function of at least one function of moving image photographing and still image photographing of a subject is added.

(AD2) The digital appliance described in the above (AD1), which is any of a cellular phone, a personal digital assistant, a personal computer, a mobile computer, and a peripheral device therefor.

(BU1) An image-taking apparatus including: an image-taking optical system forming an optical image; and an image sensor converting the optical image formed by the image-taking optical system into an electrical signal, wherein the image-taking optical system has at least one prism optical element having at least one eccentric reflective surface, and perform focusing for keeping the position of an entire image surface substantially constant while keeping substantially constant the axial imaging position and the angle of incidence of an axial principal ray on the image surface by parallel and rotational movement of a group provided as a focusing group located on a most image surface side and including the at least one prism optical element.

(BU2) An image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, has at least one prism optical element having at least one surface as the eccentric reflective surface, and performs focusing for keeping the position of an entire image surface substantially constant while keeping substantially constant the axial imaging position and the angle of incidence of an axial principal ray on the image surface by parallel and rotational movement of a group provided as a focusing group located on a most image surface side and having the at least one prism optical element.

(BU3) The image-taking apparatus described in either of the above (BU1) and (BU2), wherein the focusing group is formed of any of a prism optical element having only an eccentric optical surface as the optical surface, a prism optical element having the eccentric reflective surface as the optical surface and another optical surface, the aforementioned two optical elements in combination, and at least one of the aforementioned two optical elements and another optical element in combination.

(BU4) The image-taking apparatus described in any one of the above (BU1) to (BU3), wherein the image-taking optical system has a plurality of the focusing groups on a most image surface side, and performs the parallel and rotational movement for the individual focusing groups.

(BU5) The image-taking apparatus described in any one of the above (BU1) to (BU4), wherein, as the focusing group, at least one group is provided in which an axial incidence principal ray and an axial exit principal ray are not parallel to each other.

(BU6) The image-taking apparatus described in any one of the above (BU1) to (BU5), wherein the image-taking optical system has a fixed group on an object side of the focusing group, and satisfies either of the conditional formula (3A) and (3B) or the above conditional formula with a narrower conditional range than a conditional range of the conditional formulae (3A) and (3B).

(BU7) The image-taking apparatus described in any one of the above (BU1) to (BU6), wherein, as the focusing group, at least one group is provided in which an optical power is not constant during focusing.

(BU8) The image-taking apparatus described in any one of the above (BU1) to (BU7), wherein, as the focusing group, at least one group is provided which satisfies either of the conditional formulae (1) and (1a) with at least one conjugate distance during focusing.

(BU9) The image-taking apparatus described in any one of the above (BU1) to (BU8), wherein, as the focusing group, at least one group is provided which satisfies either of the conditional formula (2) and (2a) with at least one of a combination of arbitrary conjugate distances s1 and s2 during focusing.

(BU10) The image-taking apparatus described in any one of the above (BU1) to (BU9), wherein, as the focusing group, at least one group is provided which satisfies at least one of the conditional formula (4) and the above conditional formula with a narrower conditional range than a conditional range of the conditional formula (4).

(BU11) The image-taking apparatus described in any one of the above (BU1) to (BU10), wherein at least one of the conditional formula (5) and the above conditional formula with a narrower conditional range than a conditional range of the conditional formula (5) is satisfied.

(BU12) The image-taking apparatus described in any one of the above (BU1) to (BU11), wherein, as the eccentric reflective surface, at least one surface is provided which is formed of a free-form surface.

(BU13) The image-taking apparatus described in any one of the above (BU1) to (BU12), wherein, as the eccentric reflective surface, at least one surface is provided which is formed of a rotationally asymmetric surface.

(BU14) The image-taking apparatus described in any one of the above (BU1) to (BU13), wherein at least one of optical elements forming the image-taking optical system is formed of a plastic material.

(BU15) The image-taking apparatus described in the above (AU14), wherein the plastic material is athermal resin.

(BC1) A camera including the image-taking apparatus described in any one of the above (BU1) to (BU15) and being used for at least one of moving image photographing and still image photographing of a subject.

(BC2) The camera described in the above (BC1), which is any of a digital camera, a video camera, and a camera incorporated in or externally fitted to a cellular phone, a personal digital assistant, a personal computer, a mobile computer, or a peripheral device therefor.

(BD1) A digital appliance including the image-taking apparatus described in any one of the above (BU1) to (BU15), whereby function of at least one function of moving image photographing and still image photographing of a subject is added.

(BD2) The digital appliance described in the above (BD1), which is any of a cellular phone, a personal digital assistant, a personal computer, a mobile computer, and a peripheral device therefor.

In the image-taking apparatus, the image-taking optical system performs reduced projection from a subject on an enlargement side to the image sensor on a reduced side. By using, instead of the image sensor, a display element (for example, a liquid crystal display element) displaying a two-dimensional image, and by using the image-taking optical system as a projection optical system, an image projection apparatus (that is, projector) can be formed which performs enlarged projection from an image display surface on a reduced side to a screen surface on an enlargement side. Therefore, the embodiments described above and Examples to be described later include the following configuration. That is, the focusing method of the embodiments is not limited to an image-taking optical system but also preferably applicable to a projection optical system.

(AT1) An image projection apparatus including: a display element displaying a two-dimensional image; and a projection optical system performing enlarged projection on the display image in a focusable manner, wherein the projection optical system has a plurality of optical surfaces and an aperture stop, has an eccentric reflective surface as at least one of the plurality of optical surfaces, and performs focusing for keeping the position of an entire image surface substantially constant while keeping substantially constant the axial imaging position and the angle of incidence of an axial principal ray on the image surface by parallel and rotational movement of a group provided as a focusing group having the at least one eccentric reflective surface.

(AT2) An image projection apparatus including: a display element displaying a two-dimensional image; and a projection optical system performing enlarged projection on the display image in a focusable manner, wherein the projection optical system has at least one prism optical element having at least one eccentric reflective surface, and perform focusing for keeping the position of an entire image surface substantially constant while keeping substantially constant the axial imaging position and the angle of incidence of an axial principal ray on the image surface by parallel and rotational movement of a group provided as a focusing group including the at least one prism optical element.

(AT3) The image projection apparatus described in the above (AT1), wherein the focusing group is formed of any of an optical element having only the eccentric reflective surface as the optical surface, an optical element having the eccentric reflective surface as an optical surface and another optical surface, those just mentioned in combination, and at least one of those just mentioned and a different type of optical element in combination.

(AT4) The image projection apparatus described in the above (AT2), wherein the focusing group is formed of any of a prism optical element having only an eccentric optical surface as the optical surface, a prism optical element having the eccentric reflective surface as the optical surface and another optical surface, the aforementioned two optical elements in combination, and at least one of the aforementioned two optical elements and another optical element in combination.

(AT5) The image projection apparatus described in any one of the above (AT1) to (AT4), wherein the image-taking optical system has a plurality of the focusing groups, and performs the parallel and rotational movement for the individual focusing groups.

(AT6) The image projection apparatus described in any one of the above (AT1) to (AT5), wherein, as the focusing group, at least one group is provided in which an axial incidence principal ray and an axial exit principal ray are not parallel to each other.

(AT7) The image projection apparatus described in any one of the above (AT1) to (AT6), wherein, as the focusing group, at least one group is provided in which an optical power is not constant during focusing.

(AT8) The image projection apparatus described in any one of the above (AT1) to (AT7), wherein, as the focusing group, at least one group is provided which satisfies either of the conditional formulae (1) and (1a) with at least one conjugate distance during focusing.

(AT9) The image projection apparatus described in any one of the above (AT1) to (AT8), wherein, as the focusing group, at least one group is provided which satisfies either of the conditional formula (2) and (2a) with at least one of a combination of arbitrary conjugate distances s1 and s2 during focusing.

(AT10) The image projection apparatus described in any one of the above (AT1) to (AT9), wherein the image projection optical system has a fixed group on an object side of the focusing group and satisfies either the conditional formulae (3A) and (3B) below or the above conditional formulae with narrower conditional ranges than conditional ranges of the conditional formulae (3A) and (3B).

(AT11) The image projection apparatus described in any one of the above (AT1) to (AT10), wherein, as the focusing group, at least one group is provided which satisfies at least one of the conditional formula (4) and the above conditional formula with a narrower conditional range than a conditional range of the conditional formula (4).

(AT12) The image projection apparatus described in any one of the above (AT1) to (AT11), wherein at least one of the conditional formula (5) and the above conditional formula with a narrower conditional range than a conditional range of the conditional formula (5) is satisfied.

(AT13) The image projection apparatus described in any one of the above (AT1) to (AT12), wherein, as the eccentric reflective surface, at least one surface is provided which is formed of a free-form surface.

(AT14) The image projection apparatus described in any one of the above (AT1) to (AT13), wherein, as the eccentric reflective surface, at least one surface is provided which is formed of a rotationally asymmetric surface.

(AT15) The image projection apparatus described in any one of the above (AT1) to (AT14), wherein at least one of optical elements forming the image projection optical system is formed of a plastic material.

(AT16) The image projection apparatus described in the above (AT15), wherein the plastic material is athermal resin.

(BT1) An image projection apparatus including: a display element displaying a two-dimensional image; and a projection optical system performing enlarged projection on the display image in a focusable manner, wherein the projection optical system has at least one prism optical element having at least one eccentric reflective surface, and perform focusing for keeping the position of an entire image surface substantially constant while keeping substantially constant the axial imaging position and the angle of incidence of an axial principal ray on the image surface by parallel and rotational movement of a group provided as a focusing group located on a most image surface side and including the at least one prism optical element.

(BT2) An image projection apparatus including: a display element displaying a two-dimensional image; and a projection optical system performing enlarged projection on the display image in a focusable manner, wherein the image projection optical system has a plurality of optical surfaces, has an eccentric reflective surface as at least one of the plurality of optical surfaces, has at least one prism optical element having at least one surface as the eccentric reflective surface, and performs focusing for keeping the position of an entire image surface substantially constant while keeping substantially constant the axial imaging position and the angle of incidence of an axial principal ray on the image surface by parallel and rotational movement of a group provided as a focusing group located on a most image surface side and having the at least one prism optical element.

(BT3) The image projection apparatus described in either of the above (BT1) and (BT2), wherein the focusing group is formed of any of a prism optical element having only an eccentric optical surface as the optical surface, a prism optical element having the eccentric reflective surface as the optical surface and another optical surface, the aforementioned two optical elements in combination, and at least one of the aforementioned two optical elements and another optical element in combination.

(BT4) The image projection apparatus described in any one of the above (BT1) to (BT3), wherein the image projection optical system has a plurality of the focusing groups on a most image surface side, and performs the parallel and rotational movement for the individual focusing groups.

(BT5) The image projection apparatus described in any one of the above (BT1) to (BT4), wherein, as the focusing group, at least one group is provided in which an axial incidence principal ray and an axial exit principal ray are not parallel to each other.

(BT6) The image projection apparatus described in any of the above (BT1) to (BT5), wherein the projection optical system has a fixed group on an object side of the focusing group, and satisfies either the conditional formulae (3A) and (3B) or the above conditional formula with a narrower conditional range than conditional ranges of the conditional formulae (3A) and (3B).

(BT7) The image projection apparatus described in any one of the above (BT1) to (BT6), wherein, as the focusing group, at least one group is provided in which an optical power is not constant during focusing.

(BT8) The image projection apparatus described in any one of the above (BT1) to (BT7), wherein, as the focusing group, at least one group is provided which satisfies either of the conditional formulae (1) and (1a) with at least one conjugate distance during focusing.

(BT9) The image projection apparatus described in any one of the above (BT1) to (BT8), wherein, as the focusing group, at least one group is provided which satisfies either of the conditional formula (2) and (2a) with at least one of a combination of arbitrary conjugate distances s1 and s2 during focusing.

(BT10) The image projection apparatus described in any one of the above (BT1) to (BT9), wherein, as the focusing group, at least one group is provided which satisfies at least one of the conditional formula (4) and the above conditional formula with a narrower conditional range than a conditional range of the conditional formula (4).

(BT11) The image projection apparatus described in any one of the above (BT1) to (BT10), wherein at least one of the conditional formula (5) and the above conditional formula with a narrower conditional range than a conditional range of the conditional formula (5) is satisfied.

(BT12) The image projection apparatus described in any one of the above (BT1) to (BT11), wherein, as the eccentric reflective surface, at least one surface is provided which is formed of a free-form surface.

(BT13) The image projection apparatus described in any one of the above (BT1) to (BT12), wherein, as the eccentric reflective surface, at least one surface is provided which is formed of a rotationally asymmetric surface.

(BT14) The image projection apparatus described in any one of the above (BT1) to (BT13), wherein at least one of optical elements forming the image projection optical system is formed of a plastic material.

(BT15) The image projection apparatus described in the above (BT14), wherein the plastic material is athermal resin.

EXAMPLES

Hereinafter, a focusing method according to the present invention will be further described in detail, with construction data and other data of an image-taking optical system using this method. Examples 1 and 2 presented below are numerical examples corresponding to the first and second embodiments, respectively, described hereinbefore, and therefore the optical configuration diagrams (FIGS. 1, 2A, 2B, 2C, 15, 16A, 16B, and 16C) of the first and second embodiments also show the corresponding optical configuration, optical paths, and the like of Examples 1 and 2, respectively.

Tables 1 to 12 show the construction data of Examples 1 and 2. In the basic optical configuration (with i representing the surface number) as shown in tables 1 and 7, Si (i=1, 2, 3, . . . ) represents the i-th surface counted from the object side (with S1 corresponding to a dummy surface as a reference surface and S2 corresponding to a most object side surface of the image-taking optical system), ri (i=1, 2, 3, . . . ) represents the radius of curvature (in mm) of the surface Si, and Ni (i=1, 2, 3, . . . ) and vi (i=1, 2, 3, . . . ) respectively represent the refractive index (Nd) for the d-line and the Abbe number (vd) of the optical material located between the i-th surface Si and (i+1)-th surface Si+1 counted from the object side.

The arrangements of each surface Si in Examples 1 and 2 are specified by each surface data for vertex coordinates and rotation angles in tables 2 and 8. The surface data is expressed based on a right-handed orthogonal coordinate system (X, Y, and Z), in which a principal ray passing through the center of an object and the center of an image surface is a base ray, an intersection between the base ray and a first surface S1 (note that the incidence surface S10 is a coordinate basis for the surfaces S11 and S12 for the third prism P3 of Example 1 and that the incidence surface S9 is a coordinate basis for the surfaces S10 and S11 for the third prism P3 of Example 2) is an origin (0, 0, 0), a Z-axis direction is a direction of the base ray passing from the center of the object to the intersection with the first surface S1, and this direction is positive. In the optical path diagrams (FIGS. 1, 2A, 2B, 2C, 15, 16A, 16B, and 16C), an X-axis is vertical to the plane of figure (and has its positive direction pointing from in front to behind the plane of figure; positive X rotation refers to counterclockwise rotation as viewed on the plane of figure from the front), and a Y-axis direction is a direction (parallel to the plane of figure) in which a right-handed system is formed by the X- and Z-axes. The vertex position of each surface is expressed by vertex coordinates (X-coordinate, Y-coordinate, Z-coordinate) (in mm), and the surface inclination is expressed (in °) by axial rotation angles (for X rotation, Y rotation, Z rotation) in the X-, Y-, and Z-directions with the vertex of this surface provided as a center. The directions counterclockwise to the positive directions of the X- and Y-axes are positive directions of the rotation angles of the X rotation and the Y rotation, respectively, and the direction clockwise to the positive directions of the Z-axis is a positive direction of the rotation angle of the Z rotation.

Data shown in tables 2 and 8 indicate arrangement of the surfaces Si at the focus position POS1 (object distance=∞). Focusing through parallel and rotational movement of the third prism P3 changes the arrangement of the tenth surface S10 (Example 1) and the ninth surface S9 (Example 2) for which the first surface S1 serves as a coordinate basis. Tables 3 and 9 show object distances (distances from the object surface to the first surface S1) (in mm) at the focus positions POS1 to POS6, and also vertex coordinates and rotation angles of the tenth surface S10 (Example 1) and the ninth surface S9 (Example 2) at the focus positions POS1 to POS6. In focusing, since the parallel movement is made along the Y-Z plane; X=0, and since the rotational movement is made through X rotation, the rotation angles for Y and Z rotations=0. The positions of the image surfaces S13 (Example 1) and S12 (Example 2) also do not change in focusing (that is, the image surface position is constant regardless of object distances).

In tables 1 and 7, the surfaces Si marked with an asterisk (*) are free-from surfaces and each defined by a formula (FS) below using a local orthogonal coordinate system (x, y, z) with its vertex serving as an origin. Tables 4 to 6 and 10 to 12 show free-form surface data of respective Examples. It should be noted that any coefficient that is not shown equals 0 (k=0 for all the free-form surfaces) and that, for all the data, "E−n" represents "×10$^{-n}$".

$$z = c \cdot h^2 / \{1 + \sqrt{1 - (1+k)c^2h^2}\} + \sum_{j=2}^{66} C_j x^m y^n \quad \text{(FS)}$$

where
z denotes the displacement in the z-axis direction at a height h (relative to the vertex);
h denotes a height in a direction perpendicular to the z axis ($h^2 = x^2 + y^2$);
c denotes a paraxial curvature (=the reciprocal of a radius of curvature);
k denotes a conic coefficient; and
$C_j$ denotes a coefficient.

And the term of the free-form surface is expressed by a formula (FC) below.

$$\sum_{j=2}^{66} C_j x^m y^n = C_2 \cdot x + C_3 \cdot y + \quad \text{(FC)}$$

$C_4 \cdot x^2 + C_5 \cdot x \cdot y + C_6 \cdot y^2 +$ $C_7 \cdot x^3 + C_8 \cdot x^2 \cdot y + C_9 \cdot x \cdot y^2 + C_{10} \cdot y^3 +$ $C_{11} \cdot x^4 + C_{12} \cdot x^3 \cdot y + C_{13} \cdot x^2 \cdot y^2 +$ $C_{14} \cdot x \cdot y^3 + C_{15} \cdot y^4 + C_{16} \cdot x^5 + C_{17} \cdot x^4 \cdot y +$ $C_{18} \cdot x^3 \cdot y^2 + C_{19} \cdot x^2 \cdot y^3 + C_{20} \cdot x \cdot y^4 +$ $C_{21} \cdot y^5 + C_{22} \cdot x^6 + C_{23} \cdot x^5 \cdot y + C_{24} \cdot x^4 \cdot y^2 +$ $C_{25} \cdot x^3 \cdot y^3 + C_{26} \cdot x^2 \cdot y^4 + C_{27} \cdot x \cdot y^5 +$ $C_{28} \cdot y^6 + \ldots$ Table 13 shows focal lengths (in mm) of the entire system, F-numbers (Fno), half angles of field (in °), object distance fluctuations (in mm), and radiuses of the aperture stop ST (in mm) of Examples 1 and 2. Table 14 shows focal lengths of the focusing group (that is, third prism P3) for the focus positions POS1 to POS6 of Examples 1 and 2. Table 15 shows values respectively corresponding to the conditional formulae of Examples 1 and 2. In tables 13 to 15, an X-direction is a horizontal direction (direction along the longer side of the screen), and a Y-direction is a vertical direction (direction along the shorter side of the screen). In table 15, the values corresponding to the conditional formulae (2), (3A), and (3B) are based on the focus position POS1.

FIGS. 3A to 3F through FIGS. 14A to 14F and FIGS. 17A to 17F through FIGS. 28A to 28F are lateral aberration diagrams of Examples 1 and 2, showing lateral aberration Δx and Δy (in mm) in the X- and Y-directions, respectively, at the focus positions POS1 to POS6. Each of the lateral aberration diagrams show the lateral aberration Δx and Δy (in mm) for a d-line at the image height (in mm) expressed by a local orthogonal coordinate system (x, y) shown in the diagrams. The aberrations diagrams are scaled −0.02 to 0.02 for the vertical axis and −1.0 to 1.0 for the horizontal axis.

TABLE 1

Example 1

| Si | ri[mm] | Ni | vi | Optical element |
|---|---|---|---|---|
| S1 | ∞ (Dummy Surface) | Air | | |
| S2 * | ∞ | 1.53 | 55.72 | P1 |
| S3 * | ∞ (Reflective surface) | 1.53 | 55.72 | |
| S4 * | ∞ (Reflective surface) | 1.53 | 55.72 | |
| S5 * | ∞ | Air | | |
| S6 | ∞ (Aperture stop) | Air | | ST |
| S7 * | ∞ | 1.53 | 55.72 | P2 |
| S8 * | ∞ (Reflective surface) | 1.53 | 55.72 | |
| S9 * | ∞ | Air | | |
| S10 * | ∞ | 1.61 | 27.10 | P3 |
| S11 * | ∞ (Reflective surface) | 1.61 | 27.10 | |
| S12 * | ∞ | Air | | |
| S13 | ∞ (Image surface) | | | SR |

TABLE 2

Example 1

| | | | | | Rotation angle | | |
|---|---|---|---|---|---|---|---|
| | Coordinate | Vertex coordinate | | | X | Y | Z |
| Si | basis | X | Y | Z | rotation | rotation | rotation |
| S1 | S1 | 0 | 0 | 0 | 0 | 0 | 0 |
| S2 | S1 | 0 | 0 | 0 | 0 | 0 | 0 |
| S3 | S1 | 0 | 0 | 3.047 | −28.170 | 0 | 0 |
| S4 | S1 | 0 | 0 | 0 | 0 | 0 | 0 |

TABLE 2-continued

Example 1

| Si | Coordinate basis | Vertex coordinate X | Vertex coordinate Y | Vertex coordinate Z | Rotation angle X rotation | Rotation angle Y rotation | Rotation angle Z rotation |
|---|---|---|---|---|---|---|---|
| S5 | S1 | 0 | 7.899 | 1.544 | 53.911 | 0 | 0 |
| S6 | S1 | 0 | 8.848 | 3.203 | 57.394 | 0 | 0 |
| S7 | S1 | 0 | 9.113 | 3.417 | 49.623 | 0 | 0 |
| S8 | S1 | 0 | 11.526 | 4.544 | 3.288 | 0 | 0 |
| S9 | S1 | 0 | 12.175 | 1.910 | −40.098 | 0 | 0 |
| S10 | S1 | 0 | 12.419 | 1.629 | −34.241 | 0 | 0 |
| S11 | S10 | 0 | 1.227 | −2.977 | 31.722 | 0 | 0 |
| S12 | S10 | 0 | 3.718 | −1.382 | 80.158 | 0 | 0 |
| S13 | S1 | 0 | 17.219 | 2.605 | 42.257 | 0 | 0 |

TABLE 3

Example 1

| Si | Coordinate Etc. | POS1 | POS2 | POS3 | POS4 | POS5 | POS6 |
|---|---|---|---|---|---|---|---|
|  | Object distance | ∞ | 10000 | 5000 | 1000 | 500 | 300 |
| S10 | Y | 12.419 | 12.423 | 12.426 | 12.452 | 12.483 | 12.519 |
|  | Z | 1.629 | 1.629 | 1.628 | 1.622 | 1.615 | 1.606 |
|  | X rotation | −34.241 | −34.237 | −34.243 | −34.260 | −34.290 | −34.336 |

TABLE 4

Example 1 (P1)

Free-form surface coefficient for S2

| C3 | −7.542E−02 | C4 | −3.821E−04 | C6 | 1.077E−02 |
| C8 | 4.386E−05 | C10 | 1.855E−04 | C11 | 1.129E−04 |
| C13 | −4.408E−05 | C15 | −4.221E−05 | C17 | −1.607E−05 |
| C19 | 9.895E−07 | C21 | 3.518E−06 | C22 | −5.318E−06 |
| C24 | −1.245E−06 | C26 | −5.388E−07 | C28 | −1.856E−07 |

Free-form surface coefficient for S3

| C3 | −3.098E−02 | C4 | 3.690E−03 | C6 | 1.166E−02 |
| C8 | −1.712E−04 | C10 | −1.035E−03 | C11 | 3.505E−05 |
| C13 | −6.279E−06 | C15 | 5.578E−05 | C17 | −1.634E−05 |
| C19 | 2.610E−06 | C21 | 1.015E−05 | C22 | −2.930E−06 |
| C24 | −1.454E−07 | C26 | −4.984E−07 | C28 | −2.076E−06 |

Free-form surface coefficient for S4

| C3 | −7.542E−02 | C4 | −3.821E−04 | C6 | 1.077E−02 |
| C8 | 4.386E−05 | C10 | 1.855E−04 | C11 | 1.129E−04 |
| C13 | −4.408E−05 | C15 | −4.221E−05 | C17 | −1.607E−05 |
| C19 | 9.895E−07 | C21 | 3.518E−06 | C22 | −5.318E−06 |
| C24 | −1.245E−06 | C26 | −5.388E−07 | C28 | −1.856E−07 |

Free-form surface coefficient for S5

| C3 | 4.850E−02 | C4 | −7.153E−02 | C6 | −1.843E−02 |
| C8 | −2.227E−03 | C10 | 6.997E−04 | C11 | 1.773E−03 |
| C13 | 9.758E−04 | C15 | 3.160E−04 | C17 | −1.089E−04 |
| C19 | −1.880E−04 | C21 | 3.836E−04 | C22 | −7.534E−05 |
| C24 | −1.285E−04 | C26 | −5.501E−05 | C28 | 6.348E−05 |

TABLE 5

Example 1 (P2)

Free-form surface coefficient for S7

| C3 | 1.328E−02 | C4 | 1.905E−02 | C6 | −1.722E−02 |
| C8 | 7.294E−04 | C10 | 6.716E−03 | C11 | 1.561E−03 |
| C13 | −6.303E−04 | C15 | 1.867E−03 | C17 | 9.200E−04 |
| C19 | 1.617E−03 | C21 | 1.622E−04 | C22 | −6.178E−04 |
| C24 | −2.103E−04 | C26 | −1.837E−04 | C28 | 7.168E−05 |

Free-form surface coefficient for S8

| C3 | −4.324E−02 | C4 | −7.153E−03 | C6 | −4.894E−03 |
| C8 | 4.282E−03 | C10 | 7.470E−04 | C11 | 4.609E−04 |
| C13 | 1.562E−04 | C15 | 1.915E−04 | C17 | 4.002E−05 |
| C19 | 1.302E−04 | C21 | 3.921E−05 | C22 | −1.320E−04 |
| C24 | −1.064E−04 | C26 | −2.221E−05 | C28 | 4.711E−06 |

TABLE 5-continued

Example 1 (P2)

Free-form surface coefficient for S9

| C3 | −1.561E−01 | C4 | 1.926E−01 | C6 | 8.583E−02 |
| C8 | −7.384E−03 | C10 | 2.943E−02 | C11 | −5.709E−04 |
| C13 | −6.145E−03 | C15 | −6.166E−03 | C17 | −3.065E−04 |
| C19 | 1.515E−03 | C21 | −6.044E−05 | C22 | 2.958E−04 |
| C24 | 6.010E−04 | C26 | −3.400E−04 | C28 | 1.509E−04 |

TABLE 6

Example 1 (P3)

Free-form surface coefficient for S10

| C3 | −1.258E−01 | C4 | 1.520E−01 | C6 | 1.004E−01 |
| C8 | −1.561E−02 | C10 | 2.290E−02 | C11 | 4.134E−03 |
| C13 | −3.808E−03 | C15 | 5.247E−04 | C17 | −4.609E−04 |
| C19 | 3.694E−03 | C21 | −4.057E−05 | C22 | 4.222E−04 |
| C24 | 1.125E−03 | C26 | −1.498E−03 | C28 | −1.113E−04 |
| C30 | −1.328E−04 | C32 | −1.981E−05 | C34 | 3.071E−04 |
| C36 | −1.721E−04 | C37 | −6.208E−05 | C39 | −2.469E−04 |
| C41 | −1.143E−04 | C43 | −1.641E−04 | C45 | 5.861E−05 |
| C47 | 1.568E−06 | C49 | −3.329E−05 | C51 | −3.187E−05 |
| C53 | 8.494E−05 | C55 | 1.494E−05 | C56 | 2.969E−05 |
| C58 | 5.776E−05 | C60 | 5.829E−05 | C62 | 1.468E−05 |
| C64 | −1.843E−05 | C66 | −5.363E−06 | | |

Free-form surface coefficient for S11

| C3 | −5.303E−02 | C4 | −4.197E−03 | C6 | 1.045E−02 |
| C8 | −1.689E−03 | C10 | −3.577E−04 | C11 | 3.482E−04 |
| C13 | −5.666E−05 | C15 | 3.800E−04 | C17 | 8.776E−05 |
| C19 | −6.499E−05 | C21 | 2.247E−05 | C22 | 1.844E−05 |
| C24 | 8.983E−06 | C26 | −1.795E−05 | C28 | −1.280E−05 |

TABLE 6-continued

Example 1 (P3)

| | | | | | | |
|---|---|---|---|---|---|---|
| C30 | 2.711E−06 | C32 | 1.302E−05 | C34 | 1.616E−05 | |
| C36 | 5.183E−06 | C37 | −1.326E−05 | C39 | −2.950E−06 | |
| C41 | −3.179E−06 | C43 | 2.005E−06 | C45 | 1.673E−06 | |
| C47 | −1.412E−06 | C49 | −5.664E−07 | C51 | −1.308E−06 | |
| C53 | −5.974E−07 | C55 | −4.119E−07 | C56 | 1.130E−06 | |
| C58 | 2.065E−07 | C60 | 3.124E−07 | C62 | 7.806E−08 | |
| C64 | −2.640E−07 | C66 | −9.946E−08 | | | |

Free-form surface coefficient for S12

| | | | | | |
|---|---|---|---|---|---|
| C3 | 1.346E−01 | C4 | −1.612E−02 | C6 | −5.015E−03 |
| C8 | 9.457E−03 | C10 | −4.390E−02 | C11 | 2.942E−03 |
| C13 | 2.363E−03 | C15 | 7.544E−03 | C17 | −1.277E−04 |
| C19 | −2.059E−04 | C21 | 5.308E−03 | C22 | −2.367E−04 |
| C24 | −1.435E−04 | C26 | −1.791E−04 | C28 | −1.273E−03 |

TABLE 7

Example 2

| Si | ri[mm] | | Ni | vi | Optical element |
|---|---|---|---|---|---|
| S1 | ∞ (Dummy Surface) | | | Air | |
| S2 * | ∞ | | 1.65 | 58.55 | P1 |
| S3 * | ∞ (Reflective surface) | | 1.65 | 58.55 | |
| S4 * | ∞ (Reflective surface) | | 1.65 | 58.55 | |
| S5 * | ∞ | | | Air | |
| S6 * | ∞ (Aperture stop) | | 1.49 | 70.44 | ST |
| S7 * | ∞ (Reflective surface) | | 1.49 | 70.44 | P2 |
| S8 * | ∞ | | | Air | |
| S9 * | ∞ | | 1.70 | 30.13 | P3 |
| S10 * | ∞ (Reflective surface) | | 1.70 | 30.13 | |
| S11 * | ∞ | | | Air | |
| S12 | ∞ (Image Surface) | | | | SR |

TABLE 8

Example 2

| | Coordinate | Vertex coordinate | | | Rotation angle | | |
|---|---|---|---|---|---|---|---|
| Si | basis | X | Y | Z | X rotation | Y rotation | Z rotation |
| S1 | S1 | 0 | 0 | 0 | 0 | 0 | 0 |
| S2 | S1 | 0 | 0 | 0 | 0 | 0 | 0 |
| S3 | S1 | 0 | 0 | 2.500 | −28.000 | 0 | 0 |
| S4 | S1 | 0 | 0 | 0 | 0 | 0 | 0 |
| S5 | S1 | 0 | 6.648 | 2.147 | 55.522 | 0 | 0 |
| S6 | S1 | 0 | 7.849 | 2.632 | 53.221 | 0 | 0 |
| S7 | S1 | 0 | 9.679 | 3.852 | 2.282 | 0 | 0 |
| S8 | S1 | 0 | 11.567 | 2.262 | −39.085 | 0 | 0 |
| S9 | S1 | 0 | 11.580 | 1.460 | −36.633 | 0 | 0 |
| S10 | S9 | 0 | 0.070 | −2.457 | 38.033 | 0 | 0 |
| S11 | S9 | 0 | 4.461 | −3.023 | 68.922 | 0 | 0 |
| S12 | S1 | 0 | 17.031 | 2.267 | 49.046 | 0 | 0 |

TABLE 9

Example 2

| Si | Coordinate Etc. | POS1 | POS2 | POS3 | POS4 | POS5 | POS6 |
|---|---|---|---|---|---|---|---|
| | Object distance | ∞ | 10000 | 5000 | 1000 | 500 | 300 |
| S9 | Y | | 11.580 | 11.584 | 11.585 | 11.599 | 11.615 | 11.638 |
| | Z | | 1.460 | 1.459 | 1.459 | 1.457 | 1.454 | 1.450 |
| | X rotation | −36.633 | −36.638 | −36.641 | −36.665 | −36.694 | −36.737 |

TABLE 10

Example 2 (P1)

Free-form surface coefficient for S2

| | | | | | |
|---|---|---|---|---|---|
| C3 | −1.839E−02 | C4 | 1.525E−02 | C6 | 8.859E−03 |
| C8 | −2.141E−03 | C10 | −8.661E−04 | C11 | 8.824E−05 |
| C13 | 1.365E−04 | C15 | 3.038E−05 | C17 | −2.368E−05 |
| C19 | −2.056E−05 | C21 | −6.278E−06 | C22 | −1.386E−06 |
| C24 | −5.928E−08 | C26 | −5.142E−07 | C28 | −1.279E−07 |

Free-form surface coefficient for S3

| | | | | | |
|---|---|---|---|---|---|
| C3 | 9.486E−03 | C4 | 1.766E−02 | C4 | −1.143E−03 |
| C8 | −1.664E−03 | C10 | −2.017E−03 | C10 | −6.693E−06 |
| C13 | 1.633E−04 | C15 | 1.321E−04 | C15 | −3.133E−05 |
| C19 | −2.889E−05 | C21 | 1.493E−06 | C21 | 3.181E−05 |
| C24 | 2.282E−06 | C26 | 1.779E−06 | C26 | −5.191E−07 |

Free-form surface coefficient for S4

| | | | | | |
|---|---|---|---|---|---|
| C3 | −1.839E−02 | C4 | 1.525E−02 | C4 | 8.859E−03 |
| C8 | −2.141E−03 | C10 | −8.661E−04 | C10 | 8.824E−05 |
| C13 | 1.365E−04 | C15 | 3.038E−05 | C15 | −2.368E−05 |
| C19 | −2.056E−05 | C21 | −6.278E−06 | C21 | −1.386E−06 |
| C24 | −5.928E−08 | C26 | −5.142E−07 | C26 | −1.279E−07 |

Free-form surface coefficient for S5

| | | | | | |
|---|---|---|---|---|---|
| C3 | 1.392E−03 | C4 | −3.053E−02 | C4 | −5.074E−02 |
| C8 | −5.310E−03 | C10 | −1.601E−03 | C10 | 2.940E−04 |
| C13 | 2.928E−03 | C15 | 4.873E−04 | C15 | 3.280E−04 |
| C19 | −1.375E−04 | C21 | 1.598E−04 | C21 | −1.370E−04 |
| C24 | −2.814E−04 | C26 | −3.107E−04 | C26 | −4.518E−05 |

TABLE 11

Example 2 (P2)

Free-form surface coefficient for S6

| | | | | | |
|---|---|---|---|---|---|
| C3 | 4.468E−02 | C4 | 9.310E−02 | C4 | −1.043E−02 |
| C8 | 3.445E−03 | C10 | 2.185E−02 | C10 | −7.357E−04 |
| C13 | 4.536E−03 | C15 | 5.256E−03 | C15 | 6.591E−04 |
| C19 | 8.654E−04 | C21 | 7.806E−04 | C21 | −9.204E−04 |
| C24 | −1.248E−03 | C26 | −1.452E−03 | C26 | −5.800E−04 |

Free-form surface coefficient for S7

| | | | | | |
|---|---|---|---|---|---|
| C3 | −2.941E−02 | C4 | −2.169E−03 | C4 | −8.510E−03 |
| C8 | 1.185E−04 | C10 | −1.245E−03 | C10 | 1.385E−04 |
| C13 | −8.106E−05 | C15 | 4.605E−05 | C15 | 3.289E−04 |
| C19 | 1.320E−04 | C21 | −3.302E−05 | C21 | −3.446E−05 |
| C24 | 2.483E−06 | C26 | −4.241E−05 | C26 | −7.351E−06 |

Free-form surface coefficient for S8

| | | | | | |
|---|---|---|---|---|---|
| C3 | 1.867E−01 | C4 | 1.966E−01 | C4 | 8.728E−02 |
| C8 | 8.798E−04 | C10 | 6.151E−03 | C10 | 1.875E−03 |
| C13 | −1.446E−03 | C15 | 6.261E−03 | C15 | 3.760E−03 |
| C19 | −2.474E−03 | C21 | 1.554E−03 | C21 | 7.496E−04 |
| C24 | 2.621E−03 | C26 | −1.111E−03 | C26 | −6.575E−04 |

TABLE 12

Example 2 (P3)

Free-form surface coefficient for S9

| | | | | | |
|---|---|---|---|---|---|
| C3 | 1.201E-01 | C4 | 1.473E-01 | C6 | 1.272E-01 |
| C8 | -8.047E-03 | C10 | -5.370E-03 | C11 | 5.789E-03 |
| C13 | -5.377E-04 | C15 | 7.322E-04 | C17 | 1.767E-03 |
| C19 | 2.293E-03 | C21 | 7.737E-03 | C22 | 2.758E-04 |
| C24 | 2.860E-03 | C26 | 8.995E-04 | C28 | -4.177E-04 |
| C30 | -2.155E-04 | C32 | -3.533E-05 | C34 | 1.101E-04 |
| C36 | -2.064E-05 | C37 | 3.132E-04 | C39 | 2.629E-04 |
| C41 | -1.834E-04 | C43 | -1.959E-04 | C45 | 7.868E-05 |

Free-form surface coefficient for S10

| | | | | | |
|---|---|---|---|---|---|
| C3 | -3.483E-02 | C4 | 4.576E-02 | C6 | 3.770E-02 |
| C8 | -1.687E-03 | C10 | -1.415E-03 | C11 | 2.163E-04 |
| C13 | -1.078E-03 | C15 | -1.311E-03 | C17 | 3.369E-04 |
| C19 | -2.321E-04 | C21 | 2.028E-05 | C22 | -1.530E-04 |
| C24 | 7.850E-05 | C26 | 1.921E-05 | C28 | 4.491E-05 |
| C30 | -4.903E-05 | C32 | -7.805E-06 | C34 | 1.625E-05 |
| C36 | 1.143E-06 | C37 | 1.841E-05 | C39 | 5.214E-06 |
| C41 | -1.863E-06 | C43 | -1.734E-06 | C45 | -6.625E-07 |

Free-form surface coefficient for S11

| | | | | | |
|---|---|---|---|---|---|
| C3 | -1.312E-01 | C4 | -5.044E-02 | C6 | -8.927E-04 |
| C8 | -7.142E-03 | C10 | -6.025E-02 | C11 | 1.222E-02 |
| C13 | 8.596E-03 | C15 | -1.540E-02 | C17 | -1.564E-03 |
| C19 | 7.322E-03 | C21 | 6.216E-03 | C22 | 6.832E-04 |

TABLE 12-continued

Example 2 (P3)

| | | | | | |
|---|---|---|---|---|---|
| C24 | -5.058E-03 | C26 | 3.594E-03 | C28 | 5.490E-03 |
| C30 | 7.996E-05 | C32 | -5.945E-05 | C34 | -1.081E-03 |
| C36 | -4.682E-04 | C37 | -1.410E-04 | C39 | 2.189E-04 |
| C41 | 1.606E-04 | C43 | -5.324E-04 | C45 | -5.927E-04 |

TABLE 13

| EXAMPLE 1 | Horizontal half angle of field (X-direction) | 26.30° |
|---|---|---|
| | Vertical half angle of field (Y-direction) | 20.34° |
| | Focal length (mm) | 7.3 |
| | Fno | 3.9 |
| | Object distance (mm) | ∞(POS1)~300(POS6) |
| | Aperture stop radius(mm) | 0.92 |
| EXAMPLE 2 | Horizontal half angle of field (X-direction) | 26.3° |
| | Vertical half angle of field (Y-direction) | 19.7° |
| | Focal length (mm) | 6.0 |
| | Fno | 2.9 |
| | Object distance (mm) | ∞(POS1)~300(POS6) |
| | Aperture stop radius(mm) | 1.05 |

TABLE 14

Focal length of focusing group (third prism P3)

| | | POS1 | POS2 | POS3 | POS4 | POS5 | POS6 |
|---|---|---|---|---|---|---|---|
| X direction | Example 1 | -5.67 | -5.67 | -5.67 | -5.68 | -5.70 | -5.72 |
| | Example 2 | 20.90 | 20.89 | 20.89 | 20.88 | 20.96 | 21.17 |
| Y direction | Example 1 | -13.35 | -13.35 | -13.35 | -13.35 | -13.35 | -13.35 |
| | Example 2 | 11.22 | 11.13 | 11.09 | 10.75 | 10.37 | 9.86 |

TABLE 15

| Example | | POS1 | POS2 | POS3 | POS4 | POS5 | POS6 |
|---|---|---|---|---|---|---|---|
| | Values corresponding to conditional formula(1): $|\phi foc/\phi all|$ | | | | | | |
| 1 | X direction | 0.78 | 0.78 | 0.78 | 0.78 | 0.79 | 0.80 |
| | Y direction | 2.87 | 2.87 | 2.87 | 2.87 | 2.89 | 2.93 |
| 2 | X direction | 2.21 | 2.21 | 2.21 | 2.22 | 2.22 | 2.23 |
| | Y direction | 1.86 | 1.85 | 1.84 | 1.80 | 1.75 | 1.69 |
| | Values corresponding to conditional formula (2): $|(\phi i\_s2 - \phi i\_s1)/\phi i\_s2 \times 100|$ (based on POS1) | | | | | | |
| 1 | X direction | 0 | 0.04 | 0.07 | 0.32 | 0.63 | 0.98 |
| | Y direction | 0 | 0.07 | 0.07 | 0.10 | 0.28 | 1.27 |
| 2 | X direction | 0 | 0.00 | 0.01 | 0.02 | 0.02 | 0.01 |
| | Y direction | 0 | 0.74 | 1.16 | 4.15 | 7.52 | 12.05 |
| | Values corresponding to conditional formulae (3A) and (3B)(based on POS1) | | | | | | |
| 1 | X direction | 0 | 0.000 | 0.001 | 0.003 | 0.006 | 0.009 |
| | Y direction | 0 | 0.000 | 0.001 | 0.003 | 0.006 | 0.009 |
| 2 | X direction | 0 | 0.001 | 0.001 | 0.003 | 0.005 | 0.008 |
| | Y direction | 0 | 0.001 | 0.001 | 0.003 | 0.004 | 0.007 |

Values corresponding to conditional formula (4)

| Example | Focusing group | Incidence surface of Axial incidence principal ray | Exit surface of axial exit principal ray | $|\theta pr|$ (°) POS1~POS6 |
|---|---|---|---|---|
| 1 | P3 | S10 | S12 | 95.6 |
| 2 | P3 | S9 | S11 | 85.0 |

TABLE 15-continued

| | | Values corresponding to conditional formula (5) | | |
|---|---|---|---|---|
| Example | Image surface | θI(°, POS1) | θN(°, POS6) | |θI − θN|(°) |
| 1 | S13 | 0.000 | 0.000 | 0.0000 |
| 2 | S12 | 0.000 | 0.000 | 0.0000 |

| | | Values corresponding to conditional formula (6) | | | | |
|---|---|---|---|---|---|---|
| Example 1 | Object distance | 10000 | 5000 | 1000 | 500 | 300 |
| | |Δr/β| | 4.9 | 1.3 | 2.7 | 3.4 | 4.0 |
| | Mean β of X-direction & Y-direction | −0.0007 | −0.001 | −0.007 | −0.014 | −0.024 |
| | Δr from infinite position (°) | 0.004 | 0.002 | 0.019 | 0.049 | 0.095 |
| Example 2 | Object Distance | 10000 | 5000 | 1000 | 500 | 300 |
| | |Δr/β| | 7.6 | 6.4 | 5.3 | 5.1 | 5.4 |
| | Mean β of X-direction & Y-direction | −0.0006 | −0.001 | −0.006 | −0.012 | −0.019 |
| | Δr from infinite position (°) | 0.005 | 0.008 | 0.032 | 0.061 | 0.104 |

What is claimed is:

1. A focusing method for an optical system having a plurality of optical surfaces and an aperture stop and having an eccentric reflective surface as at least one of the plurality of optical surfaces:
    wherein, for different conjugate distances, focusing for keeping a position of an entire image surface substantially constant while keeping substantially constant an axial imaging position and an angle of incidence of an axial principal ray on an image surface is performed by parallel and rotational movement of a group provided as a focusing group having at least one surface as the eccentric reflective surface.

2. The focusing method according to claim 1,
    wherein the focusing group is formed of:
    an optical element having only the eccentric reflective surface as the optical surface;
    an optical element having the eccentric reflective surface as the optical surface and another optical surface;
    a combination of the optical element having only the eccentric reflective surface as the optical surface and the optical element having the eccentric reflective surface as the optical surface and another optical surface; or
    a combination of at least one of the combination of the optical element having only the eccentric reflective surface as the optical surface and the optical element having the eccentric reflective surface as the optical surface and another optical surface, and another optical element.

3. The focusing method according to claim 1,
    wherein the optical system has, as the focusing group, a plurality of focusing groups, and performs the parallel and rotational movement for the individual focusing groups.

4. The focusing method according to claim 1,
    wherein the optical system has, as the focusing group, at least one group in which an axial incidence principal ray and an axial exit principal ray are not parallel to each other.

5. The focusing method according to claim 1,
    wherein the optical system has, as the focusing group, at least one group which satisfies a conditional formula (1) below with at least one conjugate distance during focusing:

$$|\phi foc/\phi all|<5.0 \quad (1)$$

where
    øfoc denotes an optical power of the focusing group; and
    øall denotes an optical power of the entire system.

6. The focusing method according to claim 1,
    wherein the optical system has, as the focusing group, at least one group whose optical power is not constant during focusing.

7. The focusing method according to claim 1,
    wherein the optical system has, as the eccentric reflective surface, at least one surface formed of a free-form surface.

8. The focusing method according to claim 1,
    wherein the optical system has, as the focusing group, at least one group which satisfies a conditional formula (2) below with at least one of a combination of arbitrary conjugate distances s1 and s2 during focusing:

$$|(\phi i\_s2-\phi i\_s1)/\phi i\_s2 \times 100|<25.0 \quad (2)$$

where
    øi_s1 denotes an optical power of the focusing group at the conjugate distance s1; and
    øoi_s2 denotes an optical power of the focusing group at the conjugate distance s2.

9. The focusing method according to claim 1,
    wherein at least one of optical elements forming the optical system is formed of a plastic material.

10. The focusing method according to claim 9,
    wherein the plastic material is athermal resin.

11. The focusing method according to claim 1,
    wherein the optical system is an image-taking optical system for forming an optical image of an object on a light-receiving surface of an image sensor.

12. The focusing method according to claim 1,
    wherein an amount of rotational movement made by the focusing group for focusing satisfies a conditional formula (6) below:

$$0.2<|\Delta r/\beta|<100 \quad (6)$$

where
    Δr denotes an amount (in °) of rotation of the focusing group during focusing at a certain object distance with respect to an infinite object distance; and
    β denotes a magnification ratio during the focusing at the certain object distance.

13. A focusing method for an optical system having a plurality of optical surfaces and an aperture stop and having an eccentric reflective surface as at least one of the plurality of optical surfaces:
    wherein the optical system has at least one prism optical element having at least one surface as the eccentric reflective surface, and wherein, for different conjugate distances, focusing for keeping a position of an entire image surface substantially constant while keeping substantially constant an axial imaging position and an angle of incidence of an axial principal ray on an image surface is performed by parallel and rotational movement of a group provided as a focusing group including the at least one prism optical element.

14. The focusing method according to claim 13, wherein the focusing group is formed of:
a prism optical element having only an eccentric optical surface as the optical surface;
a prism optical element having the eccentric reflective surface as the optical surface and another optical surface;
a combination of the prism optical element having only an eccentric optical surface as the optical surface and the prism optical element having the eccentric reflective surface as the optical surface and another optical surface; or
a combination of at least one of the combination of the prism optical element having only an eccentric optical surface as the optical surface and the prism optical element having the eccentric reflective surface as the optical surface and another optical surface, and another optical element.

15. The focusing method according to claim 13, wherein the optical system has, as the focusing group, a plurality of focusing groups, and performs the parallel and rotational movement for the individual focusing groups.

16. The focusing method according to claim 13, wherein the optical system has, as the focusing group, at least one group in which an axial incidence principal ray and an axial exit principal ray are not parallel to each other.

17. The focusing method according to claim 13, wherein the optical system has, as the focusing group, at least one group which satisfies a conditional formula (1) below with at least one conjugate distance during focusing:

$$|\phi foc/\phi all|<5.0 \quad (1)$$

where
$\phi foc$ denotes an optical power of the focusing group; and
$\phi all$ denotes an optical power of the entire system.

18. The focusing method according to claim 13, wherein the optical system has, as the focusing group, at least one group whose optical power is not constant during focusing.

19. The focusing method according to claim 13, wherein the optical system has, as the eccentric reflective surface, at least one surface formed of a free-form surface.

20. The focusing method according to claim 13, wherein the optical system has, as the focusing group, at least one group which satisfies a conditional formula (2) below with at least one of a combination of arbitrary conjugate distances s1 and s2 during focusing:

$$|(\phi i\_s2-\phi i\_s1)/\phi i\_s2\times 100|<25.0 \quad (2)$$

where
$\phi i\_s1$ denotes an optical power of the focusing group at the conjugate distance s1; and
$\phi i\_s2$ denotes an optical power of the focusing group at the conjugate distance s2.

21. The focusing method according to claim 13, wherein at least one of optical elements forming the optical system is formed of a plastic material.

22. The focusing method according to claim 21, wherein the plastic material is athermal resin.

23. The focusing method according to claim 13, wherein the optical system is an image-taking optical system for forming an optical image of an object on a light-receiving surface of an image sensor.

24. The focusing method according to claim 13, wherein an amount of rotational movement made by the focusing group for focusing satisfies a conditional formula (6) below:

$$0.2<|\Delta r/\beta|<100 \quad (6)$$

where
$\Delta r$ denotes an amount (in °) of rotation of the focusing group during focusing at a certain object distance with respect to an infinite object distance; and
$\beta$ denotes a magnification ratio during the focusing at the certain object distance.

25. A focusing method for an optical system having a plurality of optical surfaces and an aperture stop and having an eccentric reflective surface as at least one of the plurality of optical surfaces:
wherein the optical system has at least one prism optical element having at least one surface as the eccentric reflective surface, and
wherein, for different conjugate distances, focusing for keeping a position of an entire image surface substantially constant while keeping substantially constant an axial imaging position and an angle of incidence of an axial principal ray on an image surface is performed by parallel and rotational movement of a group provided as a focusing group located on a most image surface side and including the at least one prism optical element.

26. The focusing method according to claim 25, wherein the focusing group is formed of:
a prism optical element having only an eccentric optical surface as the optical surface;
a prism optical element having the eccentric reflective surface as the optical surface and another optical surface;
a combination of the prism optical element having only an eccentric optical surface as the optical surface and the prism optical element having the eccentric reflective surface as the optical surface and another optical surface; or
a combination of at least one of the combination of the prism optical element having only an eccentric optical surface as the optical surface and the prism optical element having the eccentric reflective surface as the optical surface and another optical surface, and another optical element.

27. The focusing method according to claim 25, wherein the optical system has, as the focusing group, a plurality of focusing groups on the most image surface side, and performs the parallel and rotational movement for the individual focusing groups.

28. The focusing method according to claim 25, wherein the optical system has, as the focusing group, at least one group in which an axial incidence principal ray and an axial exit principal ray are not parallel to each other.

29. The focusing method according to claim 25, wherein the optical system has a fixed group on an object side of the focusing group and satisfies conditional formulae (3A) and (3B):

$$|[(B_{C11}-B_{C21})+\{M_{C21}{}^2(F_{X21}+S2)\}/\{(F_{X21}+S2)(B_{X21}+F_{C21})-M_{X21}{}^2\}-\{M_{C11}{}^2(F_{X11}+S1)\}/\{(F_{X11}+S1)(B_{X11}+F_{C11})-M_{X11}{}^2\}]/f_x| \leq 0.10 \quad (3A)$$

$$|[(B_{C12}-B_{C22})+\{M_{C22}{}^2(F_{X22}+S2)\}/\{(F_{X22}+S2)(B_{X22}+F_{C22})-M_{X22}{}^2\}-\{M_{C12}{}^2(F_{X12}+S1)\}/\{(F_{X12}+S1)(B_{X12}+F_{C12})-M_{X12}{}^2\}]/f_y| \leq 0.10 \quad (3B)$$

and where arbitrary two photographing distance state are defined as θ1 and θ2, and an axial principal ray passing through the center of the aperture stop from the center of an object and then reaching the center of the image surface is defined as a base ray, S1 denotes a distance, at the photographing distance state θ1, along the base ray from an intersection between the most object side surface of the fixed group and the base ray to the object surface, and S2 denotes a distance, at the photographing distance state θ2, along the base ray from an intersection between the most object side surface of the fixed group and the base ray to the object surface, and, for an orthogonal coordinate system formed with a z-axis set in a direction of the base ray from the origin thereon and with an x- and y-axes set perpendicular to the z-axis, fx denotes a focal length of the entire system in the x-direction; and fy denotes a focal length of the entire system in the y-direction, and $F_{X11}=(F_{11})_{fix}, F_{X12}=(F_{22})_{fix}$ $M_{X11}=(M_{11})_{fix}, M_{X12}=(M_{22})_{fix}$ $B_{X11}=(B_{11})_{fix}, B_{X12}=(B_{22})_{fix}$ $F_{C11}=(F_{11})_{foc\_\theta1}, F_{C12}=(F_{22})_{foc\_\theta1}$ $F_{C21}=(F_{11})_{foc\_\theta2}, F_{C22}=(F_{22})_{foc\_\theta2}$ $M_{C11}=(-M_{11})_{foc\_\theta1}, M_{C12}=(-M_{22})_{foc\_\theta1}$ $M_{C21}=(-M_{11})_{foc\_\theta2}, M_{C22}=(-M_{22})_{foc\_\theta2}$ $B_{C11}=(B_{11})_{foc\_\theta1}, B_{C12}=(B_{22})_{foc\_\theta1}$ $B_{c21}=(B_{11})_{foc\_\theta2}, B_{C22}=(B_{22})_{foc\_\theta2}$ where F, M, and B are a first-order characteristic function matrix, the suffixes 11 and 22 respectively represent an 11 component and a 12 component of this matrix, and the suffixes "fix" and "foc" respectively represent characteristic function matrixes of the fixed group and the focusing group, and the suffixes _θ1 and _θ2 respectively represent characteristic function matrixes at the photographing distances θ1 and θ2.

30. The focusing method according to claim 25, wherein the optical system has, as the focusing group, at least one group which satisfies a conditional formula (1) below with at least one conjugate distance during focusing:

$$|\varphi foc/\varphi all|<5.0 \quad (1)$$

where

øfoc denotes an optical power of the focusing group; and

øall denotes an optical power of the entire system.

31. The focusing method according to claim 25, wherein the optical system has, as the focusing group, at least one group whose optical power is not constant during focusing.

32. The focusing method according to claim 25, wherein the optical system has, as the eccentric reflective surface, at least one surface formed of a free-form surface.

33. The focusing method according to claim 25, wherein the optical system has, as the focusing group, at least one group which satisfies a conditional formula (2) below with at least one of a combination of arbitrary conjugate distances s1 and s2 during focusing:

$$|(\varphi i\_s2-\varphi i\_s1)\varphi i\_s2\times 100|<25.0 \quad (2)$$

where

øi_s1 denotes an optical power of the focusing group at the conjugate distance s1; and øi_s2 denotes an optical power of the focusing group at the conjugate distance s2.

34. The focusing method according to claim 25, wherein at least one of optical elements forming the optical system is formed of a plastic material.

35. The focusing method according to claim 34, wherein the plastic material is athermal resin.

36. The focusing method according to claim 25, wherein the optical system is an image-taking optical system for forming an optical image of an object on a light-receiving surface of an image sensor.

37. The focusing method according to claim 25, wherein an amount of rotational movement made by the focusing group for focusing satisfies a conditional formula (6) below:

$$0.2<|\Delta r/\beta|<100 \quad (6)$$

where

Δr denotes an amount (in °) of rotation of the focusing group during focusing at a certain object distance with respect to an infinite object distance; and β denotes a magnification ratio during the focusing at the certain object distance.

38. An image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, and performs, for different conjugate distances, focusing for keeping a position of an entire image surface substantially constant while keeping substantially constant an axial imaging position and an angle of incidence of an axial principal ray on an image surface by parallel and rotational movement of a group provided as a focusing group having at least one surface as the eccentric reflective surface.

39. An image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, has at least one prism optical element having at least one surface as the eccentric reflective surface, and performs, for different conjugate distances, focusing for keeping a position of an entire image surface substantially constant while keeping substantially constant an axial imaging position and an angle of incidence of an axial principal ray on an image surface by parallel and rotational movement of a group provided as a focusing group including the at least one prism optical element.

40. An image-taking apparatus including: an image-taking optical system forming an optical image; and an image sensor converting the optical image formed by the image-taking optical system into an electrical signal, wherein the image-taking optical system has a plurality of optical surfaces and an aperture stop, has an eccentric reflective surface as at least one of the plurality of optical surfaces, has at least one prism optical element having at least one surface as the eccentric reflective surface, has a group as a focusing group located on a most image surface side and including the at least one prism optical element, and performs, for different conjugate distances, focusing for keeping a position of an entire image surface substantially constant while keeping substantially constant an axial imaging position and an angle of incidence of an axial principal ray on an image surface by parallel and rotational movement of the focusing.

41. A focusing method for an optical system of the type having a plurality of optical surfaces and an aperture stop, said plurality of optical surfaces including a focusing group having at least one eccentric reflective surface, comprising the steps of:

performing a focusing operation through the rotational and parallel movement of the focus group while keeping substantially constant each of the position of an image surface and the position and an angle of incidence of a principal ray on the image surface during focusing.

42. An image-taking apparatus, comprising:

an image-taking optical system configured to form an optical image, said image-taking optical system including a plurality of optical surfaces and an aperture stop, said image-taking optical system being further configured to perform a focusing operation through the rotational and parallel movement of a focus group while keeping substantially constant each of the position of an image surface and the position and an angle of incidence of a principal ray on the image surface during focusing, said plurality of optical surfaces having at least one eccentric reflective surface that comprises at least a portion of the focus group; and an image sensor configured to convert the optical image formed by the image-taking optical system into an electrical signal.

* * * * *